US012812225B2

(12) United States Patent
Usui et al.

(10) Patent No.: US 12,812,225 B2
(45) Date of Patent: Nov. 24, 2026

(54) VEHICULAR CAMERA

(71) Applicant: Panasonic Automotive Systems Co., Ltd., Kanagawa (JP)

(72) Inventors: Yoshiki Usui, Kanagawa (JP); Takeshi Harada, Kanagawa (JP); Masayuki Yoshie, Aichi (JP); Kouichi Kawamoto, Osaka (JP); Ken Nakamura, Kanagawa (JP); Tadafumi Kurogi, Kanagawa (JP); Kazufumi Takeshita, Tokyo (JP); Kenichi Kuwayama, Shizuoka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 19/215,789

(22) Filed: May 22, 2025

(65) Prior Publication Data

US 2025/0287086 A1 Sep. 11, 2025

Related U.S. Application Data

(63) Continuation of application No. 18/425,939, filed on Jan. 29, 2024, now Pat. No. 12,342,060, which is a (Continued)

(30) Foreign Application Priority Data

Jun. 29, 2022 (JP) ................................ 2022-105021
Jun. 29, 2022 (JP) ................................ 2022-105022
Jun. 29, 2022 (JP) ................................ 2022-105023

(51) Int. Cl.
*H04N 23/52* (2023.01)
*H04N 23/51* (2023.01)
(Continued)

(52) U.S. Cl.
CPC ............ *H04N 23/52* (2023.01); *H04N 23/51* (2023.01); *H04N 23/57* (2023.01); *B60R 1/20* (2022.01)

(58) Field of Classification Search
CPC ........ H04N 23/50; H04N 23/51; H04N 23/52; H04N 23/54; H04N 23/55; H04N 23/57; G03B 30/00; G02B 2207/121
See application file for complete search history.

(56) References Cited

U.S. PATENT DOCUMENTS

2013/0242587 A1 9/2013 Hirabayashi et al.
2019/0103716 A1 4/2019 Yamazaki
(Continued)

FOREIGN PATENT DOCUMENTS

JP 2010139627 A 6/2010
JP 2013029614 A 2/2013
(Continued)

OTHER PUBLICATIONS

International Search Report, mailed Aug. 8, 2023, for PCT Patent Application No. PCT/JP2023/023141. (5 pages) (with English translation).

*Primary Examiner* — Daniel M Pasiewicz
(74) *Attorney, Agent, or Firm* — Seed Intellectual Property Law Group LLP

(57) ABSTRACT

A vehicular camera includes a first shield made of metal and disposed to surround a circuit board. The first shield includes a first bottom surface portion, a second bottom surface portion disposed to be separated from the first bottom surface portion, and a connection portion connecting an entire periphery of the first bottom surface portion and an entire periphery of the second bottom surface portion. At least a first side surface portion, a second side surface portion, a third side surface portion, and a fourth side surface portion of the first shield are formed by a contiguously curved surface, and at least the first side surface portion, the second side surface portion, the third side surface portion, the fourth side surface portion, the first bottom surface portion, the connection portion, and the second bottom surface portion are formed by a contiguously curved surface.

11 Claims, 40 Drawing Sheets

Related U.S. Application Data continuation of application No. PCT/JP2023/023141, filed on Jun. 22, 2023.

(51) Int. Cl.

| | |
|---|---|
| ***H04N 23/57*** | (2023.01) |
| *B60R 1/20* | (2022.01) |

(56) References Cited

U.S. PATENT DOCUMENTS

| | | | |
|---|---|---|---|
| 2019/0143907 | A1 | 5/2019 | Byrne et al. |
| 2020/0169648 | A1 | 5/2020 | Percival et al. |
| 2023/0008374 | A1 | 1/2023 | Owaki |
| 2023/0071961 | A1 | 3/2023 | Owaki et al. |
| 2023/0080778 | A1 | 3/2023 | Owaki |
| 2023/0236478 | A1 | 7/2023 | Lee et al. |
| 2024/0040217 | A1 | 2/2024 | Nakamura et al. |
| 2024/0380963 | A1 | 11/2024 | Lee et al. |

FOREIGN PATENT DOCUMENTS

| | | | |
|---|---|---|---|
| JP | 2013109188 | A | 6/2013 |
| JP | 2013196844 | A | 9/2013 |
| JP | 2014075825 | A | 4/2014 |
| JP | 2018173434 | A | 11/2018 |
| JP | 2018197798 | A | * 12/2018 |
| JP | 2019067740 | A | 4/2019 |
| JP | 2019208190 | A | 12/2019 |
| JP | 2022185553 | A | 12/2022 |
| WO | 2021125074 | A1 | 6/2021 |

* cited by examiner

VEHICULAR CAMERA

CROSS-REFERENCE TO RELATED APPLICATIONS

This is a continuation of International Application No. PCT/JP2023/023141 filed on Jun. 22, 2023, and claims priority from Japanese Patent Applications No. 2022-105021 filed on Jun. 29, 2022, No. 2022-105022 filed on Jun. 29, 2022 and No. 2022-105023 filed on Jun. 29, 2022, the entire content of which is incorporated herein by reference.

TECHNICAL FIELD

The present disclosure relates to a vehicular camera.

BACKGROUND ART

With demands for improvements in vehicle safety, introduction of autonomous driving functions and the like in recent years, development of vehicular cameras that are mounted on vehicles and capture the inside and outside of the vehicles have become active (for example, see Patent Literatures 1 to 10).

CITATION LIST

Patent Literature

Patent Literature 1: JP2013-196844A
Patent Literature 2: JP2018-197798A
Patent Literature 3: JP2014-75825A
Patent Literature 4: JP2019-67740A
Patent Literature 5: JP2010-139627A
Patent Literature 6: JP2013-029614A
Patent Literature 7: US20190143907A
Patent Literature 8: WO2021/125074
Patent Literature 9: JP2019-208190A
Patent Literature 10: JP2018-173434A

SUMMARY OF INVENTION

A level of demands related to the safety, the autonomous driving functions, and the like, which are required for a vehicle, continues to increase, and further improvements in performance and the like are also required for the vehicular camera.

The present disclosure relates to a technique for providing a new vehicular camera.

The present disclosure provides a vehicular camera, the vehicular camera includes a first tubular portion having a first tubular shape; a lens unit that includes at least one lens disposed inside the first tubular portion; an image sensor disposed on an optical axis of the at least one lens; a housing that includes a second tubular portion having a second tubular shape along the optical axis and accommodates at least the image sensor inside the second tubular portion; and a plate-shaped ring member formed of a first resin having predetermined light transmissivity, in which the lens unit includes a flange portion disposed on an outer side of the first tubular portion so as to extend over an entire periphery around the optical axis and extend outward with reference to the optical axis, the flange portion of the lens unit is disposed on an inner side with respect to the second tubular portion of the housing in a radial direction orthogonal to the optical axis, the flange portion of the lens unit includes a ring-shaped first surface facing the image sensor and a ring-shaped second surface opposite to the first surface, the second surface of the flange portion of the lens unit is provided with a first welding rib that is made of a second resin having a first light absorptivity, protrudes in a direction opposite to the first surface, and is disposed over the entire periphery around the optical axis, an end surface of the second tubular portion of the housing is provided with a second welding rib that is made of a third resin having a second light absorptivity, protrudes along the optical axis direction, and is disposed over the entire periphery around the optical axis, the ring member is welded to the first welding rib on the second surface of the flange portion of the lens unit, and is welded to the second welding rib on the end surface of the second tubular portion of the housing, the lens unit includes a protruding portion that protrudes in the radial direction and is in contact with an inner surface of the second tubular portion of the housing, and as the ring member is welded to the first welding rib, a first burr generated from the first welding rib does not reach the end surface of the second tubular portion of the housing at a position overlapping the protruding portion.

The present disclosure provides a vehicular camera that includes a lens unit that includes at least one lens; a circuit board that has a first surface, a second surface opposite to the first surface, and an end surface between the first surface and the second surface; an image sensor mounted on the first surface of the circuit board and disposed on an optical axis of the at least one lens; a housing supporting the lens unit and accommodating at least the circuit board and the image sensor; a first metal shield disposed to surround the circuit board and partially face the second surface of the circuit board in an internal space of the housing; and a second metal shield disposed to partially face the first surface of the circuit board, in which the circuit board has a first shape that includes at least a first side, a second side, a third side, and a fourth side in a planar view, the end surface of the circuit board includes at least a first end surface corresponding to the first side, a second end surface corresponding to the second side, a third end surface corresponding to the third side, and a fourth end surface corresponding to the fourth side, the first shield includes a third bottom surface portion disposed to face the second surface of the circuit board and having a second shape including at least a fifth side, a sixth side, a seventh side, and an eighth side in a planar view, a first side surface portion disposed toward the circuit board to correspond to the fifth side of the third bottom surface portion, a second side surface portion disposed toward the circuit board to correspond to the sixth side of the third bottom surface portion, a third side surface portion disposed toward the circuit board to correspond to the seventh side of the third bottom surface portion, and a fourth side surface portion disposed toward the circuit board to correspond to the eighth side of the third bottom surface portion, the first end surface of the circuit board faces the first side surface portion of the first shield, the second end surface of the circuit board faces the second side surface portion of the first shield, the third end surface of the circuit board faces the third side surface portion of the first shield, the fourth end surface of the circuit board faces the fourth side surface portion of the first shield, the second shield has a fifth shape including at least a ninth side, a tenth side, an eleventh side, and a twelfth side in a planar view, and includes a hole including the center of the fifth shape and corresponding to the image sensor mounted on the first surface of the circuit board, at least the first side surface portion, the second side surface portion, the third side surface portion, the fourth side surface portion, and the third bottom surface portion of the first shield are formed by a contiguously curved surface, and the second shield includes a first contact point electrically connected to the first side surface portion of the first shield on the ninth side, a second contact point electrically connected to the second side surface portion of the first shield on the tenth side, a third contact point electrically connected to the third side surface portion of the first shield on the eleventh side, and a fourth contact point electrically connected to the fourth side surface portion of the first shield on the twelfth side.

The present disclosure provides a vehicular camera that includes a lens unit that includes at least one lens; a circuit board that has a first surface, a second surface opposite to the first surface, and an end surface between the first surface and the second surface; an image sensor electrically connected to a circuit of the circuit board and disposed on an optical axis of the at least one lens; a housing supporting the lens unit and accommodating at least the circuit board and the image sensor; and a metal shield disposed in an internal space of the housing to surround the circuit board, in which the circuit board has a first shape that includes at least a first side, a second side, a third side, and a fourth side in a planar view, the end surface of the circuit board includes at least a first end surface corresponding to the first side, a second end surface corresponding to the second side, a third end surface corresponding to the third side, and a fourth end surface corresponding to the fourth side, the housing includes extending over the inside and outside of the housing, the connector disposed on a bottom surface facing the circuit board, the connector includes at least a first terminal and a second terminal that electrically connect the inside and outside of the housing, and the first terminal and the second terminal of the connector are electrically connected to the circuit of the circuit board, the metal shield includes a first bottom surface portion that is disposed to face the second surface of the circuit board, has a second shape including a fifth side, a sixth side, a seventh side, and an eighth side in a planar view, and includes a hole disposed to include a central portion of the second shape, a second bottom surface portion that is disposed to correspond to the hole disposed to include the central portion of the second shape of the first bottom surface portion, face the second surface of the circuit board, and is disposed to be separated from the first bottom surface portion with reference to the second surface of the circuit board, a first side surface portion disposed to correspond to the fifth side of the first bottom surface portion in a direction opposite to the second bottom surface portion, a second side surface portion disposed to correspond to the sixth side of the first bottom surface portion in the direction opposite to the second bottom surface portion, a third side surface portion disposed to correspond to the seventh side of the first bottom surface portion in the direction opposite to the second bottom surface portion, a fourth side surface portion disposed to correspond to the eighth side of the first bottom surface portion in the direction opposite to the second bottom surface portion, and a connection portion that connects an entire periphery of the hole disposed to include the central portion of the second shape of the first bottom surface portion and an entire periphery of the second bottom surface portion, the second bottom surface portion of the metal shield corresponds to the bottom surface of the housing, the connector is disposed to penetrate the second bottom surface portion of the metal shield, at least a part of the first side surface portion of the metal shield faces the first end surface of the circuit board, at least a part of the second side surface portion of the metal shield faces the second end surface of the circuit board, at least a part of the third side surface portion of the metal shield faces the third end surface of the circuit board, at least a part of the fourth side surface portion of the metal shield faces the fourth end surface of the circuit board, the hole disposed to include the central portion of the second shape of the first bottom surface portion of the metal shield has a third shape different from the second shape in a planar view, at least the first side surface portion, the second side surface portion, the third side surface portion, and the fourth side surface portion of the metal shield are formed by a contiguously curved surface, and at least the first side surface portion, the second side surface portion, the third side surface portion, the fourth side surface portion, the first bottom surface portion, the connection portion, and the second bottom surface portion are formed by a contiguously curved surface.

According to the present disclosure, a vehicular camera that can be manufactured at low cost and ensures excellent imaging performance is provided.

DESCRIPTION OF EMBODIMENTS

Hereinafter, embodiments that specifically disclose a vehicular camera according to the present disclosure will be described in detail with reference to the drawings as appropriate. However, unnecessarily detailed description may be omitted. For example, detailed description of already well-known matters and redundant description of substantially the same configuration may be omitted. This is to avoid unnecessary redundancy of the following description and to facilitate understanding of a person skilled in the art. It should be noted that the accompanying drawings and the following description are provided for a person skilled in the art to fully understand the present disclosure, and are not intended to limit the subject matter described in the claims.

Vehicle on Which In-Vehicle Camera is Mounted

Figure 12:
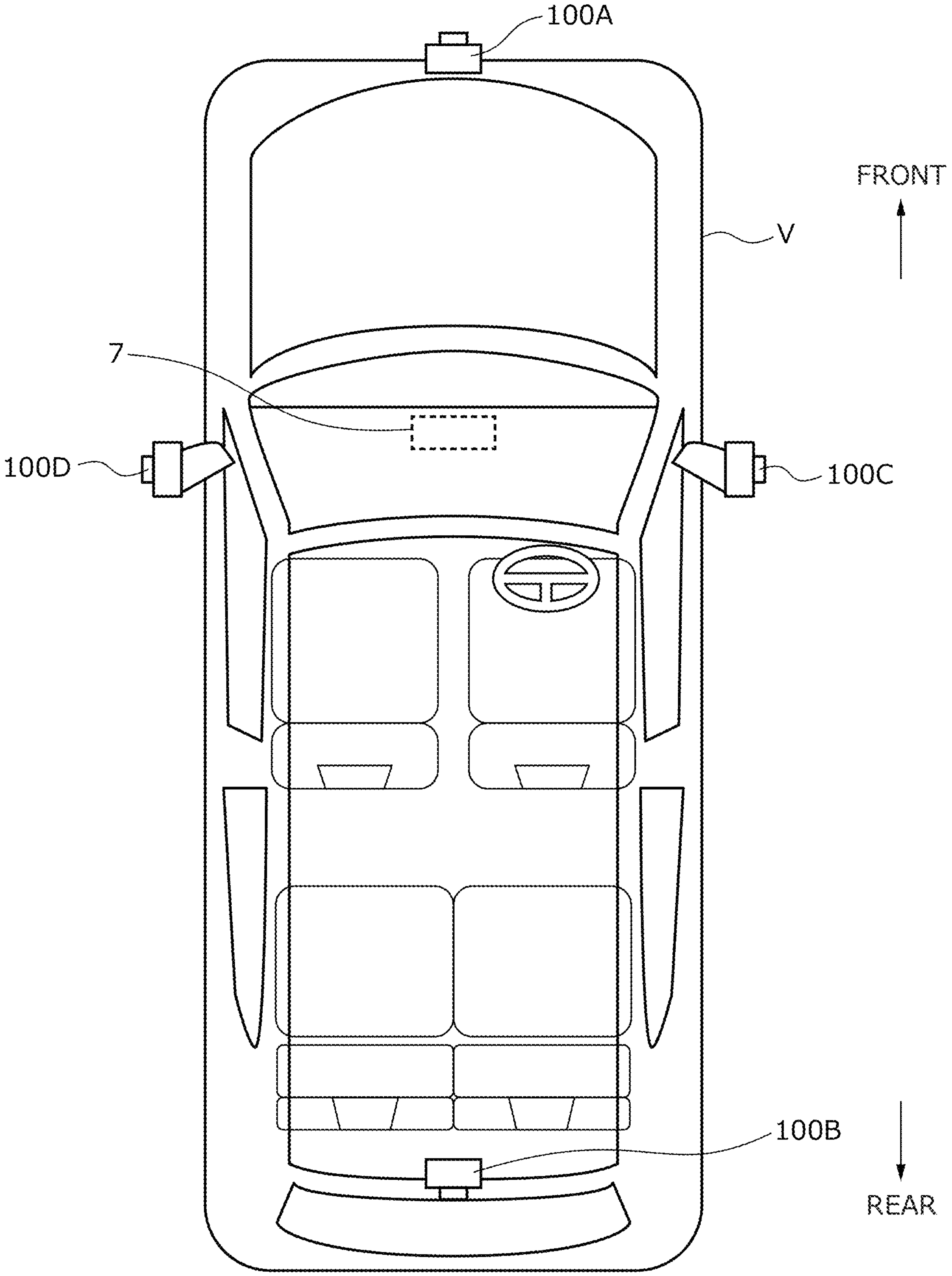
FIG. 12 is an example of a vehicle, and is a top view of the vehicle on which vehicular cameras are mounted.

FIG. 12 is an example of a vehicle, and illustrates a top view of the vehicle on which vehicular cameras are mounted. As a vehicular camera 100, a vehicular camera 100A, a vehicular camera 100B, a vehicular camera 100C, and a vehicular camera 100D are mounted on a vehicle V. The vehicular camera 100A is a front camera, the vehicular camera 100B is a rear camera, the vehicular camera 100C is a right-side camera, and the vehicular camera 100D is a left-side camera. The vehicular cameras 100A to 100D are, for example, wide-angle cameras having an angle of view of about 180°, and are disposed to capture images showing the entire periphery of the vehicle V.

For example, the vehicular camera 100A is provided in a front grille of the vehicle V, and captures an image of a front region in a direction of looking down obliquely with respect to the ground. The vehicular camera 100B is provided in a roof spoiler of the vehicle V, and captures an image of a rear region in a direction of looking down obliquely with respect to the ground. The vehicular camera 100C and the vehicular camera 100D are provided in side mirrors of the vehicle V, and capture images of lateral regions in directions of looking down obliquely with respect to the ground, respectively.

Figure 19:
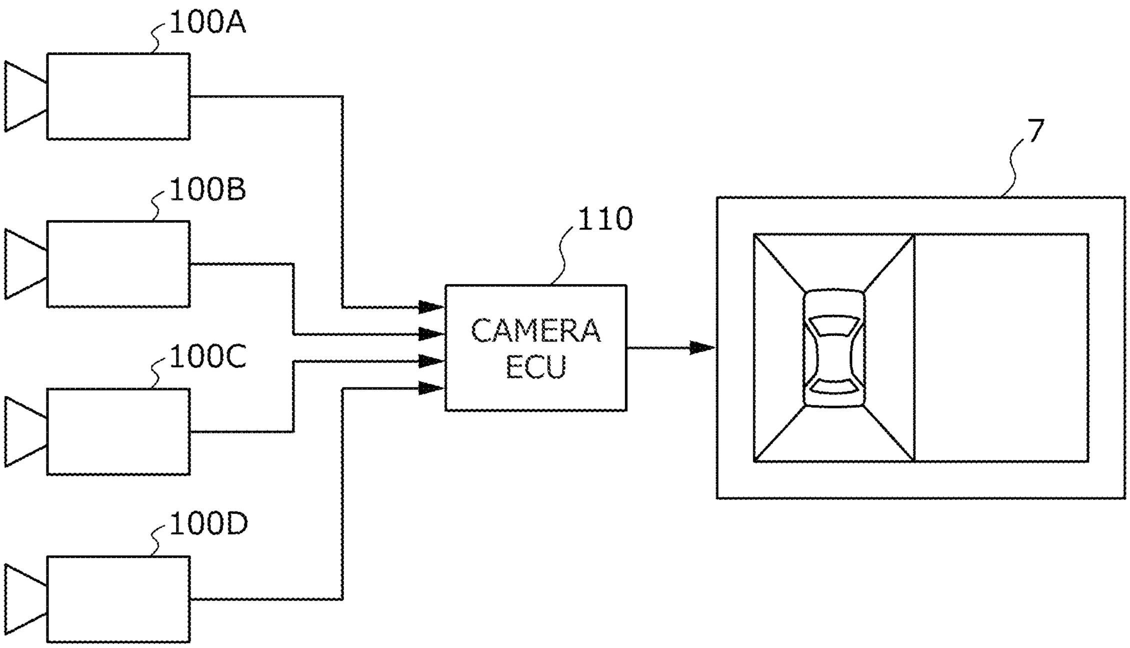
FIG. 19 is a block diagram illustrating a connection example of the vehicular cameras provided in the vehicle in FIG. 12, a camera ECU, and a display.

FIG. 19 is a block diagram illustrating a connection example of the vehicular cameras 100A to 100D provided in the vehicle V shown in FIG. 12, a camera ECU 110, and a display 7. The camera electronic control unit (ECU) 110 in FIG. 19 synthesizes the images captured by the vehicular cameras 100A to 100D, and displays a synthesized image on the display 7 of a navigation system disposed on an instrument panel, for example. An occupant can visually recognize the display 7 and check a surrounding situation of the vehicle V.

Figure 13:
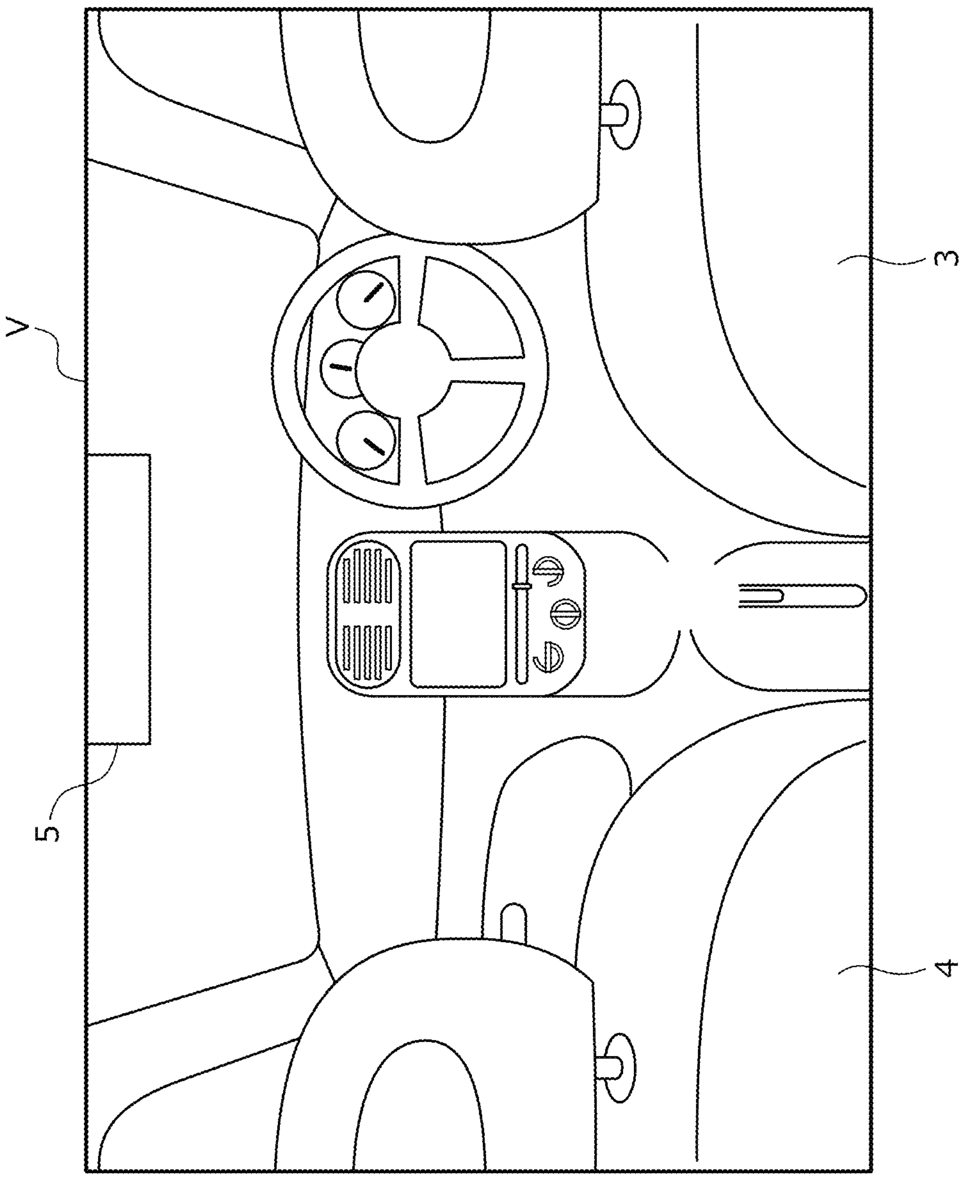
FIG. 13 is another example of the vehicle, and is a schematic diagram of a vehicle cabin of the vehicle on which the vehicular camera is mounted.
Figure 14:
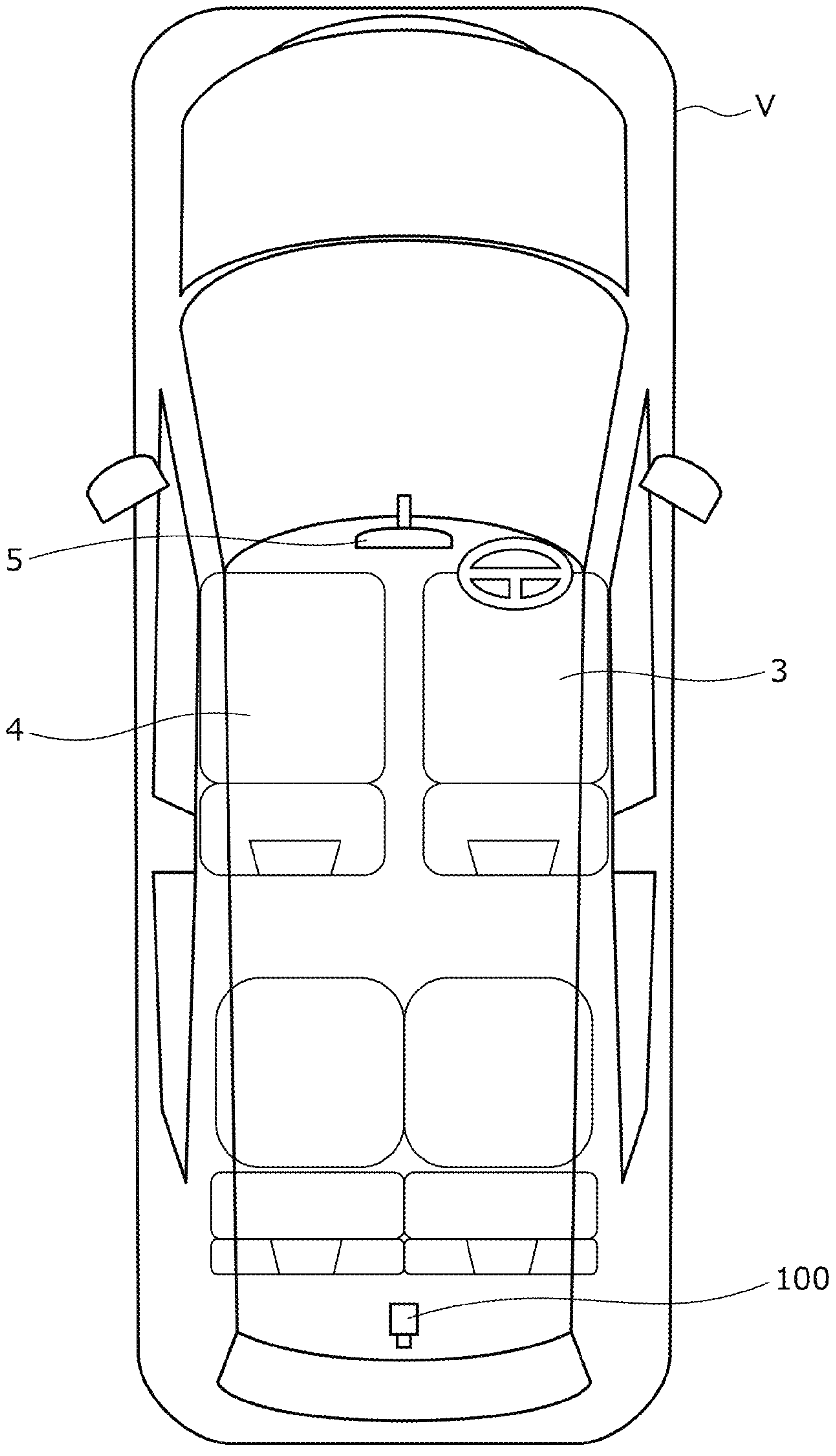
FIG. 14 is a top view of the vehicle in FIG. 13.
Figure 20:
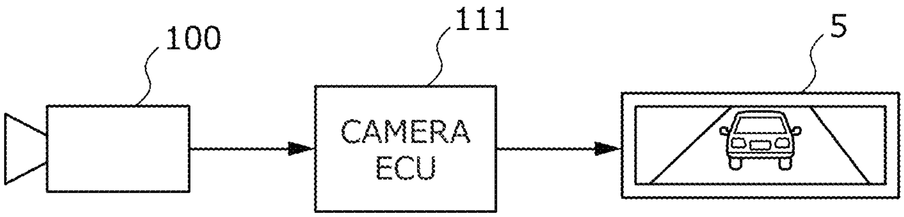
FIG. 20 is a block diagram illustrating a connection example of the vehicular camera provided in the vehicle in FIG. 13, a camera ECU, and a display device.

FIG. 13 is another example of the vehicle V, and is a schematic diagram of a vehicle cabin of the vehicle V on which the vehicular camera 100 is mounted, and FIG. 14 is a top view of the vehicle in FIG. 13. The vehicle V includes a display device 5 (for example, an electronic interior rearview mirror) at an attaching position of an interior rearview mirror which is a front portion between a driver's seat 3 and a passenger seat 4 in a vehicle cabin 2. Further, the vehicle V is provided with the vehicular camera 100 at a rear side of a vehicle body. FIG. 20 is a block diagram illustrating a connection example of the vehicular camera 100 provided in the vehicle V in FIG. 13, a camera ECU 111, and the display device 5. The camera electronic control unit (ECU) 111 in FIG. 20 processes an image captured by the vehicular camera 100, and the display device 5 displays the image. The occupant can visually recognize the display device 5 and check a rear situation of the vehicle V.

First Embodiment

Figure 1A:
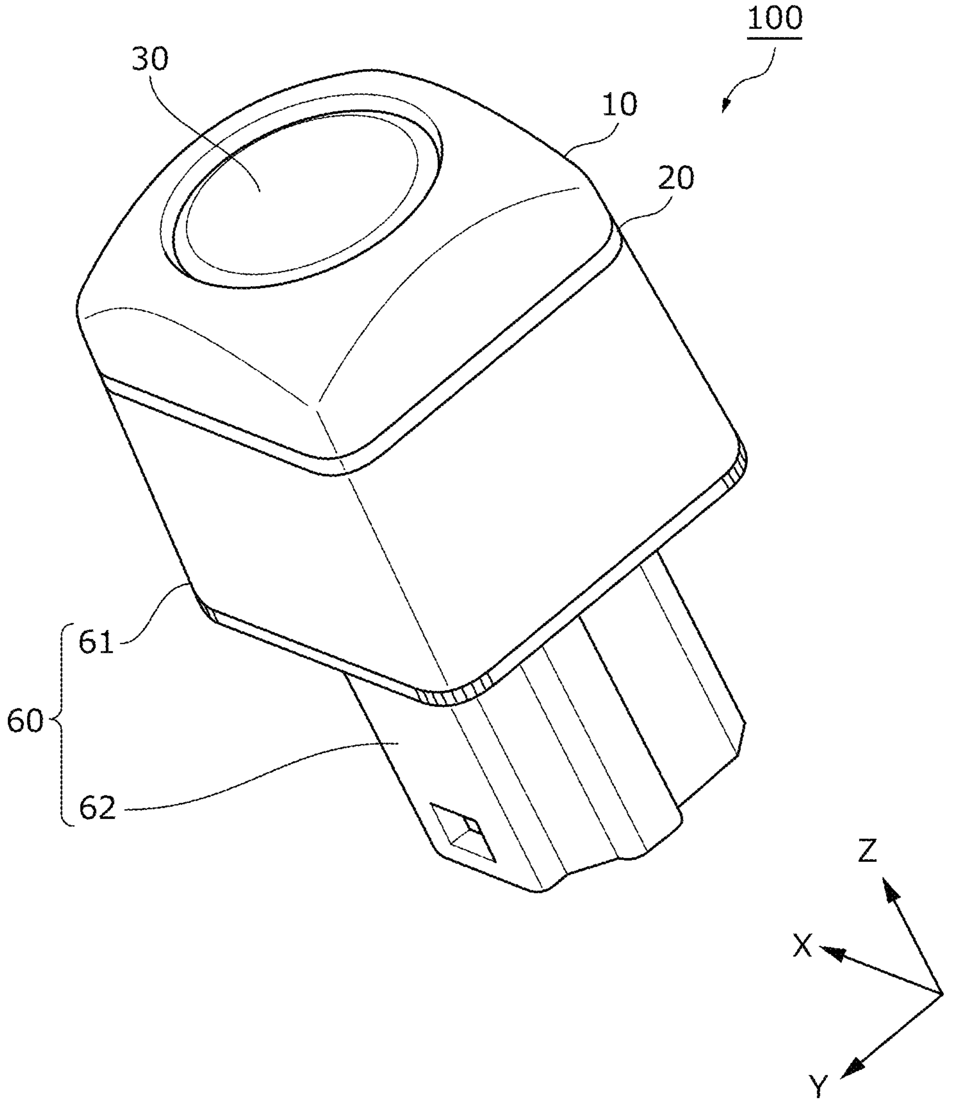
FIG. 1A is a top perspective view of a vehicular camera according to a first embodiment.
Figure 1B:
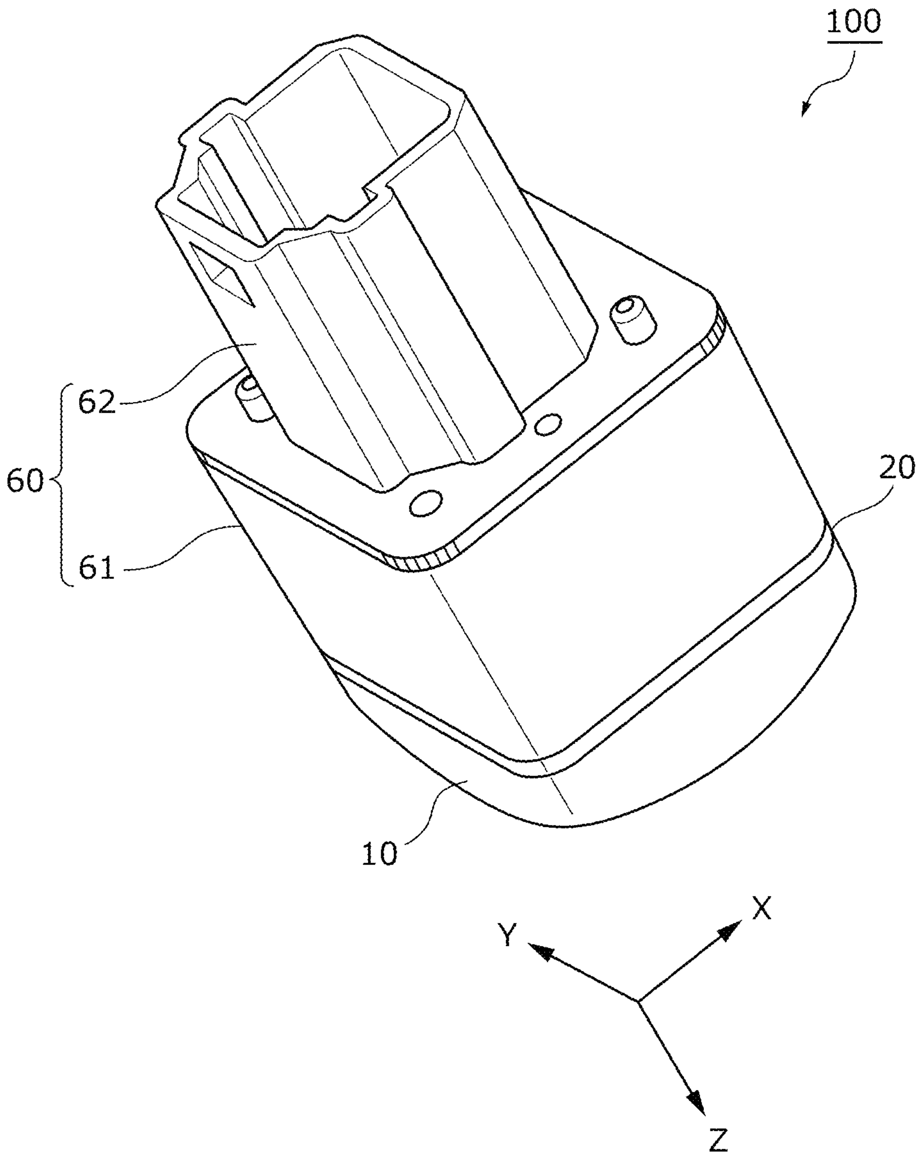
FIG. 1B is a bottom perspective view of the vehicular camera according to the first embodiment.
Figure 2:
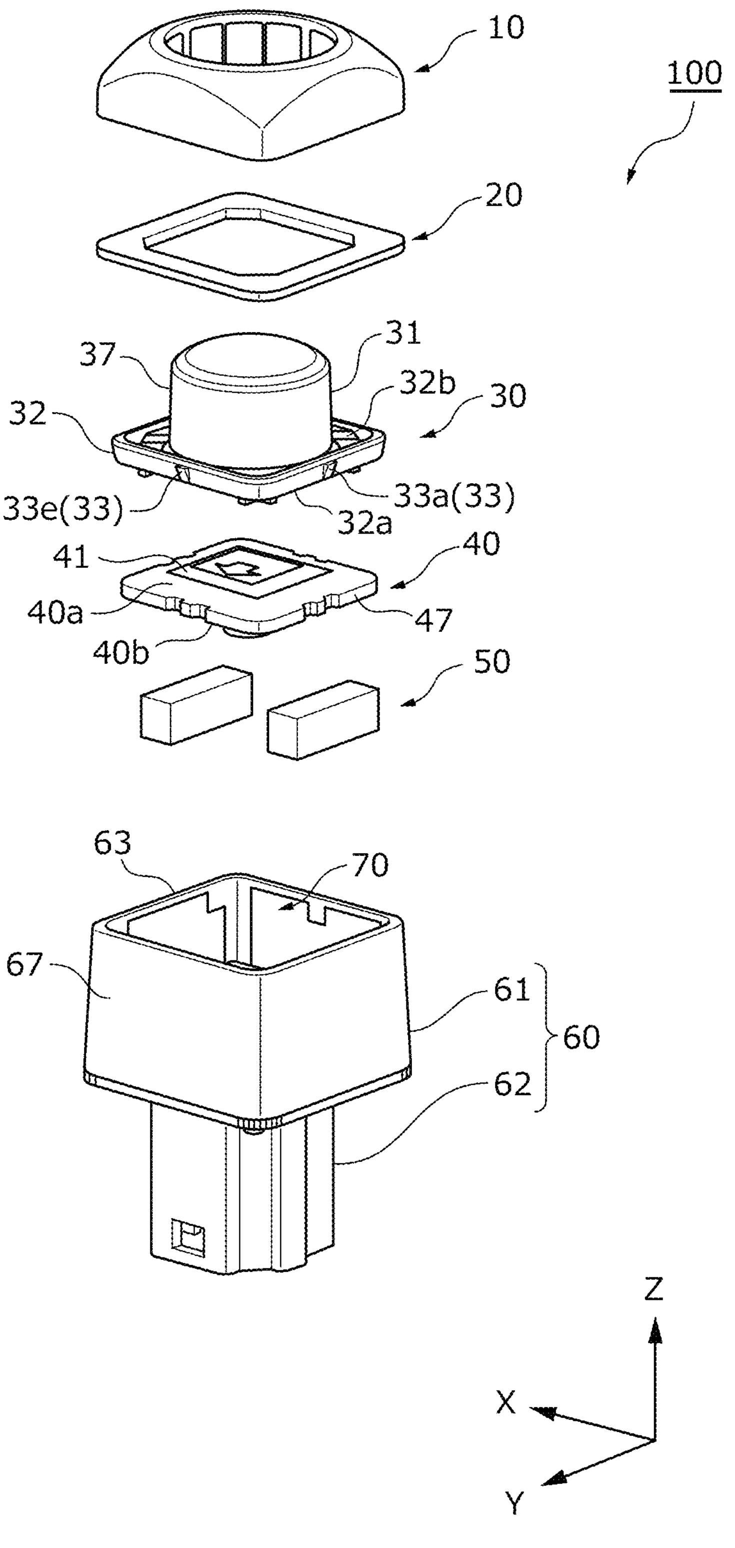
FIG. 2 is an exploded perspective view of the vehicular camera according to the first embodiment.
Figure 3A:
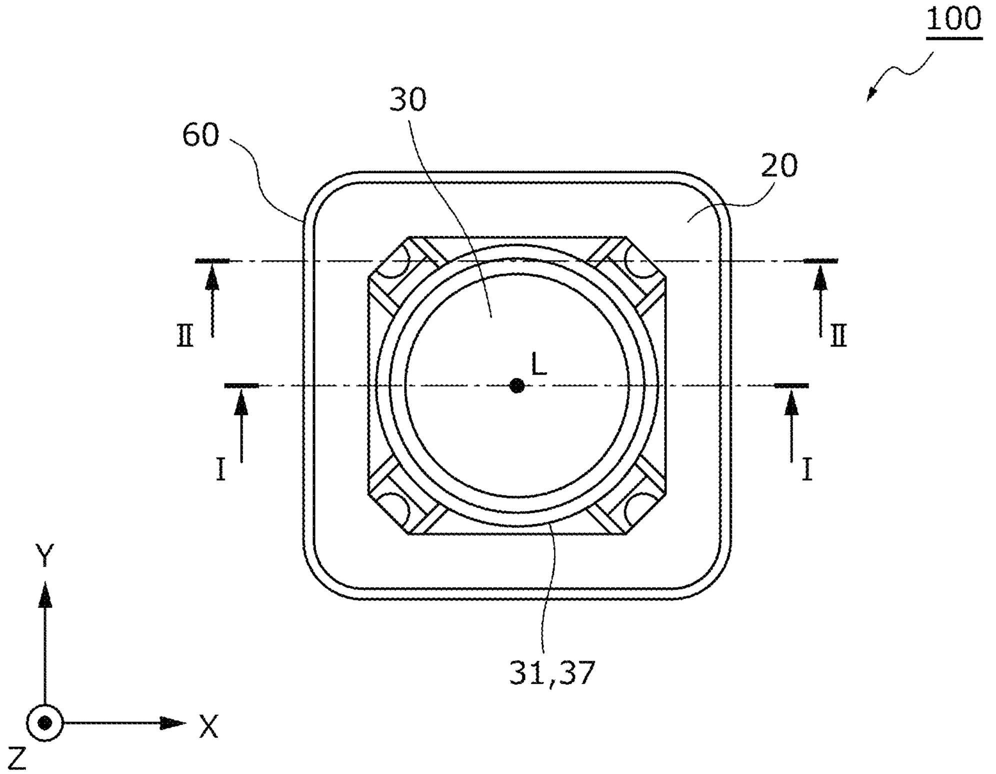
FIG. 3A is a top view of the vehicular camera according to the first embodiment.
Figure 3B:
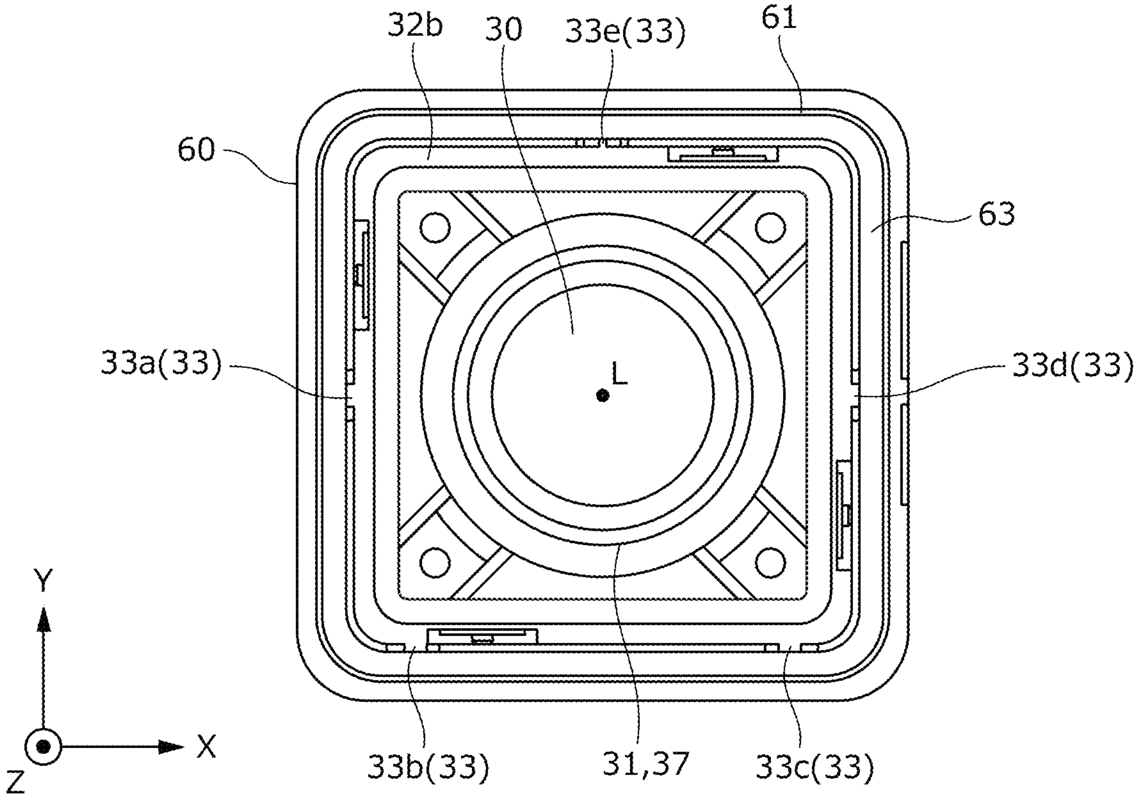
FIG. 3B is a diagram illustrating a state in which a ring member is removed in FIG. 3A.

FIG. 1A is a top perspective view of the vehicular camera 100 according to a first embodiment. FIG. 1B is a bottom perspective view of the vehicular camera 100 according to the first embodiment. FIG. 2 is an exploded perspective view of the vehicular camera 100 according to the first embodiment. FIG. 3A is a top view of the vehicular camera 100 according to the first embodiment, and FIG. 3B is a diagram illustrating a state in which a ring member 20 to be described later is removed in FIG. 3A. Coordinates including an X axis along one side of the vehicular camera 100, a Y axis orthogonal to the X axis and along another side of the vehicular camera 100, and a Z axis orthogonal to the X axis and the Y axis and along a height direction of the vehicular camera 100 are defined, and are used in the following description.

As illustrated in FIGS. 12 to 14, the vehicular camera 100 is an imaging apparatus that is provided at front and rear ends, left and right side surfaces, and the like of the vehicle body of the vehicle, and captures (photographs) images of the inside and outside of the vehicle body of the vehicle. In recent years, development of the vehicular camera 100 has become active in response to demands for improvements in vehicle safety, introduction of autonomous driving functions, and the like.

The vehicular camera 100 according to the present embodiment includes a cap 10, the ring member 20, a lens unit 30, a circuit board 40, an image sensor 41, a heat conductive member 50 (see FIG. 2), and a housing 60. The cap 10 is a member that is attached to the ring member 20 and protects the lens unit 30. In FIG. 3A, illustration of the cap 10 is omitted.

The ring member 20 is implemented by a rectangular annular member having a flat plate shape in a planar view (a line of sight when a vehicular camera 100 is viewed along an XY plane orthogonal to the Z axis, the same applies hereinafter), and is welded to the lens unit 30 and the housing 60 by laser welding. An inner peripheral surface of the ring member 20 faces an outer peripheral surface of a first tubular portion 37 (to be described below) that constitutes a lens barrel 31 of the lens unit 30. An inner diameter of ring member 20 has a length that allows the first tubular portion 37 (the lens barrel 31) of the lens unit 30 to be inserted.

The ring member 20 is formed of a first resin having predetermined light transmissivity. The first resin is made of a material containing a light-transmissive resin. For example, the light-transmissive resin includes a polyester resin, a polyolefin resin, a polyamide resin, a vinyl chloride resin, and a fluorine resin. As the polyester resin, polybutylene terephthalate (PBT), polyethylene terephthalate (PET), or the like can be used. As the polyolefin resin, polyethylene, polypropylene, or the like can be used. One type of light-transmissive resin or a plurality of types of light-transmissive resins may be used. In addition, a coloring material, a filler, or both may be contained in a main light-transmissive resin as long as a transmission performance of a certain level or more can be achieved.

The light transmissivity of the first resin is, for example, a light transmittance of 20% or more with respect to light having a wavelength of 1070 nm which is a wavelength of laser light used for the laser welding. In addition, the light transmissivity of the first resin is, for example, a light transmittance of 0% or more and 5% or less with respect to light of 350 nm to 800 nm which is a wavelength range of visible light.

Although the ring member 20 has a flat rectangular annular shape in the present embodiment, the shape is not limited thereto, and a welded portion has a flat plate shape. Accordingly, the shape is not limited to a polygonal shape such as a rectangular annular shape, and may be a circular annular shape or an annular shape other than the circular annular shape such as an elliptical annular shape. In addition, steps, thicknesses, and the like may not be uniform in portions other than the welded portion.

The lens unit 30 includes the first tubular portion 37 and at least one lens (not shown). The first tubular portion 37 constitutes the lens barrel 31 having a cylindrical shape and has a first tubular shape, and the lens is disposed inside the first tubular portion 37. The first tubular portion 37 has a cylindrical shape, and holds a lens group including, for example, a plurality of lenses inside the first tubular portion 37. The respective lenses in the lens group are arranged in a state in which optical axes L (axes extending in a direction perpendicular to the paper surface of FIG. 3A and along the Z axis) are aligned with each other, and constitute the lens group used for capturing images of the inside and outside of the vehicle body of the vehicle.

The lens unit 30 has a flange-shaped flange portion 32 (see FIG. 2) protruding from the outer peripheral surface toward the outside of the first tubular portion 37. The flange portion 32 is disposed on the outside of the first tubular portion 37 to extend outward with reference to the optical axis L over an entire periphery around the optical axis L, and a cross section thereof along a radial direction has a quadrilateral shape. The flange portion 32 is located in the vicinity of an opening of an internal space of the housing 60 to be described later, and protrudes toward an inner peripheral surface of a housing side wall 67 (see FIG. 2) of the housing 60. At least a part of the flange portion 32 is joined to the housing 60 via the ring member 20. The relation between the lens unit 30 and the housing 60 will be described later.

In addition, the flange portion 32 is disposed on an inner side in the radial direction orthogonal to the optical axis L with respect to a large-diameter tubular portion 61 to be described later of the housing 60, and has a ring-shaped first surface 32*a* facing the image sensor 41 and a ring-shaped second surface 32*b* opposite to the first surface 32*a*.

At least the second surface 32*b* of the flange portion 32 in the lens unit 30 is formed of a second resin having a first light absorptivity. The second resin is made of a material containing a light absorbing resin. As the light absorbing resin, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin can be used. One type of light absorbing resin or a plurality of types of light absorbing resins may be used. A main light absorbing resin may contain an absorbent that absorbs laser light, a coloring material, or both.

The first light absorptivity of the second resin is, for example, a light absorptance of 95% or more with respect to light in a wavelength range of 350 nm to 1200 nm.

When the second surface 32*b* of the flange portion 32 is made of the second resin, transmission of light into the internal space can be reduced. That is, the transmission of light from the outside of the vehicular camera 100 to the inside of the vehicular camera 100 can be reduced. Therefore, halation of the image sensor 41 due to transmitted light can be prevented. The entire flange portion 32 or the entire lens unit 30 may be formed of the second resin.

Further, the lens unit 30 includes a protruding portion 33 that protrudes in an orthogonal direction (in other words, the radial direction) orthogonal to the optical axis L of the lens of the lens unit 30 in order to perform positioning with respect to the housing 60. As illustrated in FIGS. 2 and 3B, the protruding portion 33 is formed on end portions of the flange portion 32 in the radial direction. In the present embodiment, the protruding portion 33 includes five protruding portions, that is, protruding portions 33*a*, 33*b*, 33*c*, 33*d*, and 33*e*. These protruding portions are formed on all four sides of the quadrilateral shape of the flange portion 32. Specifically, the three protruding portions 33*a*, 33*d*, and 33*e* are respectively formed on different sides of the flange portion 32, and the two protruding portions 33*b* and 33*c* are formed on a side different from the sides on which the protruding portions 33*a*, 33*d*, and 33*e* are formed. Details of the protruding portion 33 will be described later.

The circuit board 40 includes the image sensor 41 that is disposed in the internal space of the housing 60 and captures an image of light transmitted through the lens unit 30. The circuit board 40 includes a first surface 40*a* and a second surface 40*b* opposite to the first surface 40*a*, and includes an end surface 47 between the first surface 40*a* and the second surface 40*b*. However, two or more circuit boards may be provided.

The image sensor 41 is disposed on the optical axis L of the at least one lens of the lens unit 30. The image sensor 41 is mounted on the first surface 40*a* of the circuit board 40, and can easily guide light from the outside to the image sensor 41. The image sensor 41 has sensitivity to light in a wavelength range of, for example, 400 nm to 1000 nm.

The heat conductive member 50 is disposed adjacent to the circuit board 40 in the internal space of the housing 60, and serves to dissipate heat generated from electronic components such as the circuit board 40 to the outside. The heat conductive member 50 is made of a material having predetermined heat conductivity, such as a heat dissipation grease, a silicone-based sheet, a non-silicone-based sheet, and a heat conductive gel, but the type thereof is not limited.

The housing 60 is a tubular member having the internal space, and serves to directly, in some cases, indirectly support the lens unit 30, and accommodate at least the circuit board 40 and the image sensor 41. The housing 60 includes the large-diameter tubular portion 61 having a second tubular shape along the optical axis L and a small-diameter tubular portion 62 having a third tubular shape along the optical axis L. The large-diameter tubular portion 61 constituting a second tubular portion has a larger cross-sectional area than that of the small-diameter tubular portion 62 constituting a third tubular portion, and has a rectangular cross section. The large-diameter tubular portion 61 accommodates at least the heat conductive member 50 and the image sensor 41 therein. The small-diameter tubular portion 62 mainly accommodates a connector 80 that secures electrical connection with the outside of the vehicular camera 100 (see FIG. 4A). The large-diameter tubular portion 61 and the small-diameter tubular portion 62 may be integrally formed by using a resin to be described later, and the large-diameter tubular portion 61 and the small-diameter tubular portion 62 prepared individually in advance may be joined by a method such as welding or screwing. Although the housing 60 has a rectangular tubular shape in the present embodiment, the shape is not limited thereto, and may be a polygonal tubular shape other than the rectangular tubular shape, a circular or elliptical tubular shape, or another tubular shape.

An end surface 63 (see FIGS. 2 and 3B) of the large-diameter tubular portion 61 to be described later of the housing 60 is formed of a third resin having a second light absorptivity. The third resin is made of a material containing a light absorbing resin. As the light absorbing resin, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin can be used. One type of light absorbing resin or a plurality of types of light absorbing resins may be used. A main light absorbing resin may contain an absorbent that absorbs laser light, a coloring material, or both.

The second light absorptivity of the third resin is, for example, a light absorptance of 95% or more with respect to the light in the wavelength range of 350 nm to 1200 nm.

Since the housing 60 is made of a material containing a light absorbing resin, the transmission of light into the internal space of the housing 60 can be reduced. That is, the transmission of light from the outside of the vehicular camera 100 to the inside of the vehicular camera 100 can be reduced. Therefore, halation of the image sensor 41 due to transmitted light can be prevented. The entire large-diameter tubular portion 61 or the entire housing 60 may be formed of the third resin.

Further, the vehicular camera 100 according to the embodiment includes a metal shield 70 that is disposed to surround the circuit board 40 in the internal space of the housing 60. The shield 70 serves to shield electromagnetic waves coming from the outside of the housing 60 and electromagnetic waves to be radiated in the internal space. The shield 70 corresponds to a first shield 70 in a second embodiment, and will be described in the second embodiment.

Figure 4A:
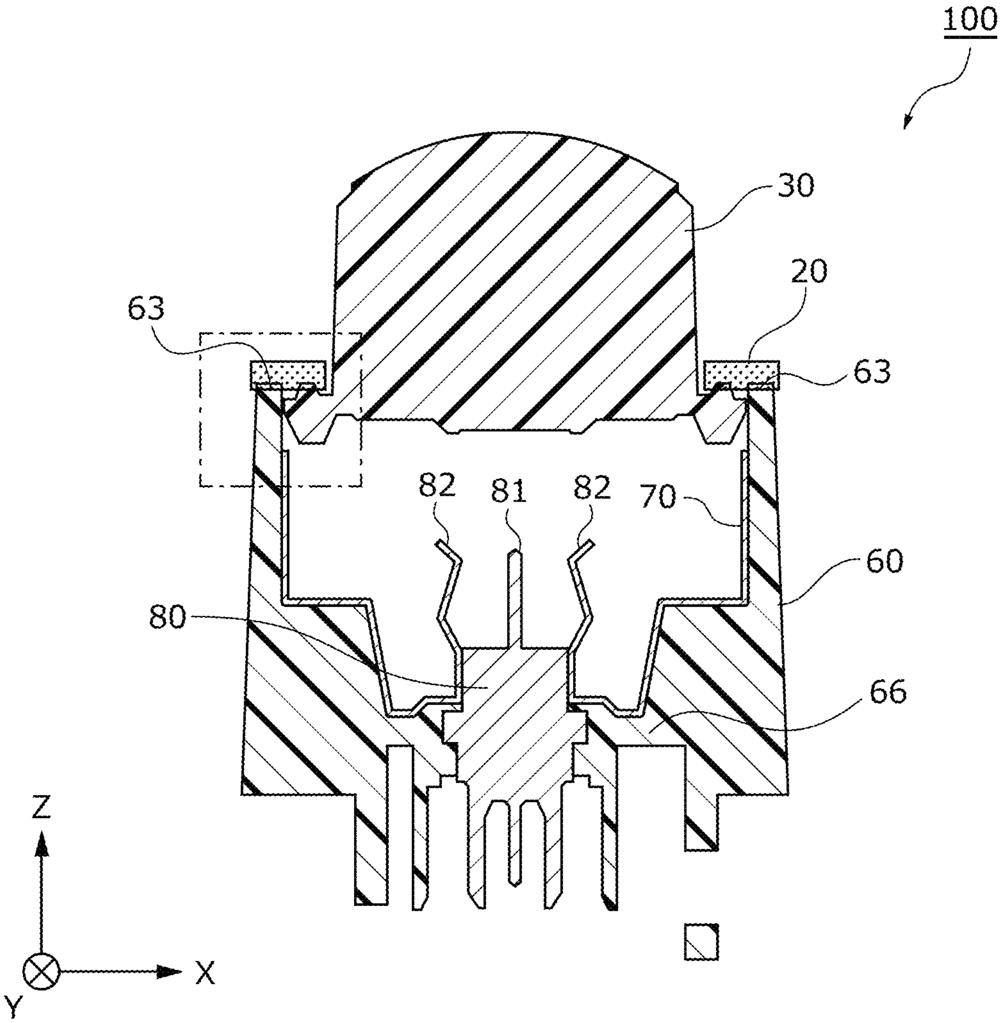
FIG. 4A is a cross-sectional view taken along a line I-I in FIG. 3A.
Figure 4B:
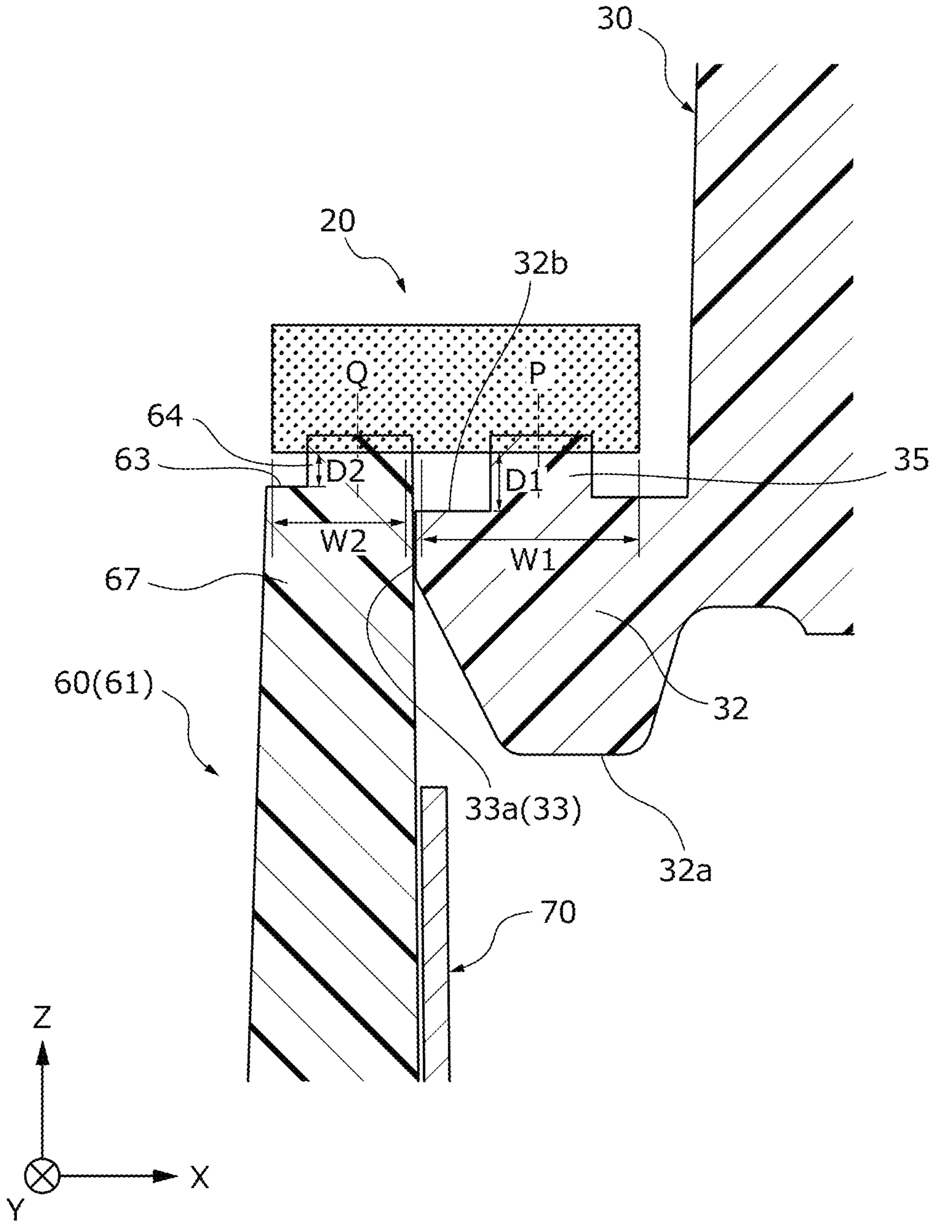
FIG. 4B is an enlarged view of a portion surrounded by a dashed line in FIG. 4A.
Figure 5A:
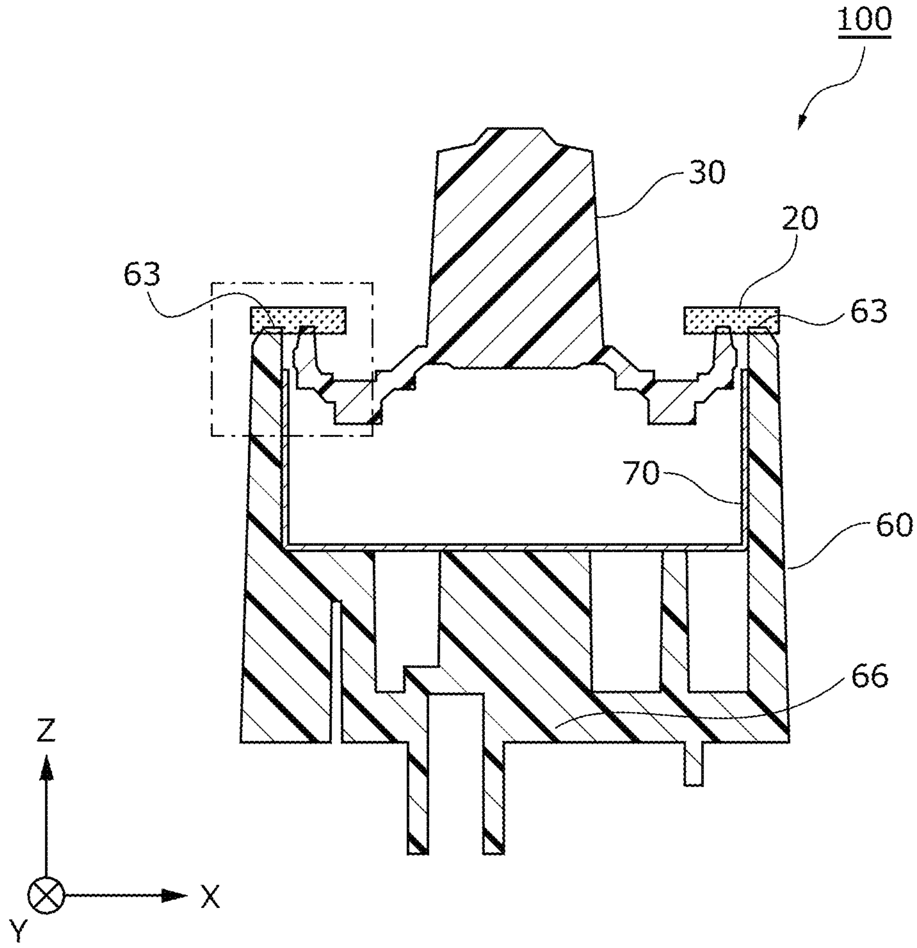
FIG. 5A is a cross-sectional view taken along a line II-II in FIG. 3A.
Figure 5B:
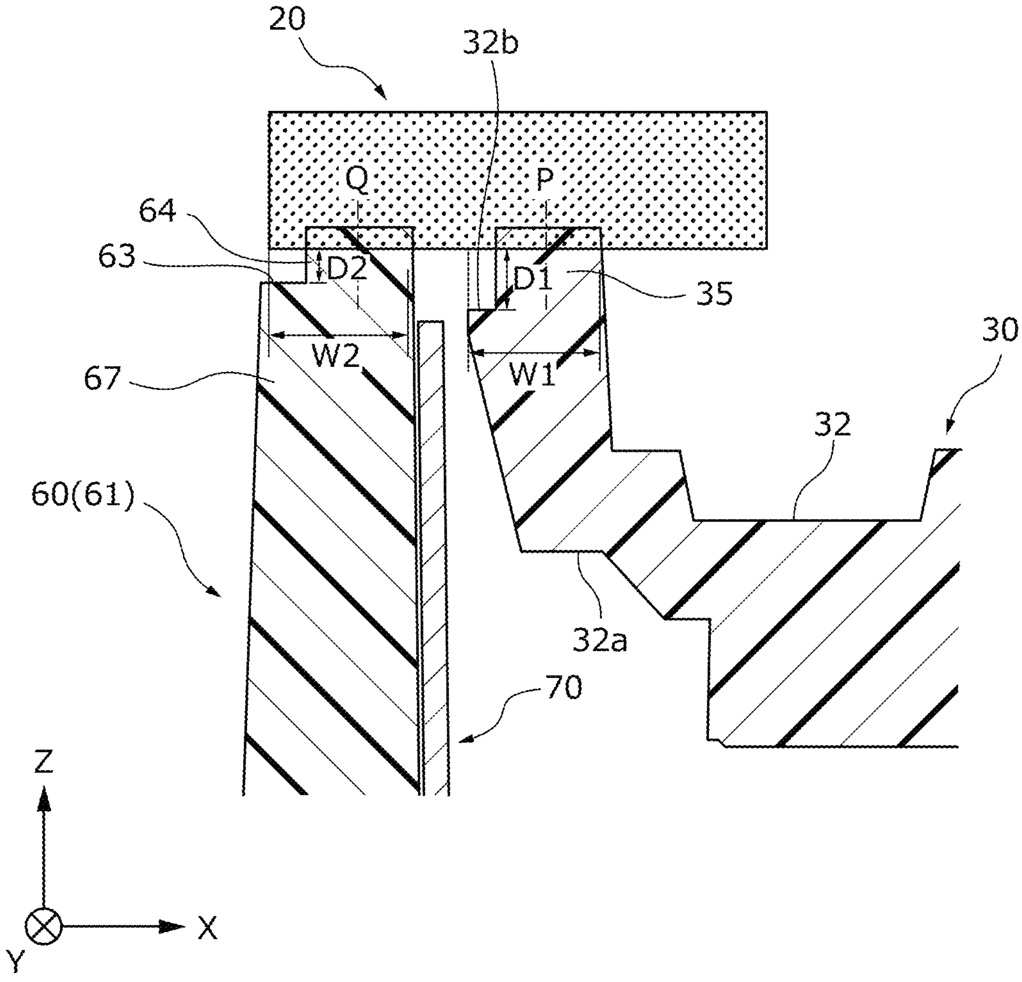
FIG. 5B is an enlarged view of a portion surrounded by a dashed line in FIG. 5A.

Next, a method of welding the lens unit 30 and the housing 60 to the ring member 20 and a configuration of the welded portion will be described. FIG. 4A is a cross-sectional view taken along a line I-I in FIG. 3A. FIG. 4B is an enlarged view of a portion surrounded by a dashed line in FIG. 4A. FIG. 5A is a cross-sectional view taken along a line II-II in FIG. 3A. FIG. 5B is an enlarged view of a portion surrounded by a dashed line in FIG. 5A.

A protruding portion 33*a* of the lens unit 30 is visible in FIGS. 4A and 4B. As also illustrated in FIG. 3B, the protruding portion 33*a* comes into contact with an inner surface of the housing side wall 67 of the large-diameter tubular portion 61 of the housing 60, and serves to position the lens unit 30 with respect to the housing 60. Therefore, there is no gap between the lens unit 30 and the housing 60. On the other hand, the protruding portion 33 of the lens unit 30 is not visible in FIGS. 5A and 5B. There is a gap between the lens unit 30 and the housing 60. In FIGS. 4A and 5A, illustration of the cap 10, the circuit board 40, and the heat conductive member 50 is omitted. In addition, the small-diameter tubular portion 62 of the housing 60 is shown to be short so that a part thereof is omitted.

In the present embodiment, the flange portion 32, which is a lower end portion of the lens unit 30, is disposed at a portion of an upper opening of the housing 60, and a part of the flange portion 32 is welded to the ring member 20 described above. Further, an upper end portion of the housing 60 is also welded to the ring member 20, and as a result, the housing 60 and the lens unit 30 are integrally assembled via the ring member 20.

FIGS. 4B and 5B illustrate the above configuration in detail. A lower surface of the ring member 20 is welded to the flange portion 32 of the lens unit 30. The flange portion 32 includes, on an upper surface thereof, the second surface 32*b* facing the ring member 20. The second surface 32*b* is a surface in a region facing the ring member 20 in an optical axis direction, and has a width W1 in the orthogonal direction.

On the other hand, the lower surface of the ring member 20 is welded to the upper end portion of the housing 60 (that is, an upper end portion of the housing side wall 67). The upper end portion of the housing 60 includes the end surface 63 welded to the ring member 20. The end surface 63 is a surface in the region facing the ring member 20 in the optical axis direction, and has a width W2 in the orthogonal direction.

In the present embodiment, the lens unit 30 is relatively disposed such that the entire lens unit 30 is located on an inner side of the housing 60 in the orthogonal direction orthogonal to the optical axis. In particular, the second surface 32*b* is relatively disposed such that the second surface 32*b* is located on the inner side with respect to the end surface 63 in the orthogonal direction.

In a general laser welding method, when laser light is irradiated to a light-transmissive resin in a state in which a pressure is applied to the resin, the laser light is transmitted without being absorbed by the light-transmissive resin and is absorbed by a surface of a light absorbing resin. The energy of the absorbed laser light is converted into heat, and the surface of the light absorbing resin is heated. Further, a surface of the light-transmissive resin in contact with the surface of the light absorbing resin is also heated due to heat conduction. Accordingly, the resin is melted at a boundary surface between the light absorbing resin and the light-transmissive resin. When the laser light irradiation is stopped, the melted resin is solidified and both resins are welded.

In the general welding of the lens unit 30 and the housing 60 to the ring member 20, first, the ring member 20 is irradiated with the laser light in a state of being pressed against the second surface 32*b* of the lens unit 30, and the lower surface of the ring member 20 is welded to the second surface 32*b*. Thereafter, the ring member 20 is irradiated with the laser light in a state of being pressed against the end surface 63 of the housing 60, and the lower surface of the ring member 20 is welded to the end surface 63.

However, since the molding accuracy of a member (the molding accuracy of a resin material) has a limit, it is difficult to mold the surface of the ring member 20, the second surface 32*b*, and the end surface 63 into a perfect flat surface, and at least one of the surfaces inevitably has a certain amount of undulations, irregularities and the like. Therefore, it is not easy to appropriately achieve the laser welding between flat surfaces.

Therefore, in the present embodiment, a first welding rib 35 in contact with the ring member 20 is formed on the second surface 32*b* of the flange portion 32 in advance, and a second welding rib 64 in contact with the ring member 20 is formed on the end surface 63 in advance. Similarly to the second surface 32*b*, the first welding rib 35 is made of the second resin having the first light absorptivity, protrudes in a direction opposite to the first surface 32*a*, and is disposed over the entire periphery of the flange portion 32 around the optical axis L. Similarly to the end surface 63 of the housing 60, the second welding rib 64 is made of the third resin having the second light absorptivity, protrudes along a direction of the optical axis L, and is disposed over the entire periphery of the end surface 63 around the optical axis L. In the present embodiment, although the first welding rib 35 and the second welding rib 64 are implemented by protrusions each having a rectangular cross section, the shape is not particularly limited.

At the time of the laser welding, by melting the first welding rib 35 and the second welding rib 64 with a predetermined melting amount (for example, about 0.1 mm to 0.2 mm), the ring member 20 is welded to the first welding rib 35 and the second welding rib 64. Accordingly, appropriate welding can be achieved while restraining the influence of the undulations, the irregularities, and the like described above.

However, providing these ribs causes other problems. In FIGS. 4B and 5B, the first welding rib 35 and the second welding rib 64 are shown in the shape of the protrusions before the laser welding, but in the laser welding, the first welding rib 35 and the second welding rib 64 are melted and deformed, and so-called burrs (that is, resin overflow phenomenon) are generated from melted portions.

The burrs are inevitably generated in the molding and welding of the resin, and the burr do not necessarily cause a problem. However, there is a possibility that phenomena such as contact of the generated burrs with other members and thermal influence may cause a problem.

In particular, in the present embodiment, two welded portions are disposed close to each other in a narrow range. Therefore, when the burr generated from the first welding rib 35 by the welding described above spreads to an outer side in the orthogonal direction and reaches the housing 60, there is a possibility that the welding between the ring member 20 and the end surface 63 is hindered and the welding between the ring member 20 and the housing 60 becomes defective.

Therefore, in the present embodiment, the first welding rib 35 is designed such that a first burr 36 generated from the first welding rib 35 does not reach the end surface 63 at least as the first welding rib 35 and the ring member 20 are welded. Although this design is performed based on factors such as a position, an outer dimension, the volume, a shape, the type of resin, a welding temperature, and a welding time of the first welding rib 35, this design can be determined based on welding results, simulations, and the like of a plurality of samples. Accordingly, the reliable welding can be achieved without depending on the shape accuracy of the second surface 32*b* and the ring member 20, and the first burr 36 generated from the first welding rib 35 can be restrained from adversely affecting the welding between the ring member 20 and the housing 60.

The design described above is performed at both positions in FIGS. 4B and 5B, but it is desirable to perform the design more strictly at a position at which the first welding rib 35 and the protruding portion 33*a* overlap as particularly illustrated in FIG. 4B. As described above, at the position illustrated in FIG. 4B, the protruding portion 33*a* is in contact with the inner surface of the housing side wall 67 of the housing 60, there is no gap between the flange portion 32 of the lens unit 30 and the inner surface of the housing side wall 67, and a space between the first welding rib 35 and the second welding rib 64 is closed. Therefore, it is estimated that there is no place for escape of the first burr generated by melting the first welding rib 35, and the first burr easily reaches the second welding rib 64 and the end surface 63. Accordingly, it is desirable to design the first welding rib 35 such that the first burr generated from the first welding rib 35 does not reach the end surface 63 at the position overlapping the protruding portion 33. Accordingly, it is possible to restrain the first burr from easily reaching the end surface 63 at the position overlapping the protruding portion 33.

According to the configuration described above, the reliable welding can be achieved without depending on the shape accuracy of the second surface 32*b* of the flange portion 32 of the lens unit 30 and the ring member 20, the first burr generated from the first welding rib 35 can be restrained from adversely affecting the welding between the ring member 20 and the housing 60, and as a result, the assembling accuracy of the vehicular camera 100 can be improved.

In this case, since the second surface 32*b* is in contact with the end surface 63, the first burr eventually does not protrude from an outer edge of the second surface 32*b*. Further, the volume of the first burr generated by the welding may be predicted, and the first welding rib 35 may be designed such that the volume is smaller than the space between the first welding rib 35 and the second welding rib 64.

Further, as illustrated in FIG. 3B, the protruding portion 33 of the lens unit 30 includes five protruding portions, that is, the protruding portions 33*a*, 33*b*, 33*c*, 33*d*, and 33*e*. These protruding portions are formed on all four sides of the quadrilateral shape of the flange portion 32. The protruding portion 33 may include at least three protruding portions respectively disposed on different sides of the flange portion 32, which are referred to as a first protruding portion, a second protruding portion, and a third protruding portion. Accordingly, the lens unit 30 can be stably fixed to the housing 60 by using the three protruding portions, that is, the first protruding portion, the second protruding portion, and the third protruding portion.

Further, the protruding portion 33 can be formed by a rib disposed along the direction of the optical axis L. Accordingly, the protruding portion 33 can also be easily formed when the lens unit 30 is formed.

On the other hand, the protruding portion 33 does not exist at the position in FIG. 5B, a gap exists between the flange portion 32 of the lens unit 30 and the inner surface of the housing side wall 67, and the space between the first welding rib 35 and the second welding rib 64 is not closed. Therefore, the first burr generated by melting the first welding rib 35 can flow into the gap, and it is estimated that the first burr is less likely to reach the second welding rib 64 and the end surface 63 than at the position in FIG. 4B. However, it is desirable to design the first welding rib 35 such that the first burr also does not reach the end surface 63 at the position in FIG. 5B.

As described above, there are various factors for designing the first welding rib 35, and as a suitable example of the position of the first welding rib 35, the first welding rib 35 is located in a region close to the inner side on the second surface 32*b* in the radial direction orthogonal to the optical axis. Specifically, as illustrated in FIGS. 4B and 5B, a center line P of the first welding rib 35 in the radial direction is located in the region close to the inner side on the second surface 32*b* in the width W1 of the second surface 32*b*. Accordingly, the first burr generated from the first welding rib 35 is less likely to reach the end surface 63. As illustrated in FIG. 5B, such a configuration also includes a configuration in which an inner side surface of the first welding rib 35 in the orthogonal direction coincides with an inner end portion of the second surface 32*b* in the orthogonal direction.

Further, the second welding rib 64 in contact with the ring member 20 is formed at an upper end portion of the end surface 63 of the housing 60. Regarding the second welding rib 64, it is desirable to design the second welding rib 64 such that a second burr generated from the second welding rib 64 does not reach the second surface 32*b*, at the position overlapping the protruding portion 33*a* as particularly illustrated in FIG. 4B as the ring member 20 is welded. When the second burr generated from the second welding rib 64 reaches the end surface 63 welded to the ring member 20, the welding between the ring member 20 and the end surface 63 may be adversely affected. Accordingly, the reliable welding can be achieved without depending on the shape accuracy of the end surface 63 and the ring member 20, and the second burr generated from the second welding rib 64 can be restrained from adversely affecting the welding between the ring member 20 and the lens unit 30.

There are various factors for designing the second welding rib 64, and as a suitable example of a position of the second welding rib 64, the second welding rib 64 is located in a region close to the inner side on the end surface 63 in the radial direction orthogonal to the optical axis. Specifically, as illustrated in FIGS. 4B and 5B, a center line Q of the second welding rib 64 in the orthogonal direction is located in the region close to the inner side on the end surface 63 in the width W2 of the end surface 63. Accordingly, the second burr generated from the second welding rib 64 can be restrained from protruding to the outer side of the housing 60. Further, by adjusting the design of the second welding rib 64, it is possible to simultaneously prevent the second burr from reaching the end surface 63. As illustrated in FIG. 5B, such a configuration also includes a configuration in which an inner side surface of the second welding rib 64 in the orthogonal direction coincides with an inner end portion of the end surface 63 in the orthogonal direction.

Further, it is desirable to adjust the second surface 32*b* and the end surface 63 such that the second surface 32*b* of the lens unit 30 is located at a position relatively farther than the end surface 63 of the housing 60 with respect to the ring member 20. In the examples of FIGS. 4B and 5B, the second surface 32*b* is located below the end surface 63. In other words, it is desirable that a first distance D1 between the ring member 20 and the second surface 32*b* of the flange portion 32 of the lens unit 30 is set to be larger than a second distance D2 between the ring member 20 and the end surface 63 of the large-diameter tubular portion 61 of the housing 60. Accordingly, the first burr generated from the first welding rib 35 is further less likely to reach the end surface 63. This configuration is particularly useful at the position in FIG. 4B at which a space for the escape of the burr is closed.

Figure 6A:
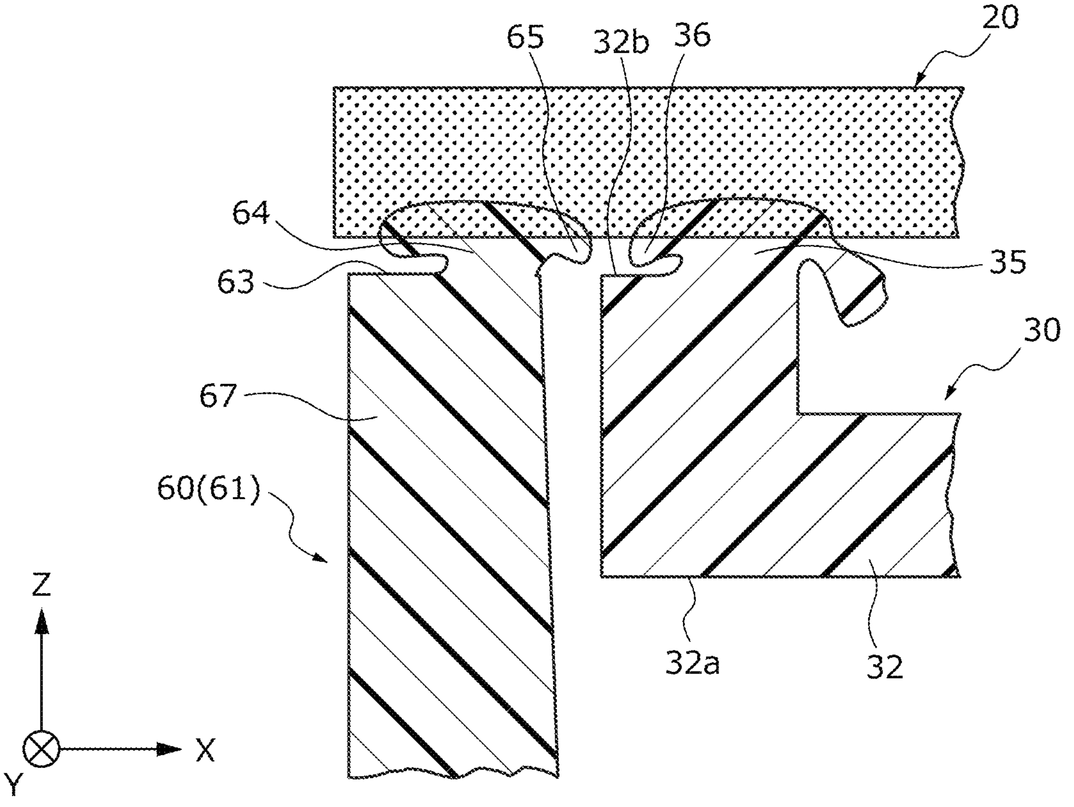
FIG. 6A is a schematic diagram illustrating a welding state obtained by laser welding in which a melting amount of two welding ribs is set to 0.16 mm.

FIG. 6A is a schematic diagram illustrating a welding state obtained by the laser welding in which the melting amount of the first welding rib 35 and the second welding rib 64 is set to 0.16 mm. This diagram illustrates a photograph obtained by capturing an image of an actual sample after the welding by a line diagram. This diagram illustrates a welding state at the position at which the protruding portion 33 does not exist as illustrated in FIG. 5B. A first burr 36 generated from the first welding rib 35 does not reach the end surface 63, and a second burr 65 generated from the second welding rib 64 does not reach the second surface 32*b*. By appropriately setting the melting amount of the ribs, it is possible to achieve the appropriate welding while restraining spreading of the two burrs.

Figure 6B:
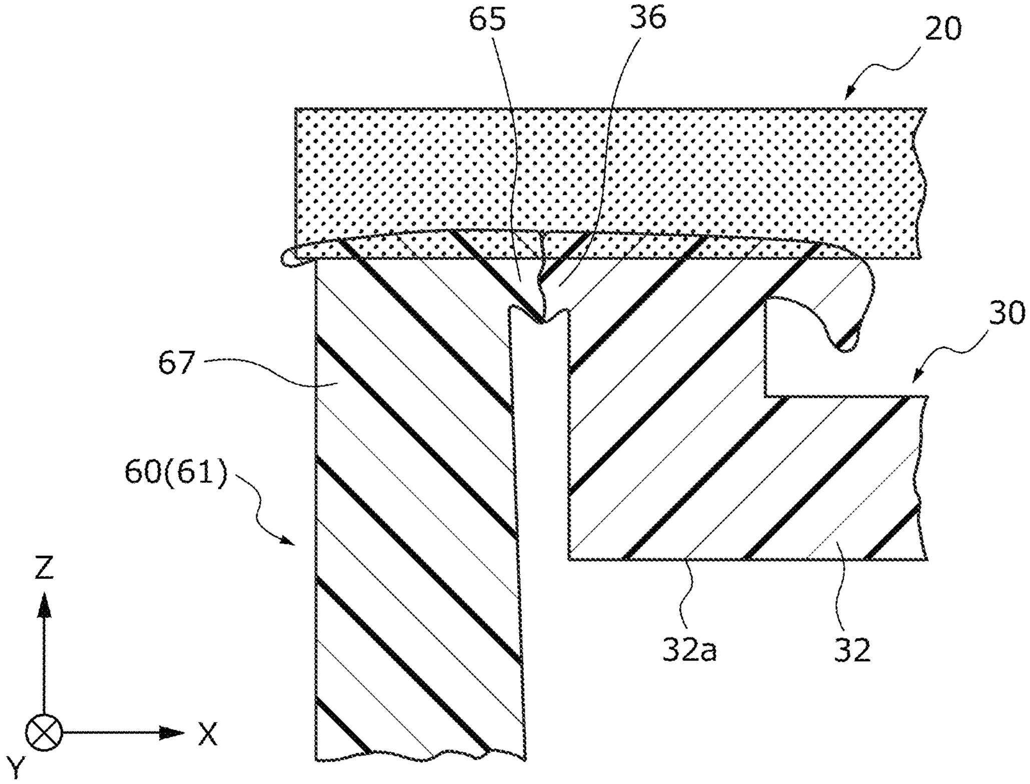
FIG. 6B is a schematic diagram illustrating a welding state obtained by the laser welding in which the melting amount of the two welding ribs is set to 0.25 mm.

On the other hand, FIG. 6B is a schematic diagram illustrating a welding state obtained by the laser welding in which the melting amount of the first welding rib 35 and the second welding rib 64 is set to 0.25 mm. Since the melting amount is too large, the first welding rib 35 and the second welding rib 64 disappear. A large amount of the first burr 36 generated from the first welding rib 35 and a large amount of the second burr 65 generated from the second welding rib 64 are generated and melted together, and the appropriate welding cannot be achieved.

In addition, as illustrated in FIGS. 4A and 5A, the housing 60 includes a base end portion 66 that constitutes a bottom surface portion on an opposite side of the end surface 63, and the image sensor 41 is surrounded by the large-diameter tubular portion 61, the base end portion 66 of the housing 60, the ring member 20, and the lens unit 30. Accordingly, the image sensor 41 can be reliably surrounded by the housing 60, the ring member 20, and the lens unit 30.

In particular, the image sensor 41 is mounted on the circuit board 40, and the image sensor 41 and the circuit board 40 are surrounded by the large-diameter tubular portion 61 of the housing 60, the base end portion 66 of the housing 60, the ring member 20, and the lens unit 30. Further, the connector 80 including terminals (for example, a first terminal 81 and a second terminal 82 illustrated in FIG. 4A) which pass through the outside and the inside of the housing 60 and allow an electric signal to transmit therethrough is disposed on the base end portion 66 of the housing 60, and the terminals of the connector 80 are electrically connected to a circuit of the circuit board 40. Accordingly, it is possible to ensure the electrical connection with the outside while reliably surrounding the image sensor 41 and the circuit board 40 by the housing 60, the ring member 20, and the lens unit 30.

The connector 80 may be a coaxial connector or an STQ having four terminals. Further, the first terminal 81 and the second terminal 82 of the connector 80 may be directly connected to the circuit board 40, or may be indirectly connected thereto. For example, another circuit board may be prepared in addition to the circuit board 40, and the connector 80 may be connected via the another circuit board.

As is clear from the drawings, a cross section of the first tubular portion 37 of the lens unit 30 along the radial direction is a circle, and a cross section of the large-diameter tubular portion 61 of the housing 60 along the radial direction has a quadrilateral shape. Accordingly, the lens unit 30 and the housing 60 can be easily formed.

Further, the first light absorptivity of the second resin may be the same as the second light absorptivity of the third resin. Alternatively, the second resin may be the same resin as the third resin. Accordingly, in the vehicular camera, since the first light absorptivity of the second resin and the second light absorptivity of the third resin are the same, it is not necessary to change the type of laser for the laser welding between the ring member and the housing and the laser welding between the ring member and the lens unit, and the laser welding can be easily performed.

Second Embodiment

Figure 7A:
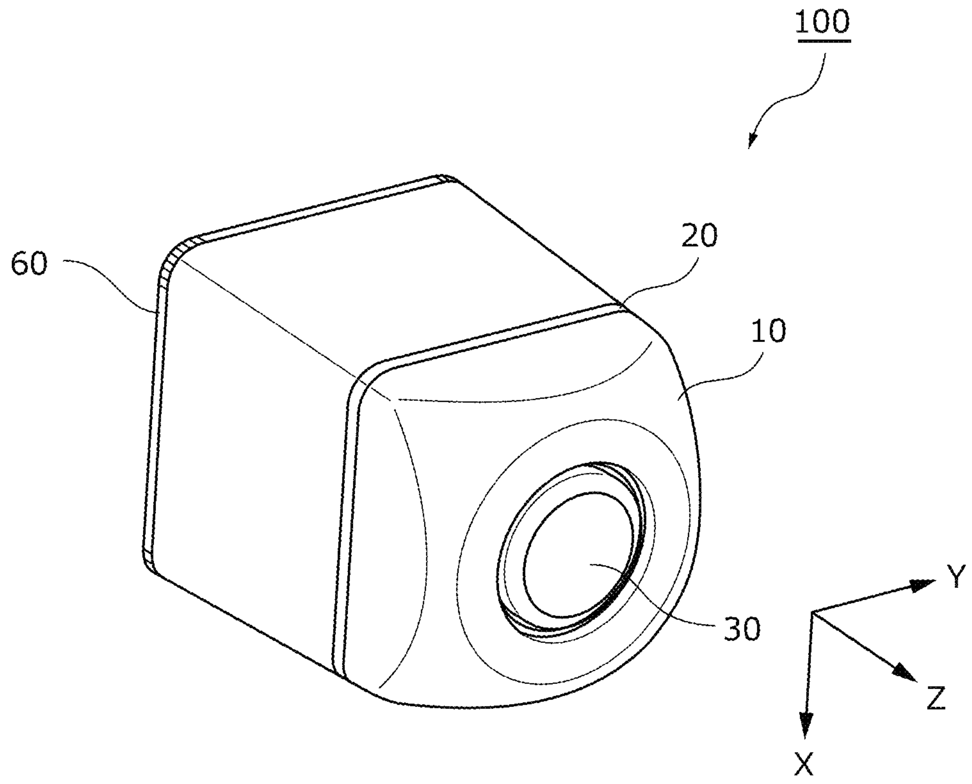
FIG. 7A is a perspective view of a vehicular camera according to a second embodiment.
Figure 7B:
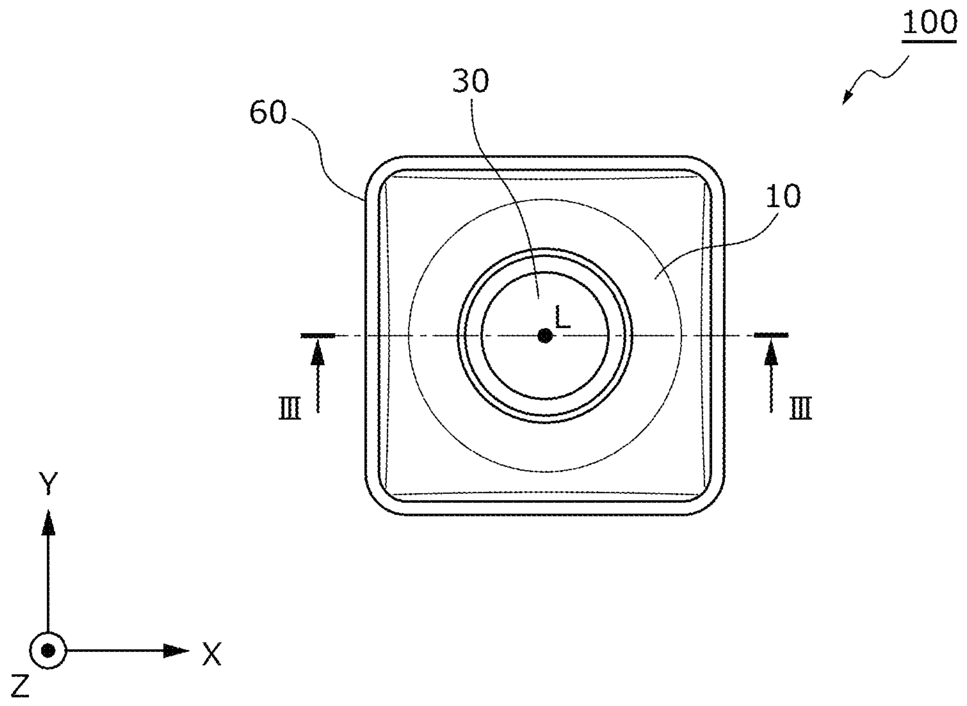
FIG. 7B is a top view of the vehicular camera according to the second embodiment.
Figure 7C:
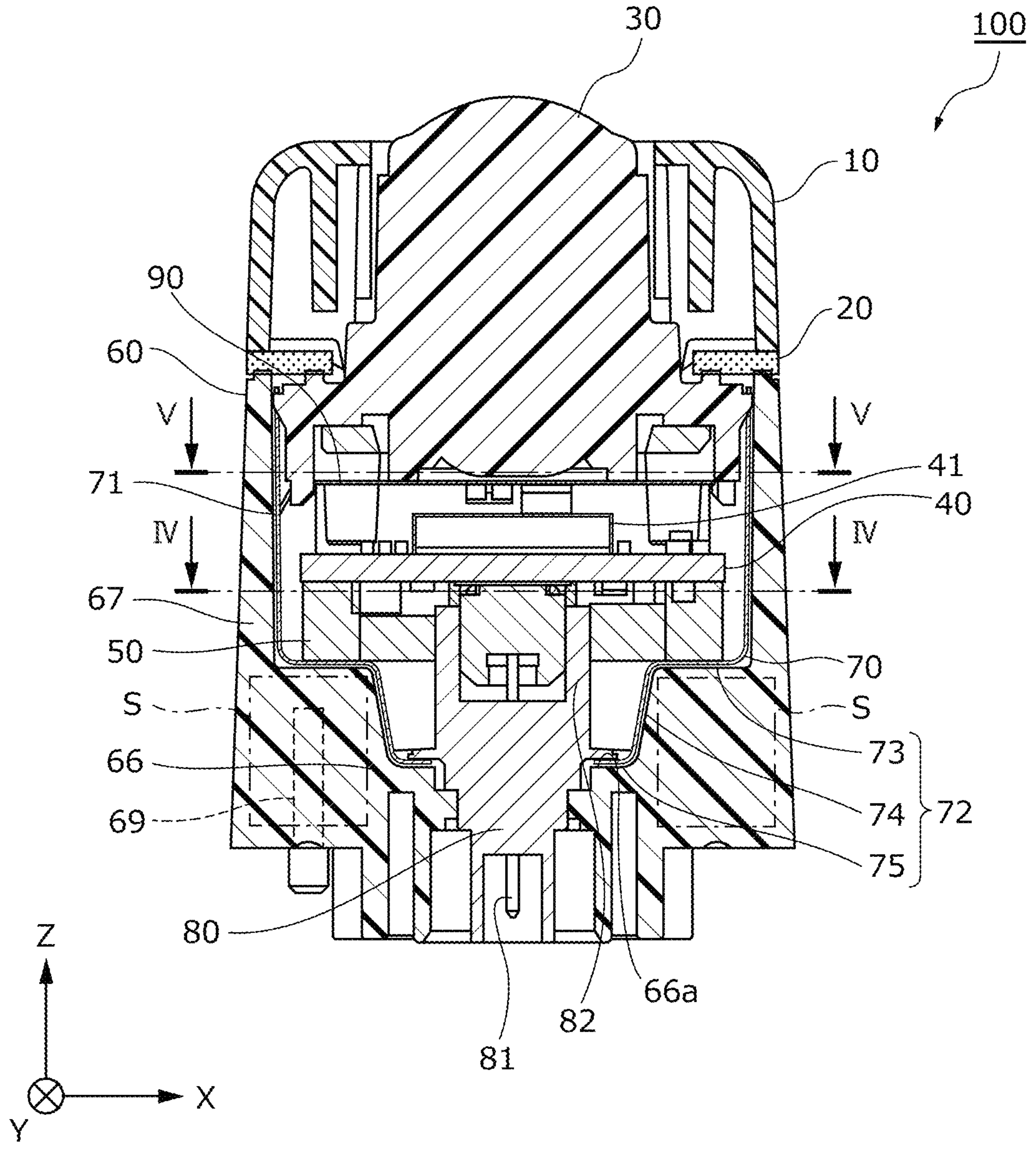
FIG. 7C is an arrow view taken along a line III-III in FIG. 7B.
Figure 7D:
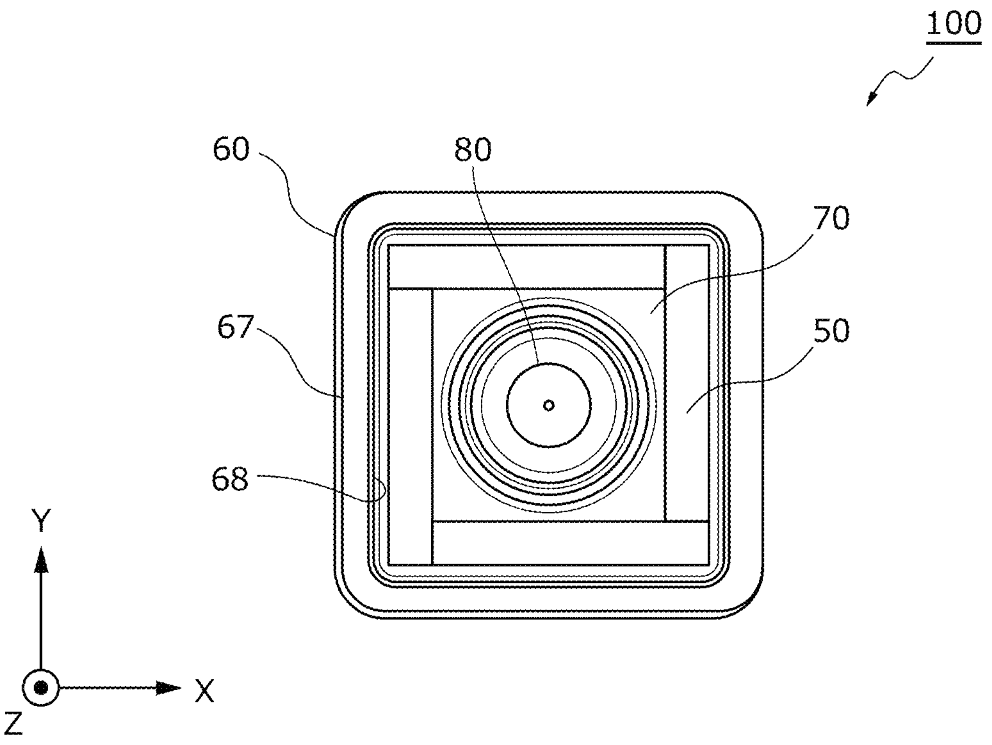
FIG. 7D is an arrow view taken along a line IV-IV in FIG. 7C.
Figure 7E:
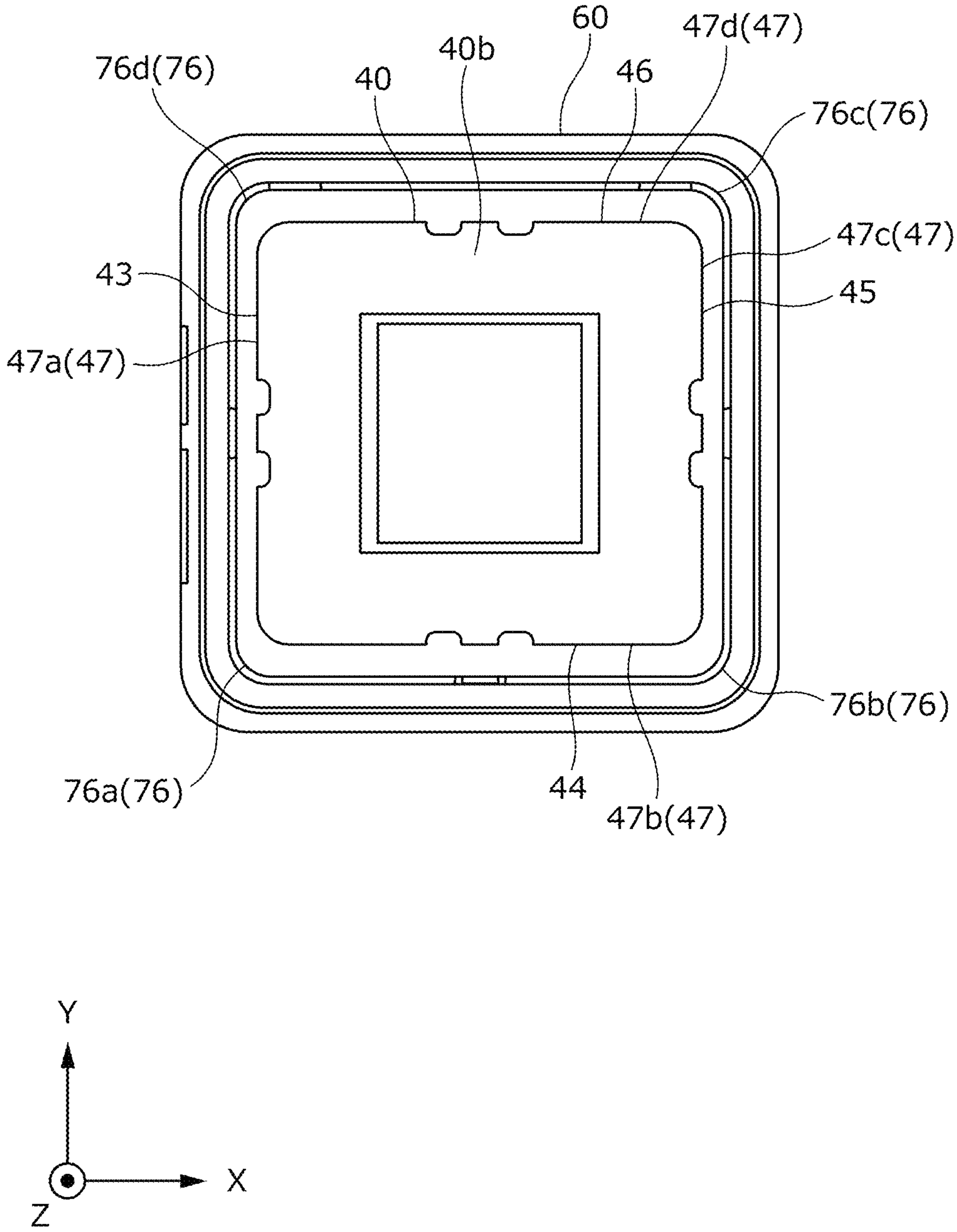
FIG. 7E is a top view of the vehicular camera as viewed from a position directly above a circuit board.
Figure 7F:
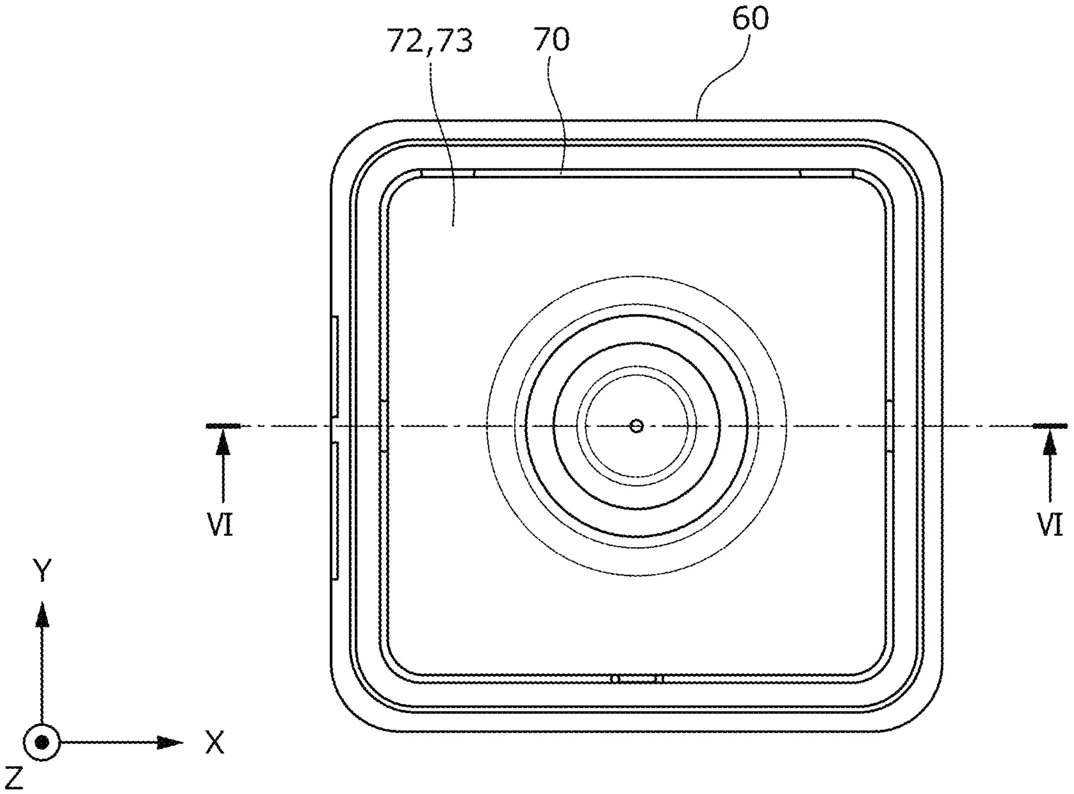
FIG. 7F is a top view in a state in which the circuit board is removed from FIG. 7E.

FIG. 7A is a perspective view of the vehicular camera 100 according to the second embodiment. FIG. 7B is a top view of the vehicular camera 100 according to the second embodiment. FIG. 7C is an arrow view taken along a line III-III in FIG. 7B. FIG. 7D is an arrow view taken along a line IV-IV in FIG. 7C. FIG. 7E is a top view of the vehicular camera 100 as viewed from a position directly above the circuit board 40. FIG. 7F is a top view in a state in which the circuit board 40 is removed from FIG. 7E. The vehicular camera 100 according to the second embodiment has substantially the same configuration as the vehicular camera 100 according to the first embodiment.

FIG. 7E particularly illustrates a shape of the circuit board 40 in detail. The circuit board 40 has a first shape including at least a first side 43, a second side 44, a third side 45, and a fourth side 46 in a planar view. The circuit board 40 according to the embodiment has only the first side 43, the second side 44, the third side 45, and the fourth side 46, and the first shape is a first quadrilateral shape. The quadrilateral shape is a substantially quadrilateral shape, and corners thereof may be rounded.

The end surface 47 of the circuit board 40 includes at least a first end surface 47*a* corresponding to the first side 43, a second end surface 47*b* corresponding to the second side 44, a third end surface 47*c* corresponding to the third side 45, and a fourth end surface 47*d* corresponding to the fourth side 46. The first side 43, the second side 44, the third side 45, and the fourth side 46 can be defined on the first surface 40*a* of the circuit board 40, and similarly, the first side 43, the second side 44, the third side 45, and the fourth side 46 can be defined on the second surface 40*b*.

FIG. 7F illustrates the state in which the circuit board 40 is removed from FIG. 7E, and a first bottom surface portion 73 (a third bottom surface portion 72) of the first shield 70 to be described later appears.

Figure 8A:
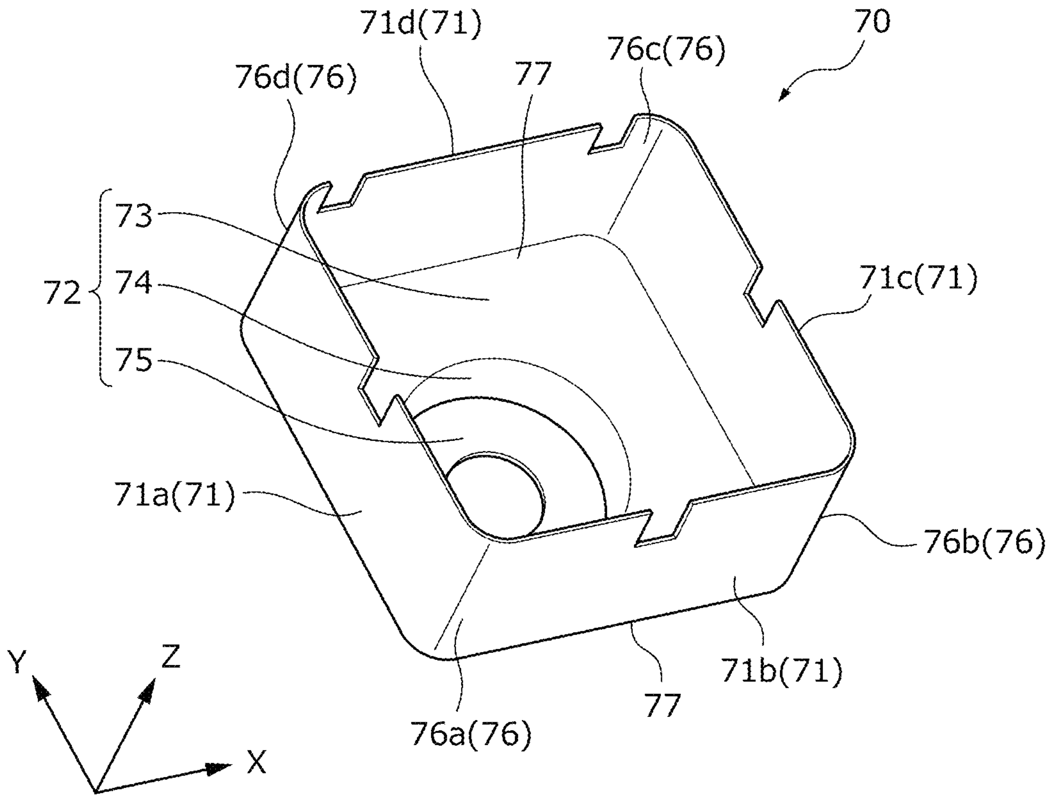
FIG. 8A is a perspective view of a first shield used in the vehicular camera according to the second embodiment as viewed from above.
Figure 8B:
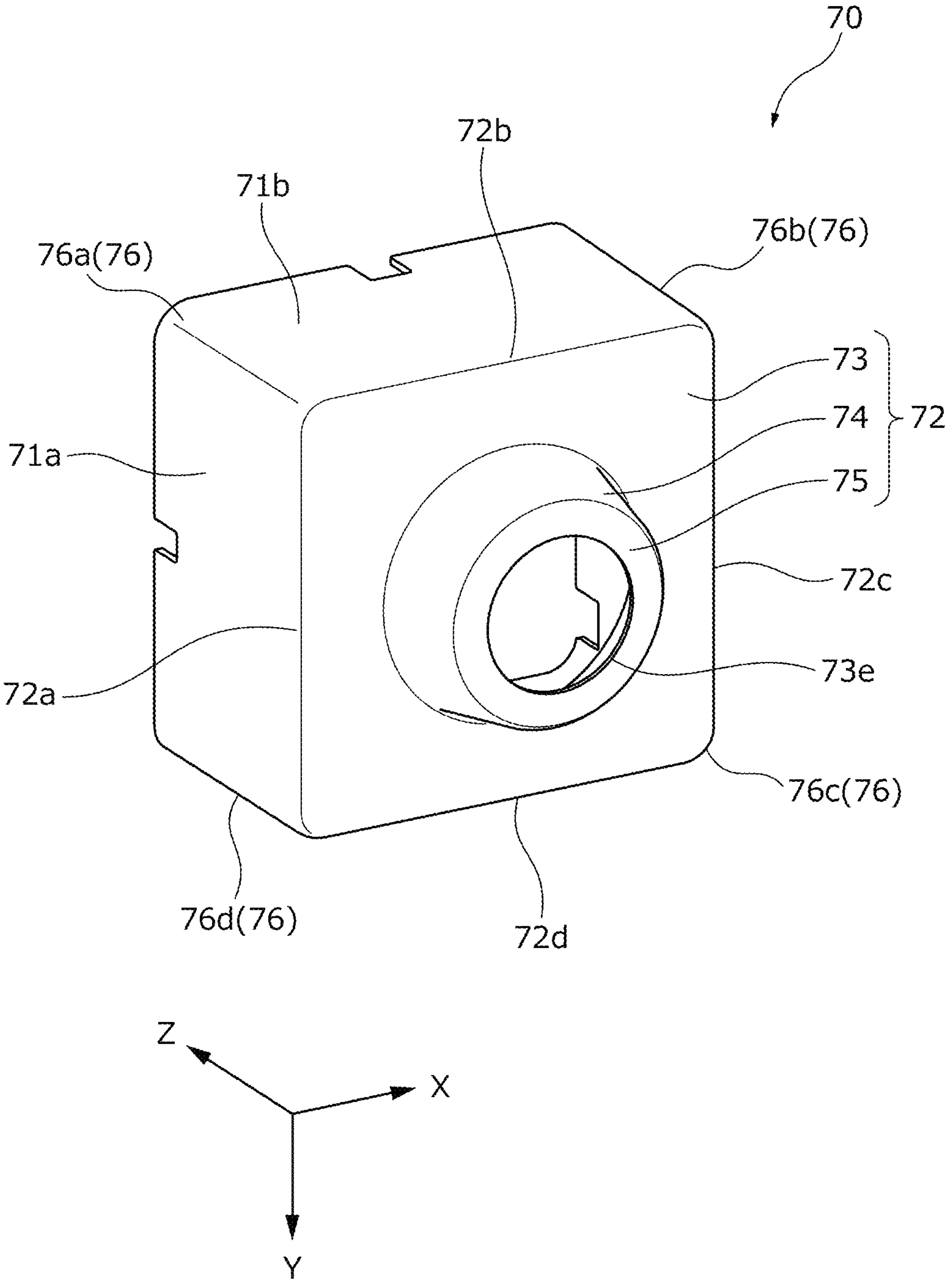
FIG. 8B is a perspective view of the first shield as viewed from below.
Figure 8C:
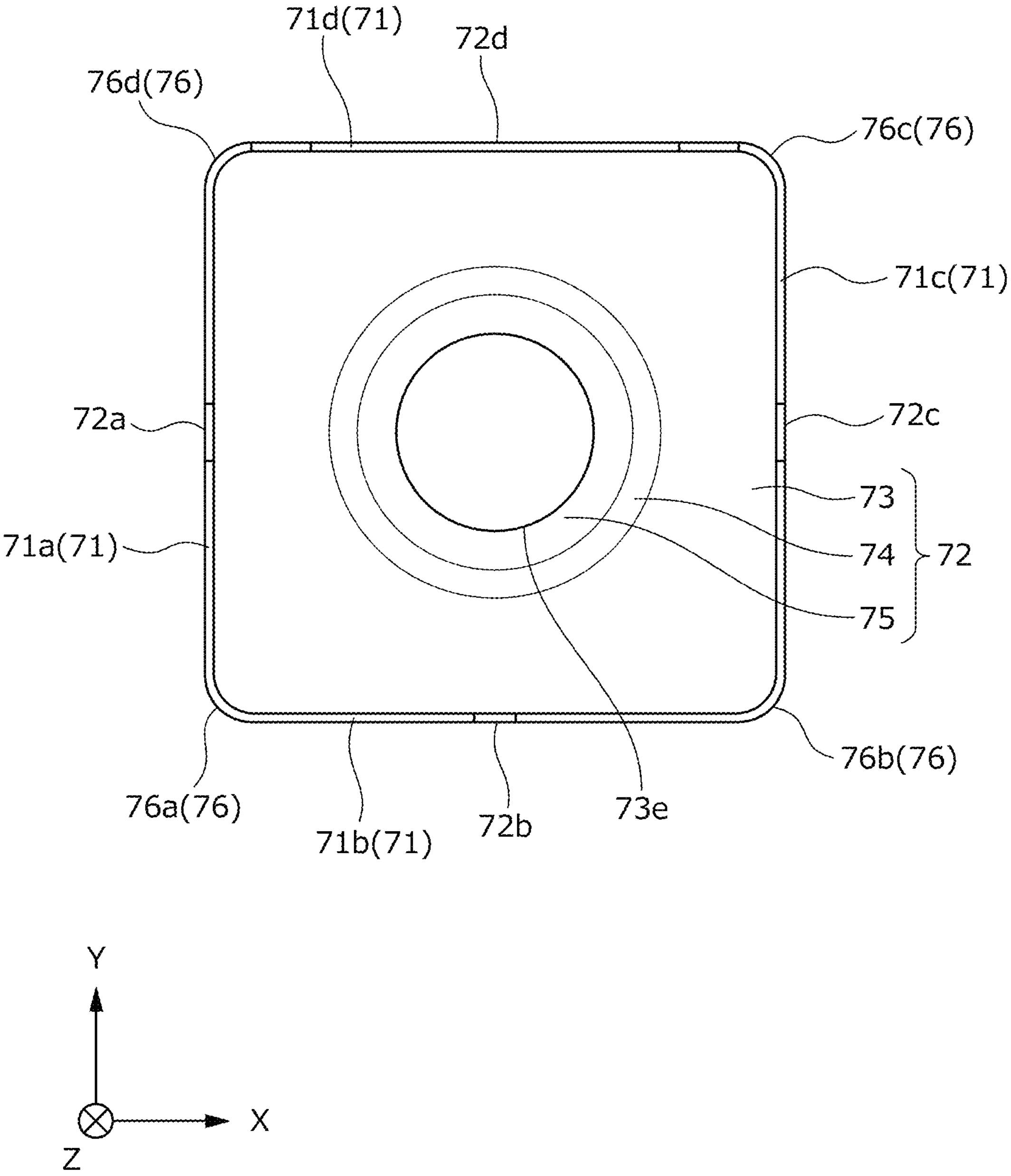
FIG. 8C is a top view of the first shield.
Figure 8D:
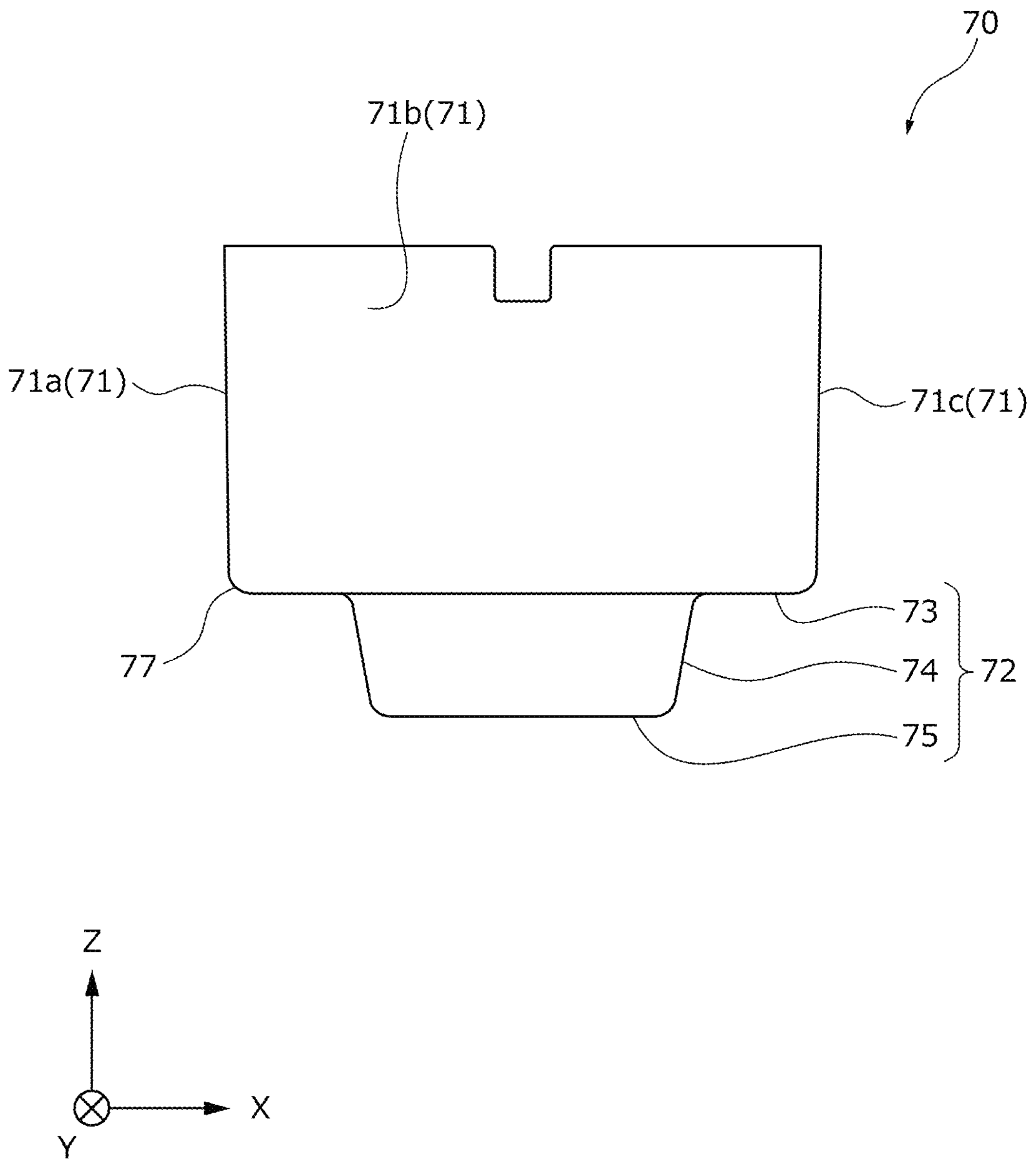
FIG. 8D is a side view of the first shield.
Figure 8E:
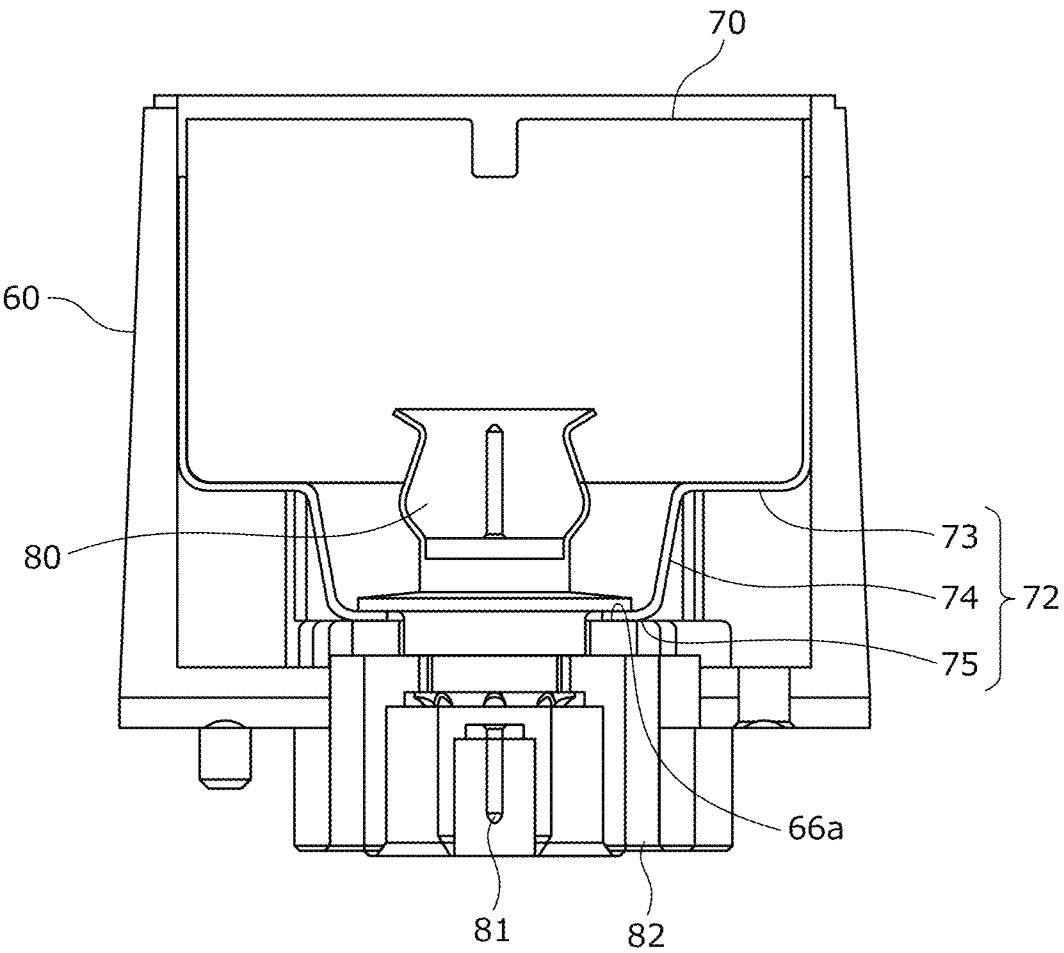
FIG. 8E is a cross-sectional view taken along a line VI-VI in FIG. 7F, and is a view illustrating a state in which a connector fixes a housing and the first shield.

FIG. 8A is a perspective view of the first shield 70 used in the vehicular camera 100 according to the second embodiment as viewed from above. FIG. 8B is a perspective view of the first shield 70 as viewed from below. FIG. 8C is a top view of the first shield 70. FIG. 8D is a side view of the first shield 70. FIG. 8E is a cross-sectional view taken along a line VI-VI in FIG. 7F, and is a view illustrating a state in which the connector 80 fixes the housing 60 and the first shield 70.

The first shield 70 is a member corresponding to the shield 70 according to the first embodiment, and is a metal member that surrounds the circuit board 40 in the internal space of the housing 60 and is disposed such that at least a part thereof faces the second surface 40*b* of the circuit board 40. The first shield 70 serves to shield the electromagnetic waves coming from the outside of the housing 60 and the electromagnetic waves to be radiated in the internal space. By blocking the electromagnetic waves, the image sensor 41 is less likely to be affected by the electromagnetic waves, and as a result, imaging performance of the vehicular camera 100 can be improved.

When the entire housing 60 is made of metal, shielding performance for blocking the electromagnetic waves to a practically usable extent can be obtained, but the number of components, manufacturing process, and manufacturing cost are increased in manufacturing the metal housing 60. In the first and second embodiments according to the present disclosure, the housing 60 is made of a resin, the first shield 70 made of metal is disposed therein, and thus the shielding performance is ensured.

The first shield 70 includes the third bottom surface portion 72 and a plurality of side surface portions 71 standing upright from an outer edge of the third bottom surface portion 72. In the present embodiment, the first shield 70 has a rectangular tubular shape as a whole, and main surfaces of the first shield 70 and the third bottom surface portion 72, that is, surfaces orthogonal to the optical axis have a rectangular shape (a substantially square shape). Such a shape is a general shape for the shield, and at least four side surface portions 71 stand upright from the outer edge of the third bottom surface portion 72 having at least four sides. Accordingly, the first shield 70 can efficiently accommodate the rectangular members such as the circuit board 40 in an internal space thereof.

Further, the first shield 70 is formed by metal drawing. That is, the first shield 70 is formed by compressing and extending a metal plate using a member such as a patch and processing the metal plate into a predetermined shape.

In the first shield 70 formed by the drawing, a curved side surface portion 76 existing at a boundary (a corner portion) between at least two adjacent side surface portions 71 is implemented by a contiguously curved surface. In the present embodiment, the four side surface portions 71 are smoothly connected via the curved side surface portion 76 without a gap.

Further, in the first shield 70 formed by the drawing, a boundary portion 77 between the outer edge of the third bottom surface portion 72 and at least one side surface portion 71 is also implemented by a contiguously curved surface. In the present embodiment, each of the four side surface portions 71 smoothly stands upright from the outer edge of the third bottom surface portion 72 via the boundary portion 77 without a gap.

Figure 9:
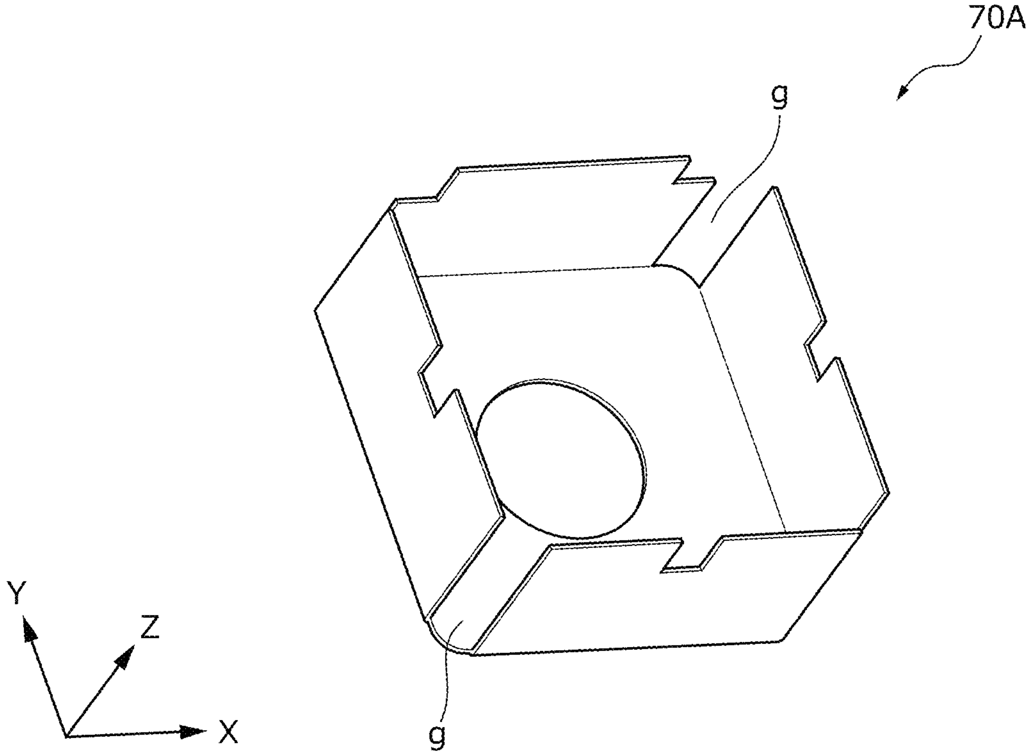
FIG. 9 is a perspective view of a shield formed by bending of a metal plate.

FIG. 9 is a perspective view of a shield 70A formed by bending of a metal plate instead of the drawing. In the shield 70A, a gap g is formed in a portion corresponding to the curved side surface portion 76 of the first shield 70. Further, in the shield 70A, the portion corresponding to the boundary portion 77 of the first shield 70 is not a curved surface but a simple folding line between the third bottom surface portion 72 and the side surface portion 71.

In the first shield 70 according to the present embodiment, the curved side surface portion 76 is implemented by the contiguously curved surface formed by the drawing, and thus the gap in the shield is eliminated, the electromagnetic waves are shielded at a high level and low cost, and the excellent shielding performance can be secured. On the other hand, in the shield 70A of FIG. 9, the gap is generated between the side surface portions 71, and it is estimated that the shielding performance is inferior to that of the first shield 70.

Further, in the first shield 70 according to the present embodiment, the boundary portion 77 is also implemented by the contiguously curved surface formed by the drawing, and thus it is possible to ensure high strength against an external pressure at the boundary between the third bottom surface portion 72 and the side surface portion 71. On the other hand, in the shield 70A of FIG. 9, the boundary between the third bottom surface portion 72 and the side surface portion 71 is bent along the simple folding line, and it is estimated that the strength against the external pressure is lower than that of the first shield 70.

Next, the internal space of the housing 60 will be described. A portion at which the connector 80 to be connected to the outside of the housing 60 exists is implemented by the base end portion 66. The internal space of the housing 60 is defined by the base end portion 66 and a plurality of housing side walls 67 standing upright from an outer edge of the base end portion 66.

In the present embodiment, the housing 60 has a rectangular tubular shape as a whole, and a main surface of the internal space of the housing 60, that is, a surface orthogonal to the optical axis has a rectangular shape (a substantially square shape). Such a shape is a general shape for the housing, and four housing side walls 67 stand upright from four sides existing inside the base end portion 66. Accordingly, the housing 60 can efficiently accommodate the rectangular members such as the circuit board 40 and the first shield 70 in the internal space thereof.

An arrangement of the first shield 70 with respect to the housing 60 will be described in more detail. A side wall inner surface 68 (see FIG. 7D) of the housing side wall 67 stands upright so as to be inclined in an outward direction from the base end portion 66 in the orthogonal direction (a right-left direction of the paper surface of FIG. 7C) orthogonal to the optical axis direction (an up-down direction of the paper surface of FIG. 7C) of the lens unit 30. In FIG. 7C, the side wall inner surface 68 is inclined outward from a lower side to an upper side of the housing 60, and as a result, the internal space of the housing 60 has a form of extending in a tapered shape from the base end portion 66 toward an opening portion side. When the housing 60 is formed by injection molding of the resin, a molding die is pulled out from the opening portion side, but the side wall inner surface 68 is inclined outward toward the opening portion (in a pulling-out direction) in order to smooth the pulling-out.

On the other hand, the third bottom surface portion 72 of the first shield 70 is disposed on the base end portion 66 of the housing 60. Here, the side surface portion 71 of the first shield 70 stands upright so as to be inclined in the outward direction from the third bottom surface portion 72 in the orthogonal direction orthogonal to the optical axis of the lens unit 30. In FIG. 7C, the side surface portion 71 is inclined outward from a lower side to an upper side of the side surface portion 71, and as a result, the first shield 70 has a form of extending in a tapered shape.

The side surface portion 71 of the first shield 70 is inclined to substantially coincide with the inclination of the side wall inner surface 68 of the housing 60 obtained from a manufacturing process. That is, the side surface portion 71 of the first shield 70 is disposed to be in close contact with and extend along the side wall inner surface 68 of the housing side wall 67. Accordingly, the first shield 70 is stably disposed in the space of the housing 60, and the shielding performance can be improved. Inclination angles of the side surface portion 71 and the side wall inner surface 68 in the outward direction are set to, for example, about 1 degree, but the inclination angles are not particularly limited.

Next, a configuration of the third bottom surface portion 72 of the first shield 70 (the shield 70) will be described in detail. In the present embodiment, the third bottom surface portion 72 is not a simple plane, but includes the first bottom surface portion 73, a second bottom surface portion 75, and a connection portion 74, and has a shape including a step portion. That is, in the present embodiment, the third bottom surface portion 72 includes the step portion forming the bottom surface portion of the first shield 70.

The first bottom surface portion 73 of the first shield 70 is a portion that mainly supports various members disposed inside the housing. The first bottom surface portion 73 (or the third bottom surface portion 72) is disposed to face the second surface 40*b* of the circuit board 40, and has a second shape including at least a fifth side 72*a*, a sixth side 72*b*, a seventh side 72*c*, and an eighth side 72*d* in a planar view. The first bottom surface portion 73 (or the third bottom surface portion 72) also includes a hole 73*e* disposed to include a central portion of the second shape. The second shape according to the embodiment is a substantially quadrilateral shape, and a case in which corners are rounded is also included.

The second bottom surface portion 75 of the first shield 70 is a portion that is disposed to correspond to the hole 73*e*, which is disposed to include the central portion of the second shape of the first bottom surface portion 73 in the first shield 70, and face the second surface 40*b* of the circuit board 40, and is disposed to be separated from the first bottom surface portion 73 with reference to the second surface 40*b*. The second bottom surface portion 75 is included in the base end portion 66 of the housing 60, and corresponds to a bottom surface 66*a* (FIG. 7C) corresponding to the circuit board 40. The second bottom surface portion 75 has a fourth shape in a planar view, the fourth shape may be a circle as described in the embodiment, may be an ellipse or a quadrilateral shape, and may be similar to a third shape of the hole 73*e* to be described later.

It has been described that the side surface portion 71 of the first shield 70 stands upright from the outer edge of the third bottom surface portion 72, which is synonymous with standing upright from an outer edge of the first bottom surface portion 73 in the present embodiment. The side surface portion 71 includes a first side surface portion 71*a*, a second side surface portion 71*b*, a third side surface portion 71*c*, and a fourth side surface portion 71*d*.

The first side surface portion 71*a* of the first shield 70 corresponds to the fifth side 72*a* of the first bottom surface portion 73 (or the third bottom surface portion 72), and is disposed in a direction opposite to the second bottom surface portion 75 while facing the circuit board 40. The second side surface portion 71*b* of the first shield 70 corresponds to the sixth side 72*b* of the first bottom surface portion 73 (or the third bottom surface portion 72), and is disposed in the direction opposite to the second bottom surface portion 75 while facing the circuit board 40. The third side surface portion 71*c* of the first shield 70 corresponds to the seventh side 72*c* of the first bottom surface portion 73 (or the third bottom surface portion 72), and is disposed in the direction opposite to the second bottom surface portion 75 while facing the circuit board 40. The fourth side surface portion 71*d* of the first shield 70 corresponds to the eighth side 72*d* of the first bottom surface portion 73 (or the third bottom surface portion 72), and is disposed in the direction opposite to the second bottom surface portion 75 while facing the circuit board 40.

In addition, the curved side surface portion 76 connecting the side surface portion 71 of the first shield 70 includes a first curved side surface portion 76*a*, a second curved side surface portion 76*b*, a third curved side surface portion 76*c*, and a fourth curved side surface portion 76*d*. The first curved side surface portion 76*a* connects the first side surface portion 71*a* and the second side surface portion 71*b*. The second curved side surface portion 76*b* connects the second side surface portion 71*b* and the third side surface portion 71*c*. The third curved side surface portion 76*c* connects the third side surface portion 71*c* and the fourth side surface portion 71*d*. The fourth curved side surface portion 76*d* connects the fourth side surface portion 71*d* and the first side surface portion 71*a*.

The connection portion 74 of the first shield 70 protrudes from a predetermined position on the first bottom surface portion 73 inside the outer edge of the first bottom surface portion 73 in the orthogonal direction orthogonal to the optical axis of the lens unit 30, to a side opposite to the side surface portion 71 in the optical axis direction. In particular, the connection portion 74 connects an entire periphery of the hole 73*e* disposed to include the central portion of the second shape of the first bottom surface portion 73 and an entire periphery of the second bottom surface portion 75. Accordingly, the first bottom surface portion 73 moves in the optical axis direction, that is, in an upward direction in FIG. 7C as compared to a case in which no connection portion 74 exists, and has a raised bottom structure in the third bottom surface portion 72. Accordingly, a solid raised bottom region S exists in a region of the housing 60 adjacent to the first bottom surface portion 73.

The end surface 47 of the circuit board 40 and the side surface portion 71 of the first shield 70 have the following arrangement relation. That is, at least a part of the first side surface portion 71*a* faces the first end surface 47*a* of the circuit board 40. At least a part of the second side surface portion 71*b* faces the second end surface 47*b* of the circuit board 40. At least a part of the third side surface portion 71*c* faces the third end surface 47*c* of the circuit board 40. At least a part of the fourth side surface portion 71*d* faces the fourth end surface 47*d* of the circuit board 40.

In the present embodiment, the hole 73*e* disposed to include the central portion of the second shape of the first bottom surface portion 73 in the first shield 70 has the third shape different from the second shape in a planar view. At least the first side surface portion 71*a*, the second side surface portion 71*b*, the third side surface portion 71*c*, and the fourth side surface portion 71*d* of the first shield 70 are formed by a contiguously curved surface. Further, in the first shield 70, at least the first side surface portion 71*a*, the second side surface portion 71*b*, the third side surface portion 71*c*, the fourth side surface portion 71*d*, the first bottom surface portion 73, the connection portion 74, and the second bottom surface portion 75 are formed by a contiguously curved surface.

In the present embodiment, the first shield 70 has a two-stage configuration including the first bottom surface portion 73 and the second bottom surface portion 75 smaller than the first bottom surface portion 73, and thus the volume inside the first shield 70 can be reduced. Accordingly, a distance between a heating component disposed on the circuit board 40 and the first shield 70 is reduced, and the heat generated by the heating component can be efficiently transmitted to the first shield 70.

Further, the first shield 70 surrounds the circuit board 40, and the first side surface portion 71*a*, the second side surface portion 71*b*, the third side surface portion 71*c*, the fourth side surface portion 71*d*, the first bottom surface portion 73, the connection portion 74, and the second bottom surface portion 75 are contiguously formed by using the drawing or the like. Accordingly, the gap is eliminated in the first shield 70, and thus the resistance to external electromagnetic noise is improved while restraining the electromagnetic noise from being leaked to the outside.

For example, the first side surface portion 71*a*, the second side surface portion 71*b*, the third side surface portion 71*c*, the fourth side surface portion 71*d*, the first bottom surface portion 73, the connection portion 74, and the second bottom surface portion 75 of the first shield 70, which are formed by the contiguously curved surface, are formed of a metal plate by the drawing. Accordingly, the gap in the first shield 70 is eliminated, the electromagnetic waves are shielded at a high level and low cost, and the excellent shielding performance can be secured.

Further, the second shape of the first bottom surface portion 73, which is a shape in a planar view, is different from the third shape of the hole 73*e* of the first bottom surface portion 73, the rigidity of the first shield 70 itself can be improved by the first side surface portion 71*a*, the second side surface portion 71*b*, the third side surface portion 71*c*, the fourth side surface portion 71*d*, and the connection portion 74 which are formed contiguously, and a thickness of the first shield 70 can be reduced, and the weight of the vehicular camera 100 can also be reduced.

In the present embodiment, the first shape of the circuit board 40 is the first quadrilateral shape, the second shape of the first bottom surface portion 73 of the first shield 70 is a second quadrilateral shape, and the third shape of the hole 73*e* of the first shield 70 is a circular shape. Accordingly, the circuit board 40 and the first shield 70 having simple shapes can be easily formed.

In the present embodiment, the entire first side surface portion 71*a* of the first shield 70 faces the first end surface 47*a* of the circuit board 40, the entire second side surface portion 71*b* faces the second end surface 47*b* of the circuit board 40, the entire third side surface portion 71*c* faces the third end surface 47*c* of the circuit board 40, and the entire fourth side surface portion 71*d* faces the fourth end surface 47*d* of the circuit board 40. Accordingly, a shielding property of the circuit board 40 from the outside can be improved.

The connector 80 is disposed on the bottom surface 66*a* to extend over the inside and the outside of the housing 60. Specifically, the connector 80 is disposed to penetrate the second bottom surface portion 75 (or the third bottom surface portion 72) of the first shield 70. As illustrated in FIG. 7C, the connector 80 includes at least the first terminal 81 and the second terminal 82 that electrically connect the inside and the outside of the housing 60, and the first terminal 81 and the second terminal 82 are electrically connected to the circuit of the circuit board 40.

In addition, as illustrated in FIG. 8E, the connector 80 can fix the second bottom surface portion 75 (or the third bottom surface portion 72) of the first shield 70 and the bottom surface 66*a* of the housing 60. Accordingly, the connector 80 can firmly fix the first shield 70 and the housing 60. Further, the second terminal 82 of the connector 80 and the first shield 70 are electrically connected to each other on the bottom surface 66*a* of the housing 60. Accordingly, the electrical connection between the connector 80 and the first shield 70 can be easily secured.

The first shield 70 has the two-stage configuration including the first bottom surface portion 73 and the second bottom surface portion 75 smaller than the first bottom surface portion 73. A first area surrounded by the periphery of the first bottom surface portion 73 of the first shield 70 is larger than a second area surrounded by the periphery of the second bottom surface portion 75. Accordingly, a space around the connection portion 74 and the second bottom surface portion 75 can be secured, and handleability of the vehicular camera 100 can be improved.

Specifically, the first bottom surface portion 73 of the first shield 70 having a large diameter is located above the connection portion 74 and the second bottom surface portion 75 of the first shield 70 in the optical axis direction in order to support various members such as the lens unit 30, the circuit board 40, and the heat conductive member 50. Diameters of the connection portion 74 and the second bottom surface portion 75 are smaller than that of the first bottom surface portion 73, and thus the volume corresponding to the raised bottom region S in FIG. 7C can be secured around the connection portion 74 and the second bottom surface portion 75 in the base end portion 66. Accordingly, various members can be disposed in a part of the raised bottom region S, that is, a region adjacent to the first bottom surface portion 73 while ensuring ground connection of the first shield 70 and the connector 80, and the degree of freedom in design and miniaturization of the vehicular camera 100 can be achieved. In addition, since the connection portion 74 exists, the connector 80 having a small diameter can be efficiently disposed, and the electrical connection with the outside can be easily secured.

In the present embodiment, the housing 60 includes an attachment portion 69 for attaching the vehicular camera 100 to the vehicle. The attachment portion 69 is formed in the raised bottom region S inside the housing 60 adjacent to the first bottom surface portion 73. The attachment portion 69 is a portion necessary for attachment to another member. When the connection portion 74 does not exist and a general bottom surface serving as the first bottom surface portion 73 is provided, it is difficult to secure the raised bottom region S, and thus the attachment portion 69 needs to be provided in another region. In this case, there is a possibility that the size of the housing 60 is increased. In the present embodiment, the attachment portion 69 can be disposed in the raised bottom region S, and the increase in the size of the housing 60 can be restrained.

In FIG. 7C, a specific example of the attachment portion 69 indicated by a broken line region having a long axis shape is a female screw extending along the optical axis direction. On an outer side of the second bottom surface portion 75 of the first shield 70 with reference to the optical axis L, the female screw is disposed on a side opposite to the circuit board 40 with respect to the first bottom surface portion 73. Accordingly, it is possible to ensure ease of attachment of the vehicular camera to the vehicle while restraining the increase in the size of the housing 60. A user can easily attach the vehicular camera 100 to another member of the vehicle body of the vehicle by using the female screw and a male screw separately prepared.

Further, the heat conductive member 50 is disposed between the second surface 40*b* of the circuit board 40 and the first bottom surface portion 73 of the first shield 70. The heat conductive member 50 has insulation property and heat conductivity, and serves to dissipate the heat generated from the electronic components such as the circuit board 40 to the outside. In particular, the heat conductive member 50 plays an important role in dissipating the heat from an electronic component located at an end of the circuit board 40 far from the connector 80 to the outside through the first shield 70 and other components.

The heat conductive member 50 is disposed on the first bottom surface portion 73 of the first shield 70, and is not disposed in the raised bottom region S. When the connection portion 74 does not exist and a general bottom surface serving as the first bottom surface portion 73 is provided, a space exists instead of the solid raised bottom region S. The heat conductive member 50 also needs to be disposed in this space in order to eliminate the gap, the amount of the heat conductive member 50 increases, and the manufacturing cost of the vehicular camera 100 increases. In the present embodiment, a part of the housing 60 corresponding to the raised bottom region S exists instead of such a space, the number of the heat conductive members 50 can be reduced, and an increase in cost can be restrained.

The first shield 70 according to the embodiment is formed of the metal plate by the drawing, and the step portion constituted by the first bottom surface portion 73, the connection portion 74, and the second bottom surface portion 75 may also be formed of a metal plate by the drawing.

Figure 10A:
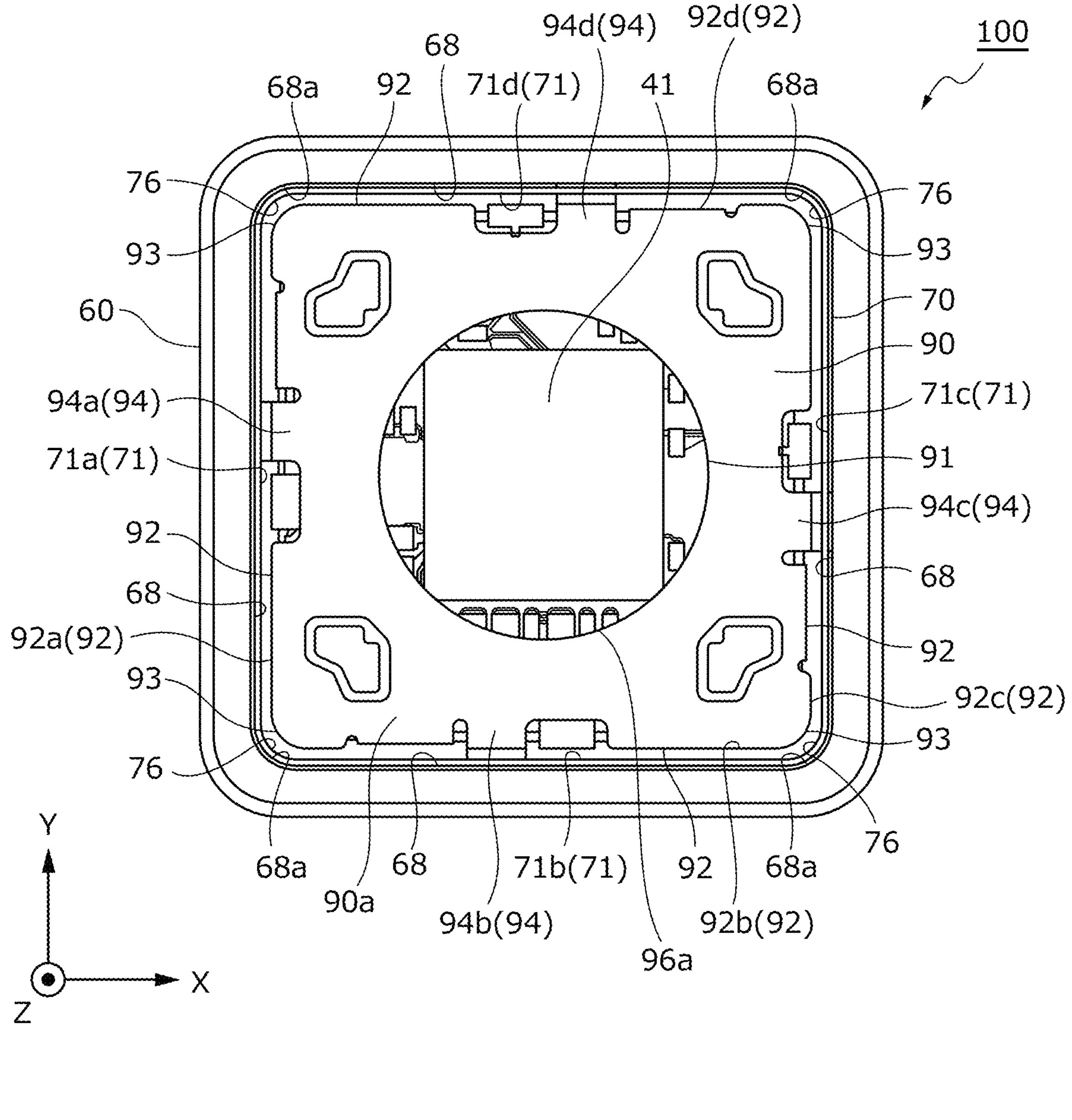
FIG. 10A is an arrow view taken along a line V-V in FIG. 7C.
Figure 10B:
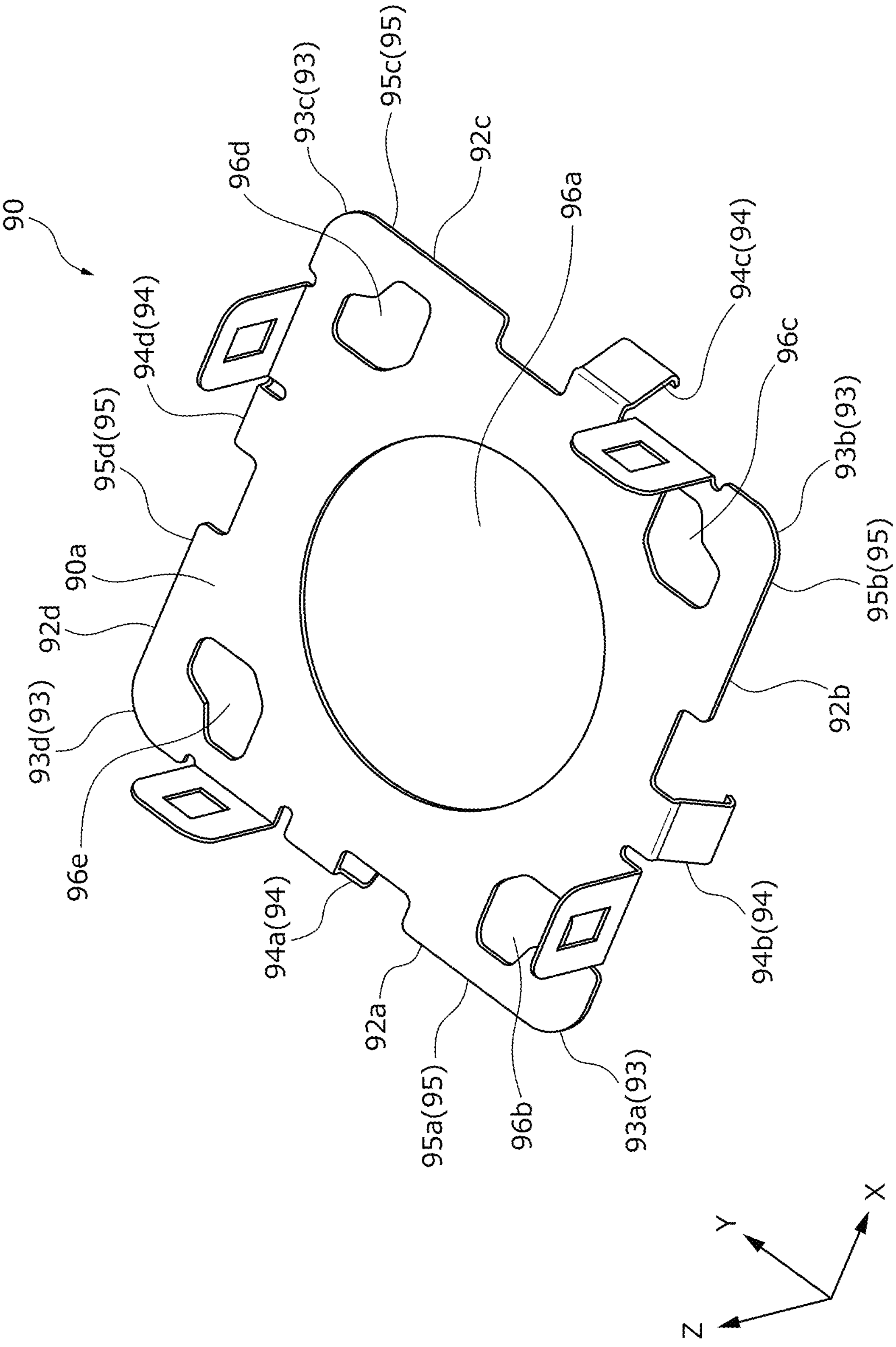
FIG. 10B is a perspective view of a second shield as viewed from above.
Figure 10C:
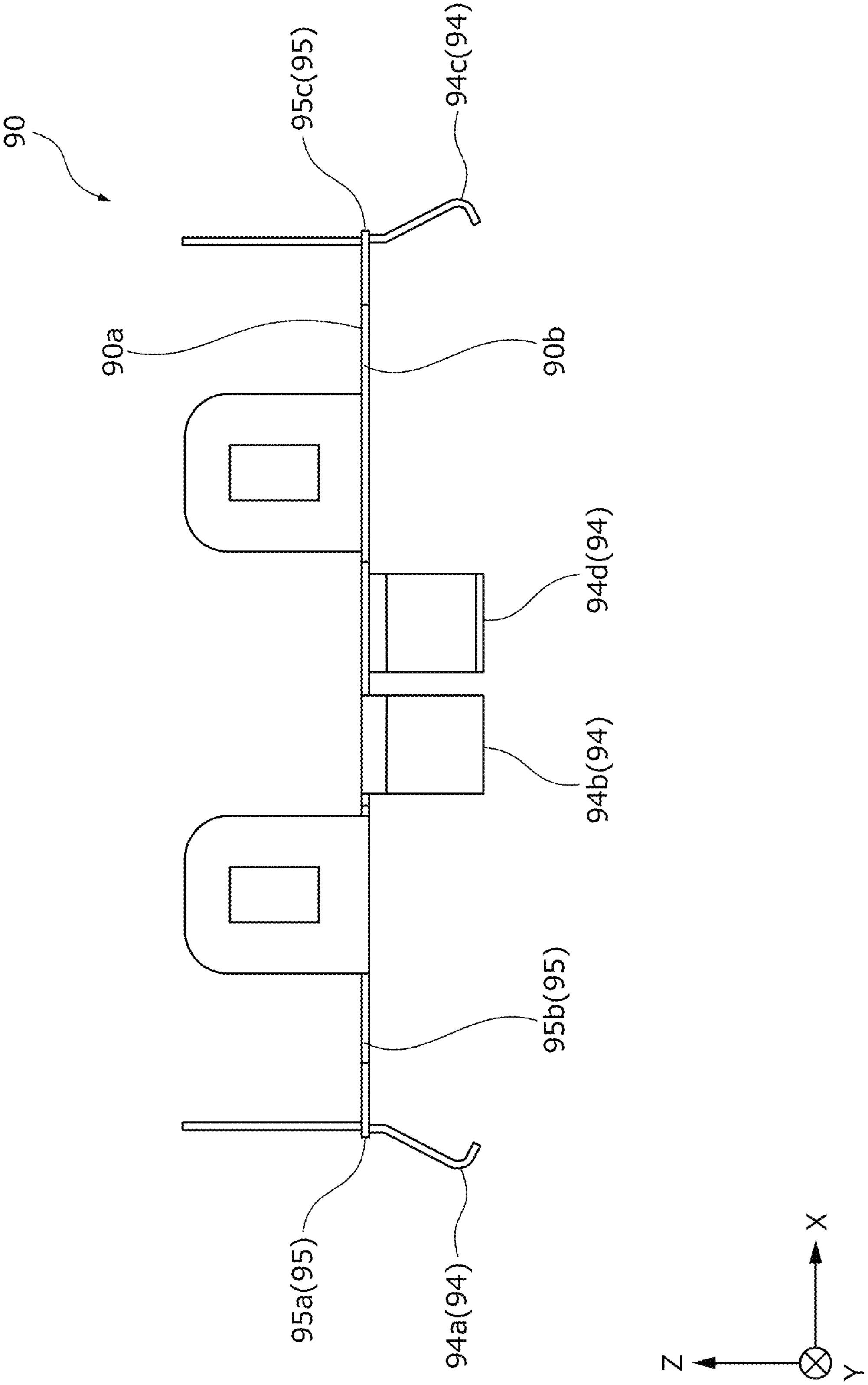
FIG. 10C is a side view of the second shield.
Figure 10D:
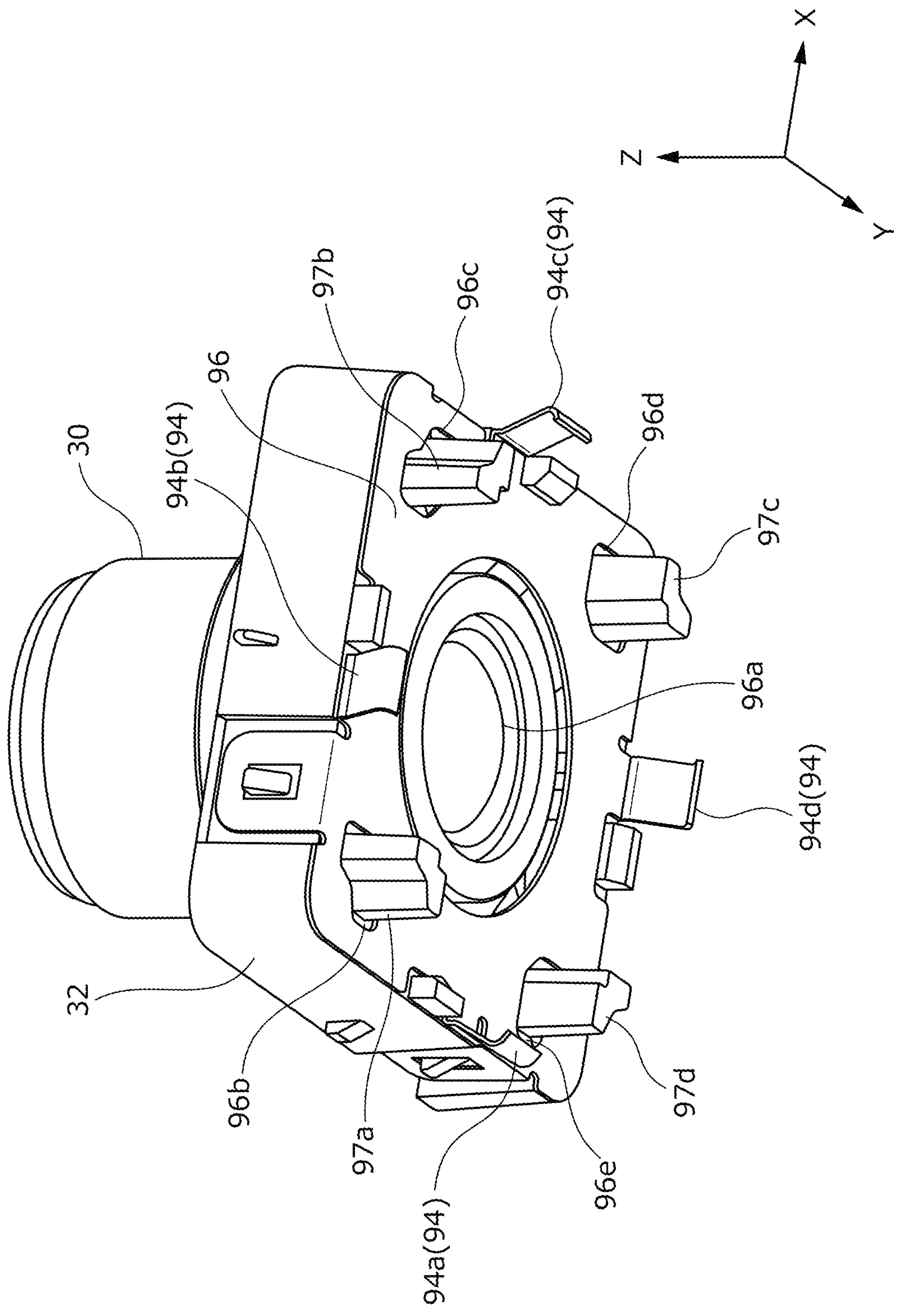
FIG. 10D is a perspective view of an assembly of a lens unit and the second shield as viewed from below.

FIG. 10A is an arrow view taken along a line V-V in FIG. 7C. FIG. 10B is a perspective view of a second shield 90 as viewed from above. FIG. 10C is a side view of the second shield 90. FIG. 10D is a perspective view of an assembly of the lens unit 30 and the second shield 90 as viewed from below.

The second shield 90 is disposed in the internal space of the housing 60. The second shield 90 is a metal member, and at least a part thereof is disposed to face the first surface 40*a* of the circuit board 40. Specifically, the second shield 90 is disposed between the circuit board 40 and the lens unit 30, and has a metal plate shape including four sides 92. The second shield 90 has, at a central portion, a hole (a first hole) 96*a* through which light from the lens unit 30 is transmitted and reaches the image sensor 41. The first shield 70 may be referred to as a rear shield, and the second shield 90 may be referred to as a front shield.

The second shield 90 has a fifth shape including at least a ninth side 92*a*, a tenth side 92*b*, an eleventh side 92*c*, and a twelfth side 92*d* constituting the four sides 92 in a planar view. The fifth shape is a quadrilateral shape, and corners thereof are rounded. The hole 96*a* includes the center of the fifth shape, and corresponds to the image sensor 41 mounted on the first surface 40*a* of the circuit board 40.

Further, the second shield 90 has contact points 94 for ensuring electrical connection with the first shield 70. The four contact points 94 include a first contact point 94*a*, a second contact point 94*b*, a third contact point 94*c*, and a fourth contact point 94*d*. The first contact point 94*a* is electrically connected to the first side surface portion 71*a* of the first shield 70 at the ninth side 92*a*. The second contact point 94*b* is electrically connected to the second side surface portion 71*b* of the first shield 70 at the tenth side 92*b*. The third contact point 94*c* is electrically connected to the third side surface portion 71*c* of the first shield 70 at the eleventh side 92*c*. The fourth contact point 94*d* is electrically connected to the fourth side surface portion 71*d* of the first shield 70 at the twelfth side 92*d*.

The second shield 90 is a member for shielding the internal space of the housing 60 from the outside in cooperation with the first shield 70 and further improving the shielding performance. In order to improve the shielding performance, it is desirable that the first shield 70 and the second shield 90 cooperate to form an electrically closed space.

As described above, in the present embodiment, first, the first shield 70 surrounds the circuit board 40, and the first side surface portion 71*a*, the second side surface portion 71*b*, the third side surface portion 71*c*, the fourth side surface portion 71*d*, the first bottom surface portion 73, the connection portion 74, and the second bottom surface portion 75 are contiguously formed by using the drawing or the like. Accordingly, the gap is eliminated in the first shield 70, and thus the resistance to external electromagnetic noise is improved while restraining the electromagnetic noise from being leaked to the outside.

Further, the second shield 90 is disposed on a first surface 40*a* side of the circuit board 40 in which the image sensor 41 is included, forms the closed space surrounding the circuit board 40 together with the first shield 70, and is provided with the contact points electrically connected to the first shield 70 on the four sides, and therefore, by configuring the electrically closed space, the resistance to the external electromagnetic noise can be improved while further restraining the electromagnetic noise from being leaked to the outside.

Further, the second shield 90 includes a third surface 90*a*, a fourth surface 90*b* opposite to the third surface 90*a*, and an end surface 95 connecting the third surface 90*a* and the fourth surface 90*b*. The end surface 95 includes at least a fifth end surface 95*a* corresponding to the ninth side 92*a*, a sixth end surface 95*b* corresponding to the tenth side 92*b*, a seventh end surface 95*c* corresponding to the eleventh side 92*c*, and an eighth end surface 95*d* corresponding to the twelfth side 92*d*.

Further, the fifth end surface 95*a* faces the first side surface portion 71*a* of the first shield 70, the sixth end surface 95*b* faces the second side surface portion 71*b* of the first shield 70, the seventh end surface 95*c* faces the third side surface portion 71*c* of the first shield 70, and the eighth end surface 95*d* faces the fourth side surface portion 71*d* of the first shield 70.

Accordingly, the side surface portion 71 of the first shield 70 faces the end surface 95 of the second shield 90, and thus the gap between the first shield 70 and the second shield 90 can be reduced, and the excellent shielding performance can be secured.

In addition, the portions of the first shield 70 corresponding to the fifth end surface 95*a*, the sixth end surface 95*b*, the seventh end surface 95*c*, and the eighth end surface 95*d* of the second shield 90 form a sixth shape in a planar view. The sixth shape is larger than the second shape of the third bottom surface portion 72 of the first shield 70. In the present embodiment, both the second shape and the sixth shape are substantially quadrilateral shapes, and the area of the substantially quadrilateral shape of the sixth shape is larger than the area of the substantially quadrilateral shape of the second shape.

The first side surface portion 71*a* and the third side surface portion 71*c* of the first shield 70 face each other, and the first side surface portion 71*a* and the third side surface portion 71*c* extend from the third bottom surface portion 72 toward the portions corresponding to the fifth end surface 95*a*, the sixth end surface 95*b*, the seventh end surface 95*c*, and the eighth end surface 95*d* of the second shield 90. Further, the second side surface portion 71*b* and the fourth side surface portion 71*d* of the first shield 70 face each other, and the second side surface portion 71*b* and the fourth side surface portion 71*d* extend from the third bottom surface portion 72 toward the portions corresponding to the fifth end surface 95*a*, the sixth end surface 95*b*, the seventh end surface 95*c*, and the eighth end surface 95*d* of the second shield 90.

That is, the side surface portion 71 of the first shield 70 stands upright so as to be inclined in the outward direction from the third bottom surface portion 72 in the orthogonal direction orthogonal to the optical axis of the lens unit 30. Thus, a cross section of the first shield 70 at a position of the second shield 90 is larger than that at a position of the base end portion 66. Accordingly, an opening side of the first shield 70 on which the second shield 90 exists is formed to have a shape larger than the third bottom surface portion 72 on a bottom side, and thus the first shield 70 can be easily processed.

In addition, a dimension of the second shield 90 is set such that the area of the second shield 90 in a planar view in FIG. 10A is larger than the area of the second shape of the third bottom surface portion 72 (the first bottom surface portion 73) of the first shield 70. By such a setting, the gap between the side surface portion 71 and (the sides 92 of) the second shield 90 can be made smaller, and the shielding performance can be improved.

Further, in the housing 60, a boundary portion 68*a* between at least two side wall inner surfaces 68 is implemented by a contiguously curved surface. Such a contiguously curved surface can be more easily formed in a shape of a mold during the injection molding of the resin. The boundary portion 68*a* is a contiguously curved surface along the curved side surface portion 76 of the first shield 70, and is accommodated in a state in which the first shield 70 is in close contact with the housing 60. Further, a connection portion of at least two end surfaces 95 and the side 92 constituting an outer edge of the second shield 90 is formed by a curved end surface 93. The curved end surface 93 is a contiguously curved surface facing the curved side surface portion 76 of the first shield 70.

The curved end surface 93 of the second shield 90 includes a first curved end surface 93*a*, a second curved end surface 93*b*, a third curved end surface 93*c*, and a fourth curved end surface 93*d*. The first curved end surface 93*a* connects the fifth end surface 95*a* and the sixth end surface 95*b*. The second curved end surface 93*b* connects the sixth end surface 95*b* and the seventh end surface 95*c*. The third curved end surface 93*c* connects the seventh end surface 95*c* and the eighth end surface 95*d*. The fourth curved end surface 93*d* connects the eighth end surface 95*d* and the fifth end surface 95*a*.

Further, the first curved end surface 93*a* of the second shield 90 faces the first curved side surface portion 76*a* of the first shield 70, the second curved end surface 93*b* of the second shield 90 faces the second curved side surface portion 76*b* of the first shield 70, the third curved end surface 93*c* of the second shield 90 faces the third curved side surface portion 76*c* of the first shield 70, and the fourth curved end surface 93*d* of the second shield 90 faces the fourth curved side surface portion 76*d* of the first shield 70.

Accordingly, a gap between the curved side surface portion 76 corresponding to corners of the first shield 70 and the curved end surface 93 corresponding to the corners of the second shield 90 can be reduced, and the excellent shielding performance can be secured.

The first curved end surface 93*a* of the second shield 90 has an outward convex shape with reference to the center of the fifth shape of the second shield 90, the second curved end surface 93*b* of the second shield 90 has an outward convex shape with reference to the center of the fifth shape, the third curved end surface 93*c* of the second shield 90 has an outward convex shape with reference to the center of the fifth shape, and the fourth curved end surface 93*d* of the second shield 90 has an outward convex shape with reference to the center of the fifth shape.

In accordance with the shapes described above, an inner side surface of the first curved side surface portion 76*a* of the first shield 70 has a concave shape corresponding to the convex shape of the first curved end surface 93*a* of the second shield 90, an inner side surface of the second curved side surface portion 76*b* of the first shield 70 has a concave shape corresponding to the convex shape of the second curved end surface 93*b* of the second shield 90, an inner side surface of the third curved side surface portion 76*c* of the first shield 70 has a concave shape corresponding to the convex shape of the third curved end surface 93*c* of the second shield 90, and an inner side surface of the fourth curved side surface portion 76*d* of the first shield 70 has a concave shape corresponding to the convex shape of the fourth curved end surface 93*d* of the second shield 90.

Accordingly, by disposing the curved end surface 93 of the second shield 90 to correspond to the curved side surface portion 76 necessary for contiguously forming the side surface portion 71 of the first shield 70, and reducing the gap with the first shield 70 at the four corners of the second shield 90 as small as possible, the resistance to the external electromagnetic noise can be improved while restraining the electromagnetic noise from being leaked to the outside.

In a case in which a connection portion of the two sides 92 of the second shield 90 is a right angle as that of a generally rectangular shape, the connection portion easily reaches the curved side surface portion 76 of the first shield 70 as compared to the curved end surface 93 of the second shield 90 in FIG. 10A, and it is necessary to shorten the sides 92 as compared to the case of FIG. 10A. That is, the second shield 90 becomes small, and the shielding performance deteriorates. In the present embodiment, by using the curved end surface 93 along the curved side surface portion 76 to configure the connection portion of the two sides 92, the gap with the first shield 70 can be reduced while ensuring the entire size of the second shield 90, that is, a length of the side 92, and the shielding performance can be improved.

Further, as described above, the second shield 90 has the hole 96*a* including the center of the fifth shape and corresponding to the image sensor 41 mounted on the first surface 40*a* of the circuit board 40. As illustrated in FIG. 10B, the second shield 90 further includes four holes, that is, a hole 96*b*, a hole 96*c*, a hole 96*d*, and a hole 96*e* around the hole 96*a*.

The four holes including the hole 96*b*, the hole 96*c*, the hole 96*d*, and the hole 96*e* are provided to correspond to the corners of the fifth shape, respectively, and when the hole 96*a* is set to a first hole, at least three of the four holes correspond to a second hole, a third hole, and a fourth hole.

Each of the first contact point 94*a*, the second contact point 94*b*, the third contact point 94*c*, and the fourth contact point 94*d* is bent and extends downward, that is, toward the fourth surface 90*b* of the second shield 90.

As illustrated in FIG. 10D, the first surface 32*a* of the flange portion 32 of the lens unit 30 is provided with four support columns including a support column 97*a*, a support column 97*b*, a support column 97*c*, and a support column 97*d* protruding into the housing 60. At least three of the four support columns correspond to a first support column, a second support column, and a third support column. Further, at least three support columns including the first support column, the second support column, and the third support column penetrate through at least three holes including the second hole, the third hole, and the fourth hole, respectively.

Figure 15A:
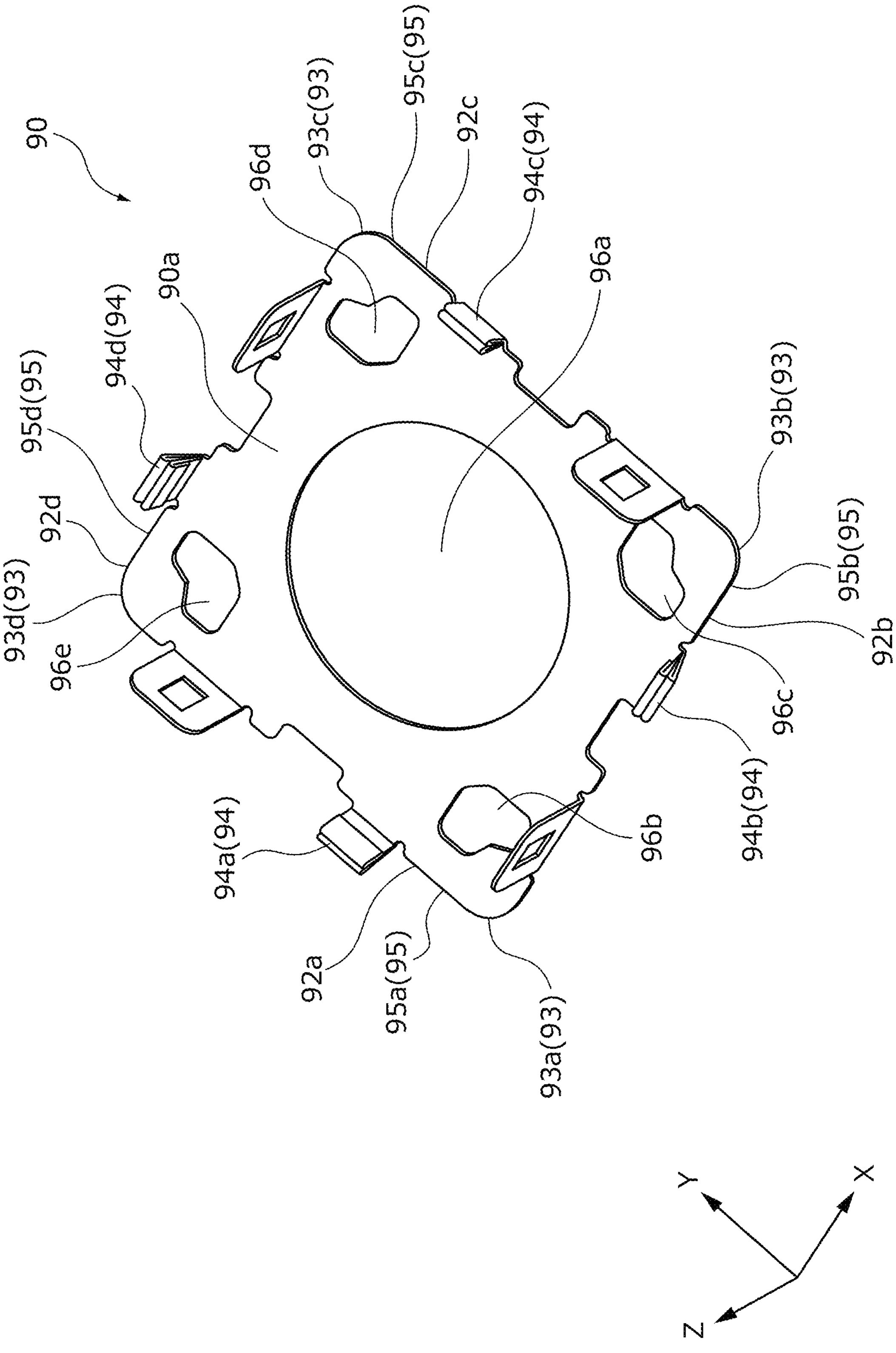
FIG. 15A is a perspective view of a modification of the second shield as viewed from above.
Figure 15B:
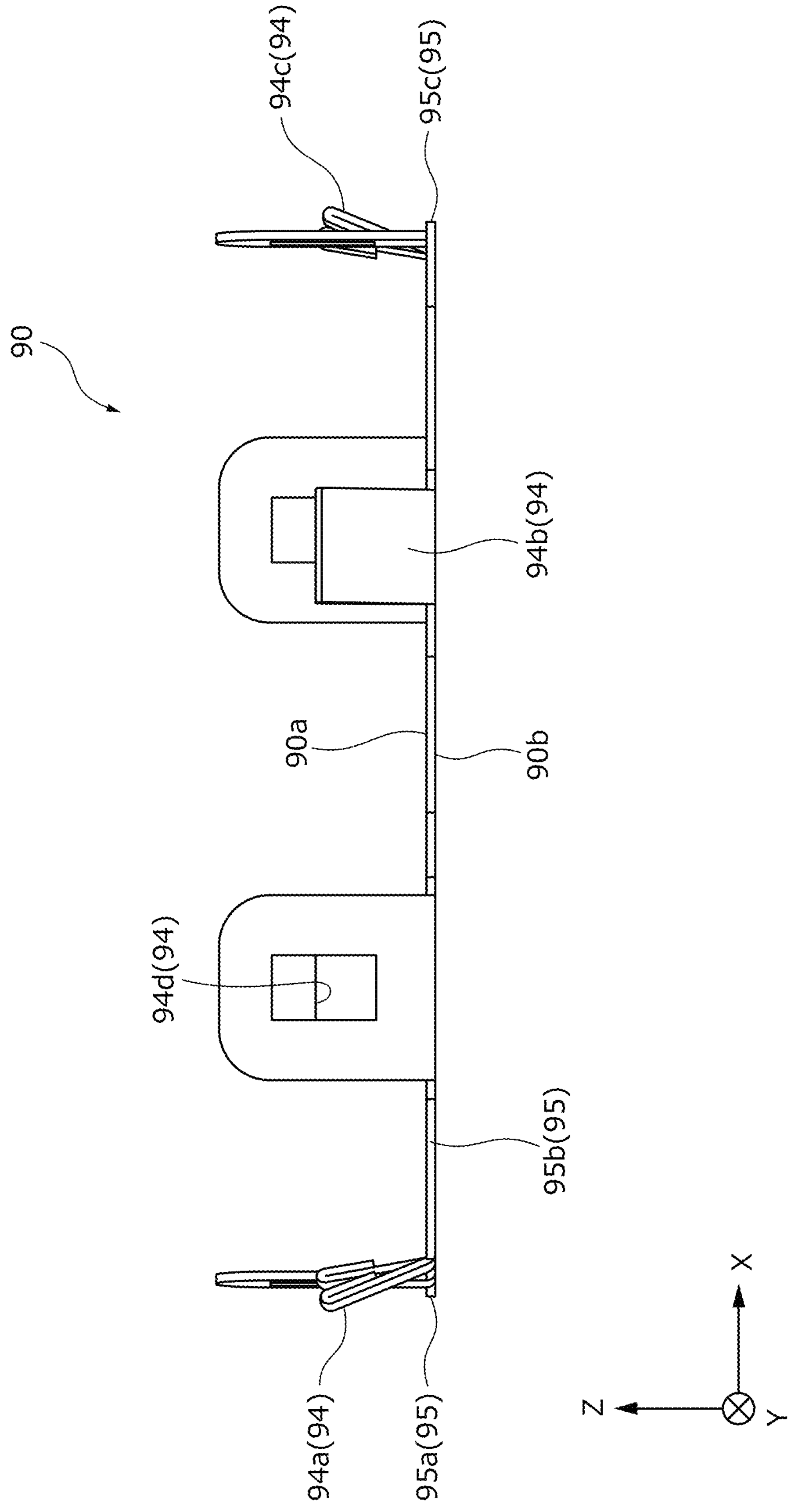
FIG. 15B is a side view of the modification of the second shield.
Figure 15C:
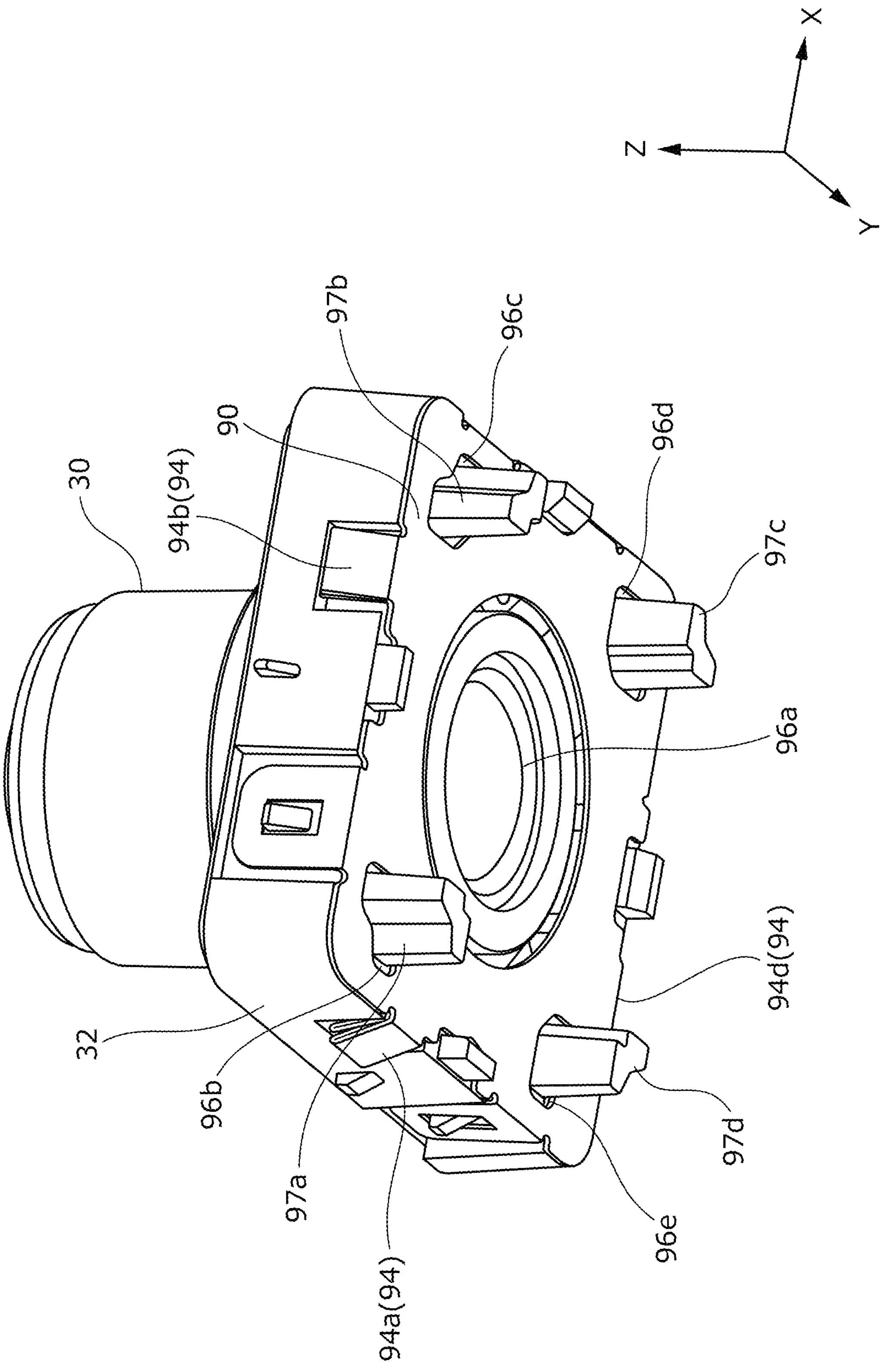
FIG. 15C is a perspective view of an assembly of the lens unit and the modification of the second shield as viewed from below.
Figure 15D:
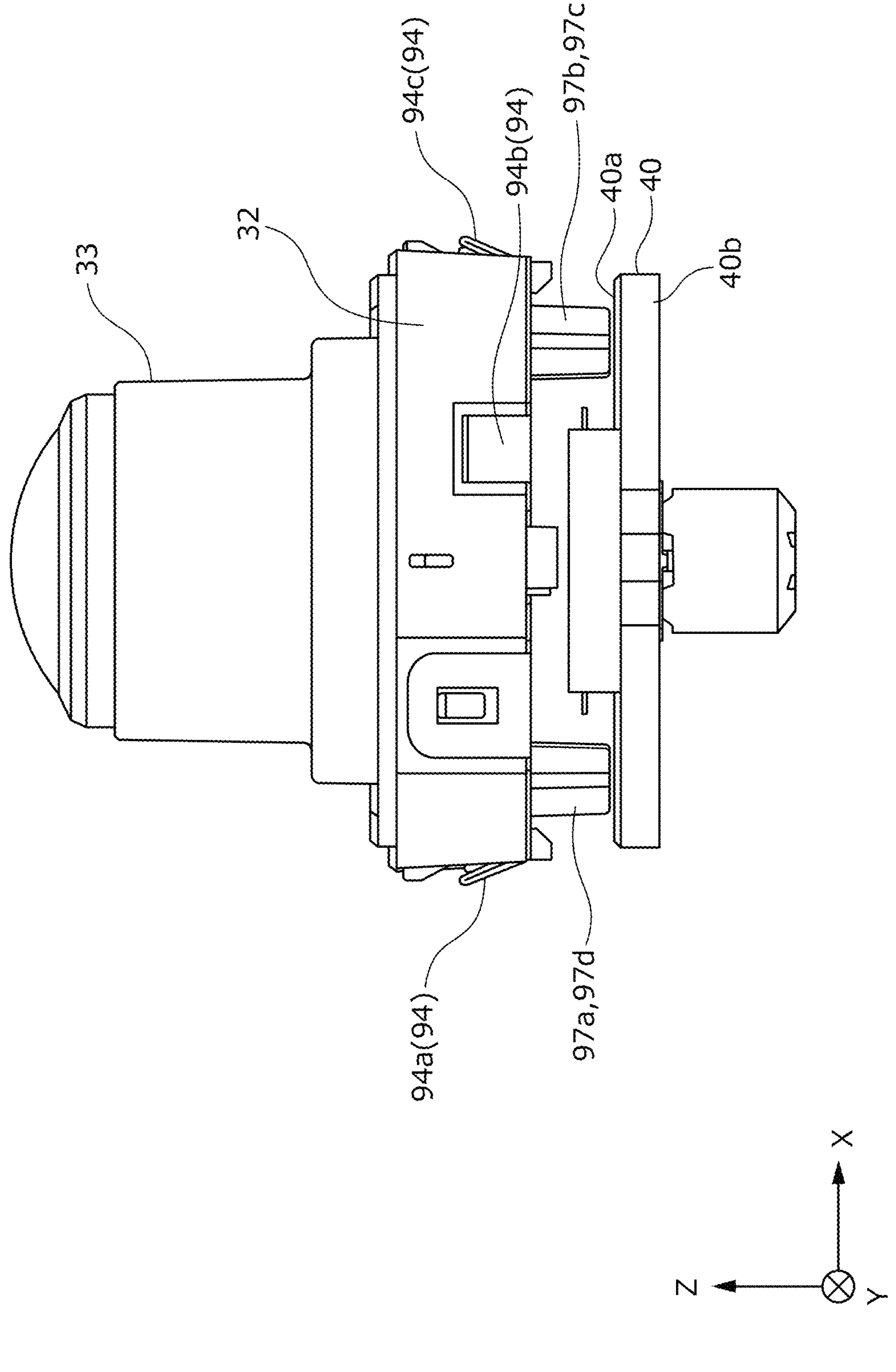
FIG. 15D is a side view of an assembly of the lens unit, the modification of the second shield, and the circuit board.

FIG. 15A is a perspective view of a modification of the second shield 90 as viewed from above. FIG. 15B is a side view of the modification of the second shield 90. FIG. 15C is a perspective view of an assembly of the lens unit 30 and the modification of the second shield 90 as viewed from below. FIG. 15D is a side view of an assembly of the lens unit 30, the modification of the second shield 90, and the circuit board 40.

In the modification of the second shield 90 illustrated in FIGS. 15A to 15D, unlike the example of FIGS. 10A to 10D, each of the first contact point 94*a*, the second contact point 94*b*, the third contact point 94*c*, and the fourth contact point 94*d* is bent and extends upward, that is, toward the third surface 90*a* of the second shield 90. In the modification, when the vehicular camera 100 is assembled, the assembly in FIG. 15C can be smoothly disposed inside the housing 60 without the four contact points becoming an obstacle.

Further, as illustrated in FIG. 15D, among the four support columns including the support column 97*a*, the support column 97*b*, the support column 97*c*, and the support column 97*d*, at least the three support columns including the first support column, the second support column, and the third support column reach the first surface 40*a* of the circuit board 40 and support the lens unit 30. Accordingly, the image sensor 41 can capture an image of the light from the outside, and the second shield 90 and the lens unit 30 can be stably supported by the circuit board 40 and the plurality of support columns.

Figure 16A:
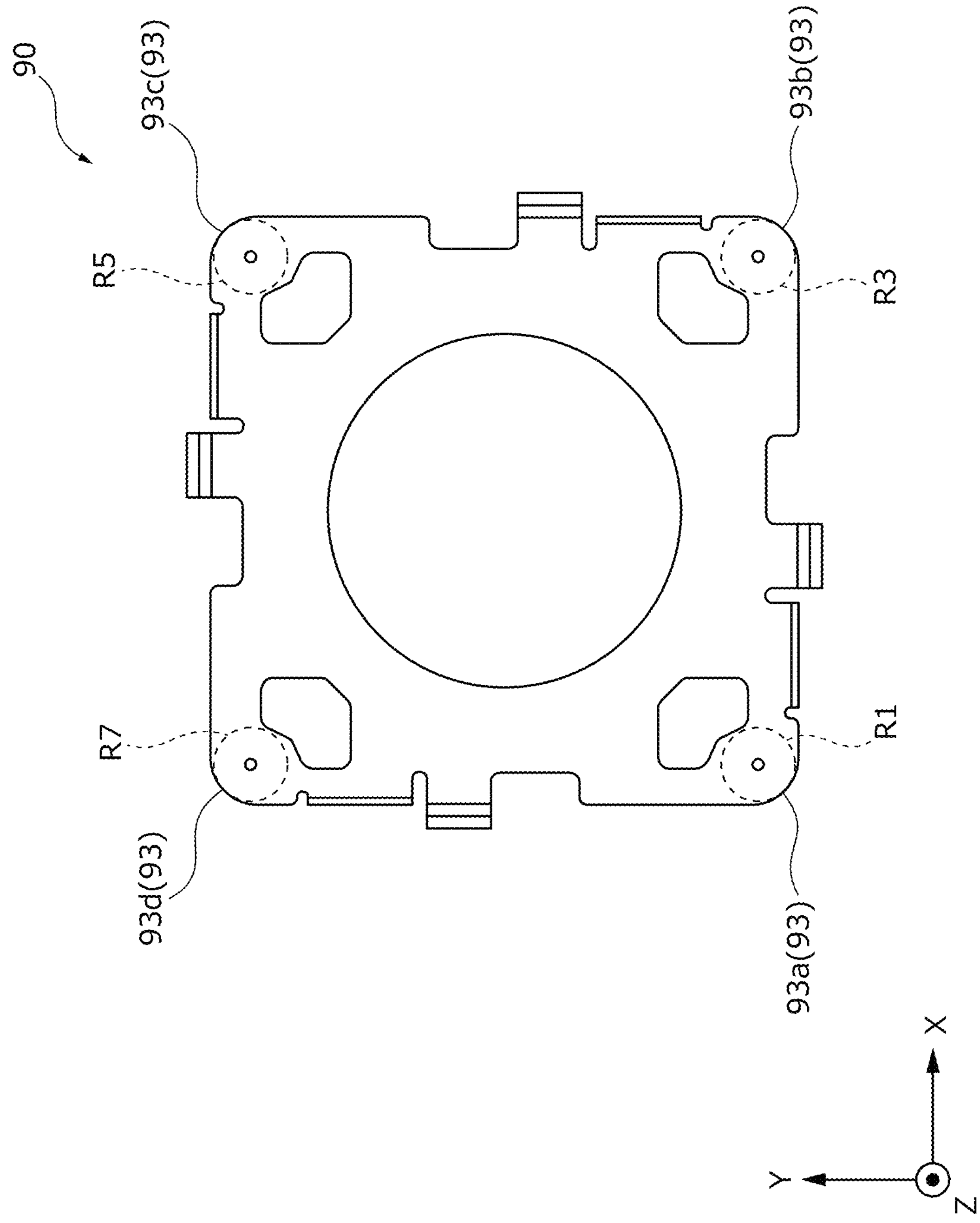
FIG. 16A is a top view illustrating a curvature of each curved end surface in the second shield.
Figure 16B:
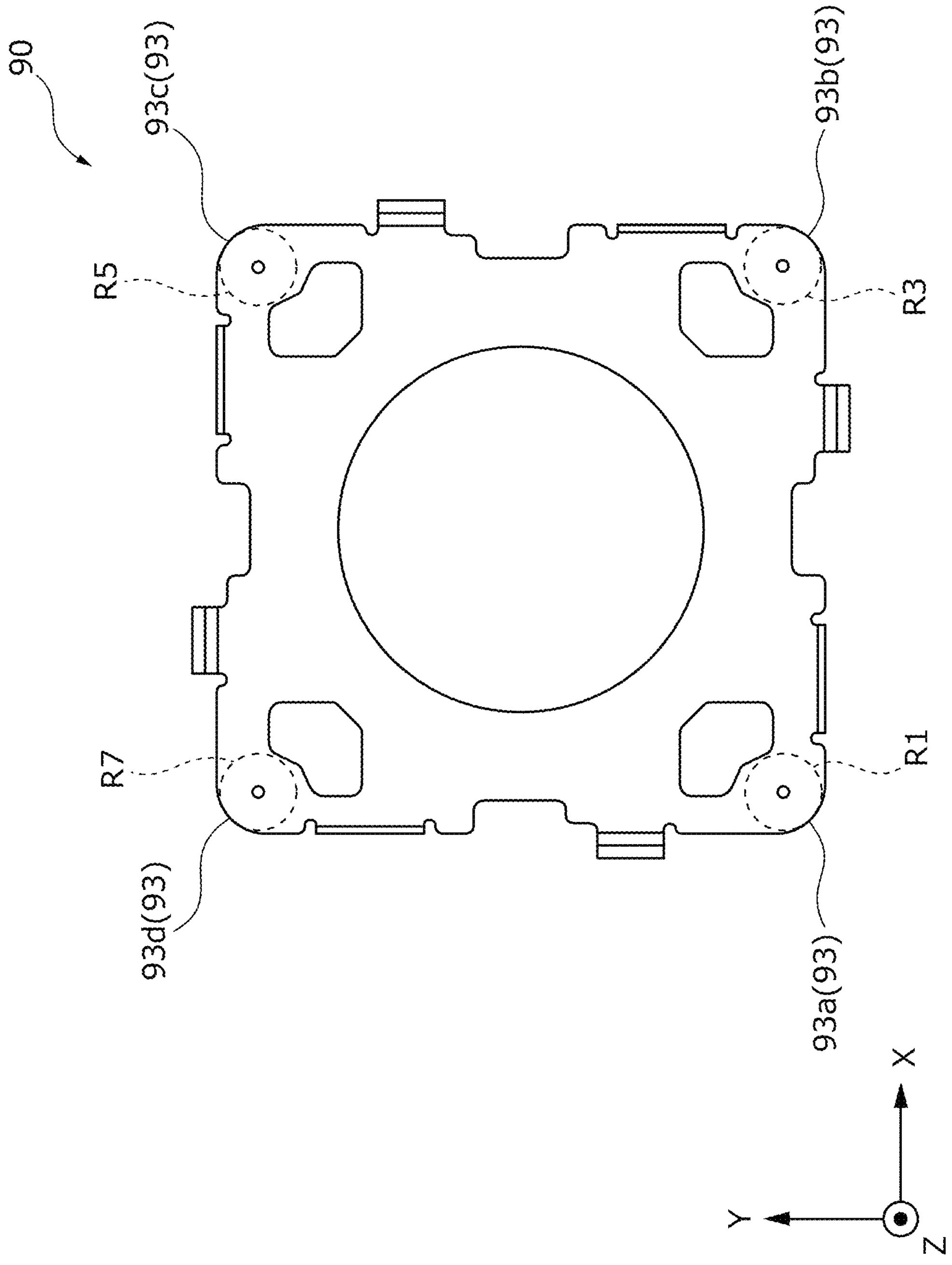
FIG. 16B is a top view illustrating the curvature of each curved end surface in the modification of the second shield.
Figure 17:
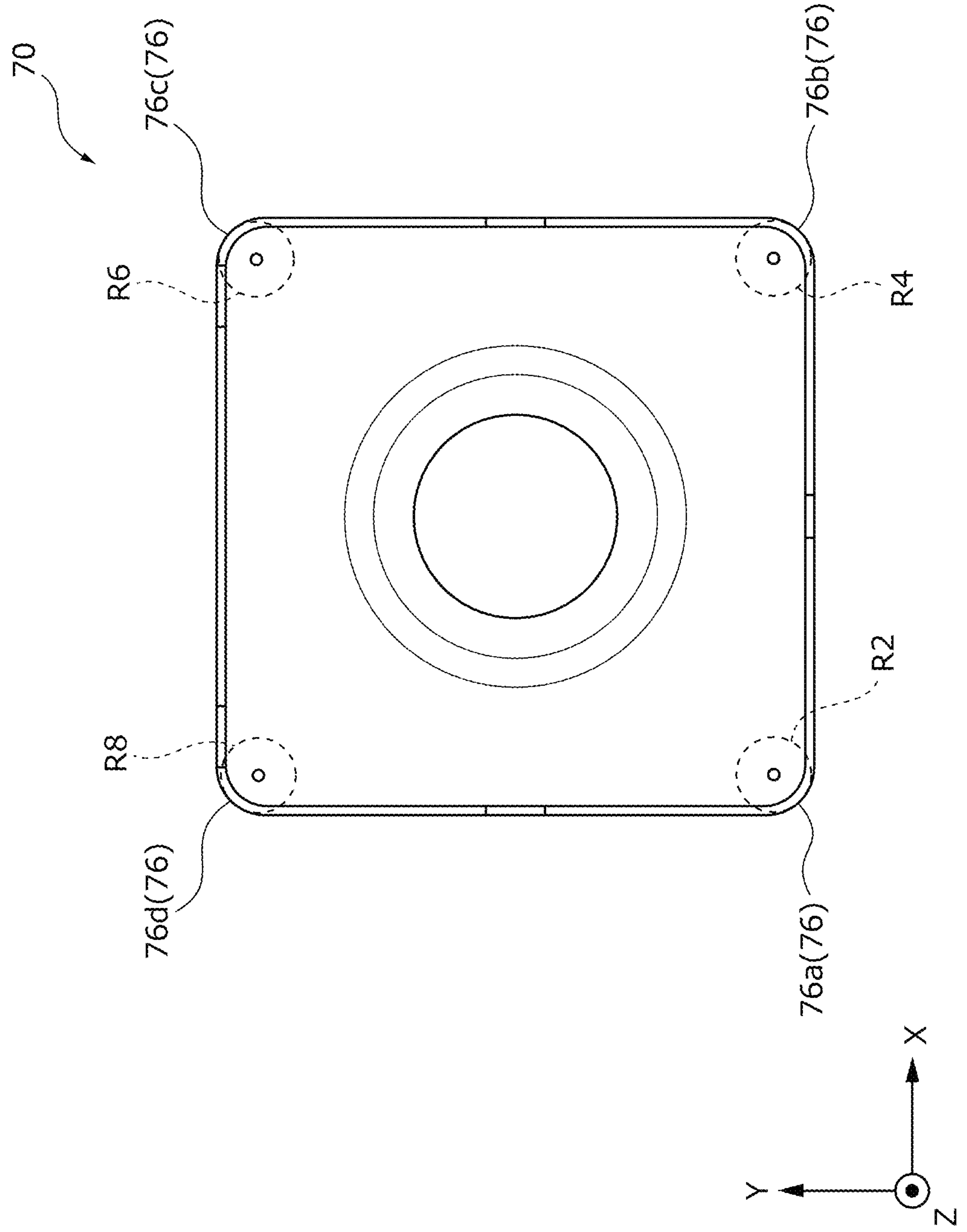
FIG. 17 is a top view illustrating a curvature of each curved side surface portion in the first shield.

FIG. 16A is a top view illustrating a curvature of each curved end surface 93 in the second shield 90. FIG. 16B is a top view illustrating the curvature of each curved end surface 93 in the modification of the second shield 90. FIG. 17 is a top view illustrating a curvature of each curved side surface portion 76 in the first shield 70.

As illustrated in FIGS. 16A and 16B, the first curved end surface 93*a* of the second shield 90 is a curved surface having a curvature R1 in a planar view, the second curved end surface 93*b* is a curved surface having a curvature R3 in the planar view, the third curved end surface 93*c* is a curved surface having a curvature R5 in the planar view, and the fourth curved end surface 93*d* is a curved surface having a curvature R7 in the planar view. The R1, R3, R5, and R7 may be the same value, or may be different values.

As illustrated in FIG. 17, a portion corresponding to the first curved side surface portion 76*a* of the first shield 70 is a curved surface having a curvature R2 in a planar view, a portion corresponding to the second curved side surface portion 76*b* is a curved surface having a curvature R4 in the planar view, a portion corresponding to the third curved side surface portion 76*c* is a curved surface having a curvature R6 in the planar view, and a portion corresponding to the fourth curved side surface portion 76*d* is a curved surface having a curvature R8 in the planar view. The R2, R4, R6, and R8 may be the same value, or may be different values.

In the present embodiment, the R1 is set to be equal to or less than the R2 ($R1 \leq R2$), the R3 is set to be equal to or less than the R4 (R3≤R4), the R5 is set to be equal to or less than the R6 (R5≤R6), and the R7 is set to be equal to or less than the R8 (R7≤R8).

Therefore, the degree of bending of the curved side surface portion 76 of the first shield 70 on the outer side is larger than the degree of bending of the curved end surface of the second shield 90 on the inner side, and thus the sizes of the first shield 70 and the second shield 90 can be set such that the first side surface portion 71*a* to the fourth side surface portion 71*d* of the first shield approach the ninth side 92*a* to the twelfth side 92*d* of the second shield, respectively, the gap between the first shield 70 and the second shield 90 can be reduced, and the excellent shielding performance can be secured.

Figure 18:
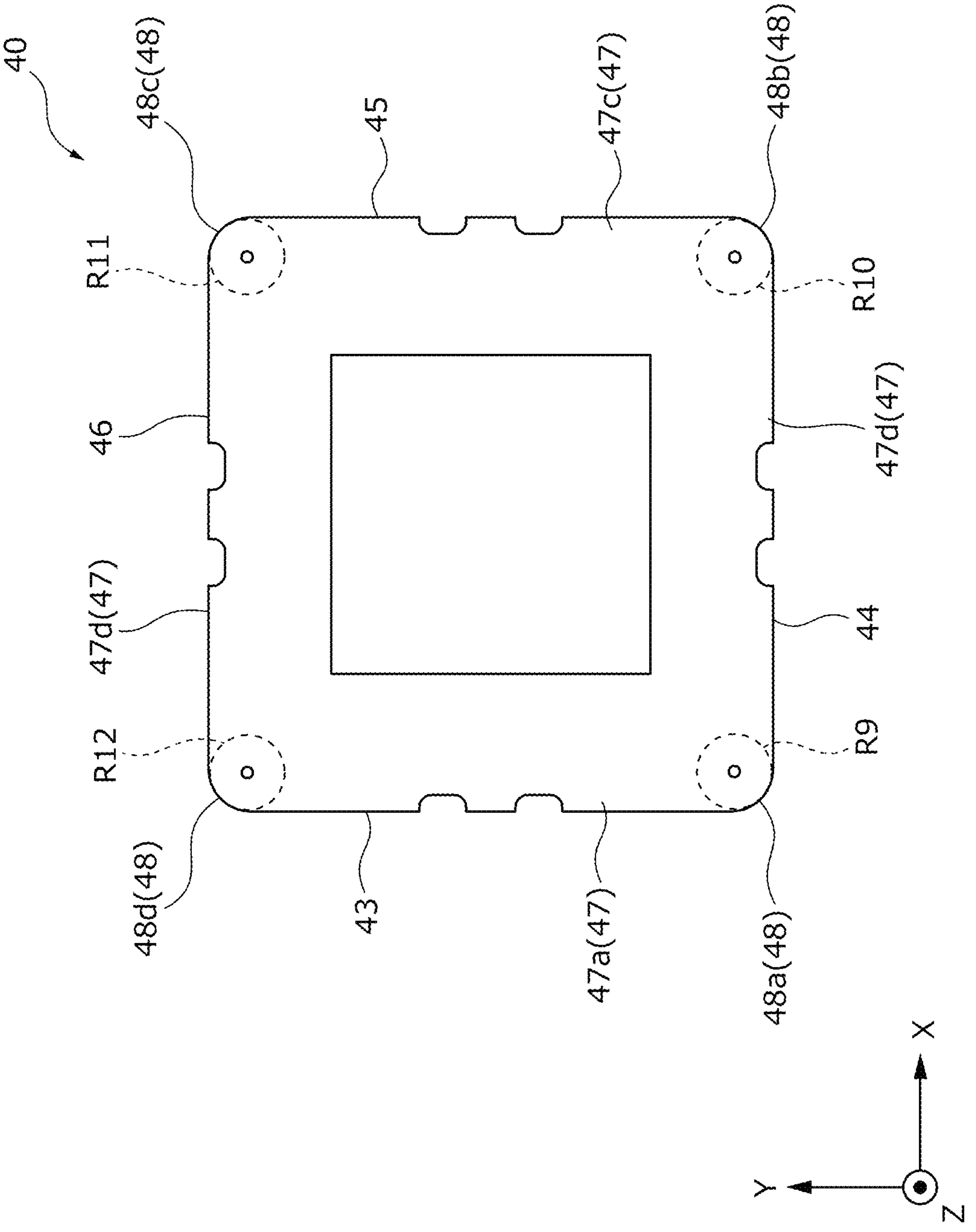
FIG. 18 is a top view illustrating a curvature of each corner curved surface in the circuit board.

FIG. 18 is a top view illustrating a curvature of a corner curved surface 48 in the circuit board 40. As also described in FIG. 7E, the circuit board 40 has the first shape including at least the first side 43, the second side 44, the third side 45, and the fourth side 46 in the planar view. The end surface 47 of the circuit board 40 includes at least a first end surface 47*a* corresponding to the first side 43, a second end surface 47*b* corresponding to the second side 44, a third end surface 47*c* corresponding to the third side 45, and a fourth end surface 47*d* corresponding to the fourth side 46.

Further, as illustrated in FIG. 18, the corner curved surface 48 includes a first corner curved surface 48*a*, a second corner curved surface 48*b*, a third corner curved surface 48*c*, and a fourth corner curved surface 48*d*. The first corner curved surface 48*a* is a curved surface that connects the first side 43 and the second side 44 and has a curvature R9 in a planar view. The second corner curved surface 48*b* is a curved surface that connects the second side 44 and the third side 45 and has a curvature R10 in the planar view. The third corner curved surface 48*c* is a curved surface that connects the third side 45 and the fourth side 46 and has a curvature R11 in the planar view. The fourth corner curved surface 48*d* is a curved surface that connects the fourth side 46 and the first side 43 and has a curvature R12 in the planar view.

In the second embodiment, although the vehicular camera 100 includes the third bottom surface portion 72 having the step portion and the second shield 90, both the third bottom surface portion 72 having the step portion and the second shield 90 are not necessarily provided. The vehicular camera 100 may include the third bottom surface portion 72 having the step portion but not include the second shield 90, and in this case, the first shield 70 becomes a single shield. In addition, the vehicular camera 100 may include the second shield 90 but not include the third bottom surface portion 72 having the step portion. In this case, the third bottom surface portion 72 may be implemented by only the flat first bottom surface portion 73, for example.

Figure 11:
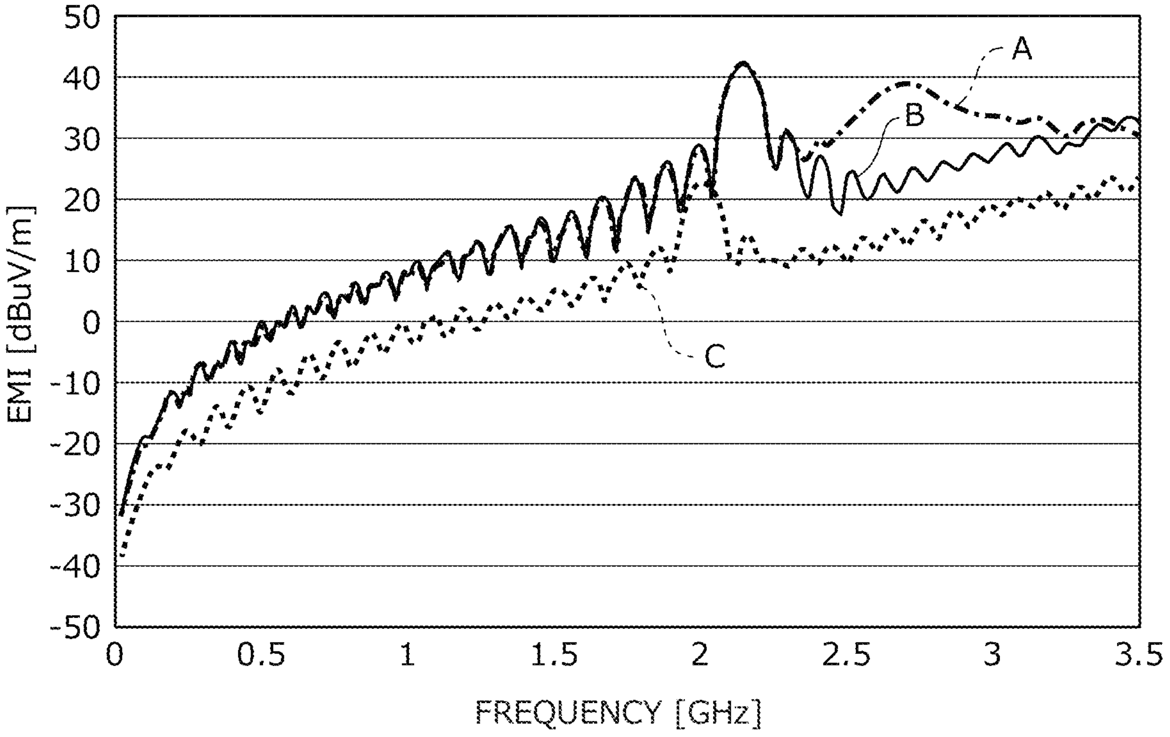
FIG. 11 is a graph illustrating a measurement result of EMI inside a housing with respect to frequency in relation to three types of vehicular cameras.

FIG. 11 is a graph illustrating a measurement result of EMI inside a housing with respect to frequency in relation to three types of vehicular cameras. A horizontal axis indicates a frequency of radio waves arriving at the vehicular camera, and a vertical axis indicates the magnitude of electromagnetic interference (EMI) (unit: dBμV/m) inside the housing of the vehicular camera. It can be evaluated that the smaller the EMI, the higher the shielding performance.

A graph A illustrates a measurement result of a vehicular camera that includes a housing made of a resin and is not provided with the first shield 70 and the second shield 90. A graph B illustrates a measurement result of a vehicular camera that includes a housing made of a resin and is provided with only the first shield 70. A graph C illustrates a measurement result of a vehicular camera that includes a housing made of a resin and is provided with both the first shield 70 and the second shield 90.

The vehicular camera related to the graph C is provided with both the first shield 70 and the second shield 90, and thus exhibits high shielding performance comparable to that of a metal housing. The vehicular camera related to the graph B exhibits lower shielding performance than that of the vehicular camera related to the graph C, but exhibits higher shielding performance than that of the vehicular camera related to the graph A particularly in a high-frequency region (about 2.3 GHz or more). Since a high-frequency radio wave is more likely to propagate on a surface than a low-frequency radio wave, it is estimated that such a difference in performance appears in the high-frequency region.

The present application is based on Japanese patent applications (Japanese Patent Applications 2022-105021, 2022-105022, and 2022-105023) filed on Jun. 29, 2022, the contents thereof are incorporated herein by reference.

As described above, at least the following matters are described in the present disclosure. Components corresponding to the embodiments described above are shown in parentheses, but the present disclosure is not limited thereto.

(A1) A vehicular camera (the vehicular camera 100), including:

- a first tubular portion (the first tubular portion 37) having a first tubular shape; a lens unit (the lens unit 30) that includes at least one lens disposed inside the first tubular portion;
- an image sensor (the image sensor 41) disposed on an optical axis (the optical axis L) of the at least one lens;
- a housing (the housing 60) that includes a second tubular portion (the large-diameter tubular portion 61) having a second tubular shape along the optical axis and accommodates at least the image sensor inside the second tubular portion; and
- a plate-shaped ring member (the ring member 20) formed of a first resin having predetermined light transmissivity, in which
- the lens unit includes a flange portion (the flange portion 32) disposed on an outer side of the first tubular portion so as to extend over an entire periphery around the optical axis and extend outward with reference to the optical axis,
- the flange portion of the lens unit is disposed on an inner side with respect to the second tubular portion of the housing in a radial direction orthogonal to the optical axis,
- the flange portion of the lens unit includes a ring-shaped first surface (the first surface 32*a*) facing the image sensor and a ring-shaped second surface (the second surface 32*b*) opposite to the first surface,
- the second surface of the flange portion of the lens unit is provided with a first welding rib (the first welding rib 35) that is made of a second resin having a first light absorptivity, protrudes in a direction opposite to the first surface, and is disposed over the entire periphery around the optical axis,
- an end surface (the end surface 63) of the second tubular portion of the housing is provided with a second welding rib (the second welding rib 64) that is made of a third resin having a second light absorptivity, protrudes along the optical axis direction, and is disposed over the entire periphery around the optical axis,
- the ring member is welded to the first welding rib on the second surface of the flange portion of the lens unit, and is welded to the second welding rib on the end surface of the second tubular portion of the housing, the lens unit includes a protruding portion (the protruding portion 33) that protrudes in the radial direction and is in contact with an inner surface of the second tubular portion of the housing, and as the ring member is welded to the first welding rib, a first burr (the first burr 36) generated from the first welding rib does not reach the end surface of the second tubular portion of the housing at a position overlapping the protruding portion.

Accordingly, in the vehicular camera, the reliable welding can be achieved without depending on the shape accuracy of the second surface of the flange portion of the lens unit and the ring member, and the first burr generated from the first welding rib can be restrained from adversely affecting the welding between the ring member and the housing.

(A2) The vehicular camera according to (A1), in which the protruding portion of the lens unit includes at least a first protruding portion, a second protruding portion, and a third protruding portion.

Accordingly, in the vehicular camera, the lens unit can be stably fixed to the housing by using the three protruding portions, that is, the first protruding portion, the second protruding portion, and the third protruding portion.

(A3) The vehicular camera according to (A1) or (A2), in which the protruding portion of the lens unit is a rib disposed along the optical axis direction.

Accordingly, the protruding portion can also be easily formed when the lens unit is formed.

(A4) The vehicular camera according to any one of (A1) to (A3), in which the first welding rib on the second surface of the flange portion of the lens unit is located in a region close to the inner side on the second surface of the flange portion of the lens unit in the radial direction.

Accordingly, in the vehicular camera, the first burr generated from the first welding rib is less likely to reach a housing side.

(A5) The vehicular camera according to any one of (A1) to (A4), in which as the ring member is welded to the second welding rib, a second burr (second burr 65) generated from the second welding rib does not reach the second surface of the flange portion of the lens unit at a position overlapping the protruding portion.

Accordingly, in the vehicular camera, the reliable welding can be achieved without depending on the shape accuracy of the end surface of the housing and the ring member, and the second burr generated from the second welding rib can be restrained from adversely affecting the welding between the ring member and the lens unit.

(A6) The vehicular camera according to (A5), in which the second welding rib on the end surface of the second tubular portion of the housing is located in a region close to the inner side on the end surface in the radial direction.

Accordingly, in the vehicular camera, the second burr generated from the second welding rib can be restrained from protruding to the outer side of the housing.

(A7) The vehicular camera according to any one of (A1) to (A6), in which the housing includes a bottom surface portion (the base end portion 66) opposite to the end surface, and the image sensor is surrounded by the second tubular portion and the bottom surface portion of the housing, the ring member, and the lens unit.

Accordingly, the image sensor can be reliably surrounded by the housing, the ring member, and the lens unit.

(A8) The vehicular camera according to (A7), in which the image sensor is disposed on the circuit board, the image sensor and the circuit board are surrounded by the second tubular portion, the bottom surface portion of the housing, the ring member, and the lens unit, a connector (the connector 80) including a terminal (the first terminal 81 and the second terminal 82) which passes through the outside and the inside of the housing and allows an electric signal to transmit therethrough is disposed on the bottom surface portion of the housing, and the terminal of the connector is electrically connected to a circuit of the circuit board.

Accordingly, it is possible to ensure the electrical connection with the outside while reliably surrounding the image sensor and the circuit board by the housing, the ring member, and the lens unit.

(A9) The vehicular camera according to any one of (A1) to (A8), in which a cross section of the first tubular portion of the lens unit along the radial direction has a circle, and a cross section of the second tubular portion of the housing along the radial direction has a quadrilateral shape.

Accordingly, the lens unit and the housing can be easily formed.

(A10) The vehicular camera according to any one of (A1) to (A9), in which a first distance between the ring member and the second surface of the flange portion of the lens unit is set to be larger than a second distance between the ring member and the end surface of the second tubular portion of the housing.

Accordingly, in the vehicular camera, the first burr generated from the first welding rib is further less likely to reach the housing side.

(A11) The vehicular camera according to any one of (A1) to (A10), in which the first light absorptivity of the second resin is the same as the second light absorptivity of the third resin.

Accordingly, in the vehicular camera, since the first light absorptivity of the second resin and the second light absorptivity of the third resin are the same, it is not necessary to change the type of laser for the laser welding between the ring member and the housing and the laser welding between the ring member and the lens unit, and the laser welding can be easily performed.

(B1) A vehicular camera (the vehicular camera 100), including:

a lens unit (the lens unit 30) that includes at least one lens;

a circuit board (the circuit board 40) that has a first surface (the first surface 40*a*), a second surface (the second surface 40*b*) opposite to the first surface, and an end surface (the end surface 47) between the first surface and the second surface;

an image sensor (the image sensor 41) disposed on the first surface of the circuit board and disposed on an optical axis (the optical axis L) of the at least one lens;

a housing (the housing 60) supporting the lens unit and accommodating at least the circuit board and the image sensor;

a first metal shield (the first shield 70) disposed to surround the circuit board and partially face the second surface of the circuit board in an internal space of the housing; and a second metal shield (the second shield 90) disposed to partially face the first surface of the circuit board, in which the circuit board has a first shape that includes at least a first side (the first side 43), a second side (the second side 44), a third side (the third side 45), and a fourth side (the fourth side 46) in a planar view, the end surface of the circuit board includes at least a first end surface (the first end surface 47*a*) corresponding to the first side, a second end surface (the second end surface 47*b*) corresponding to the second side, a third end surface (the third end surface 47*c*) corresponding to the third side, and a fourth end surface (the fourth end surface 47*d*) corresponding to the fourth side, the first metal shield includes a third bottom surface portion (the third bottom surface portion 72) disposed to face the second surface of the circuit board and having a second shape including at least a fifth side (the fifth side 72*a*), a sixth side (the sixth side 72*b*), a seventh side (the seventh side 72*c*), and an eighth side (the eighth side 72*d*) in a planar view, a first side surface portion (the first side surface portion 71*a*) disposed toward the circuit board to correspond to the fifth side of the third bottom surface portion, a second side surface portion (the second side surface portion 71*b*) disposed toward the circuit board to correspond to the sixth side of the third bottom surface portion, a third side surface portion (the third side surface portion 71*c*) disposed toward the circuit board to correspond to the seventh side of the third bottom surface portion, and a fourth side surface portion (the fourth side surface portion 71*d*) disposed toward the circuit board to correspond to the eighth side of the third bottom surface portion, the first end surface of the circuit board faces the first side surface portion of the first metal shield, the second end surface of the circuit board faces the second side surface portion of the first metal shield, the third end surface of the circuit board faces the third side surface portion of the first metal shield, the fourth end surface of the circuit board faces the fourth side surface portion of the first metal shield, the second metal shield has a fifth shape including at least a ninth side (the ninth side 92*a*), a tenth side (the tenth side 92*b*), an eleventh side (the eleventh side 92*c*), and a twelfth side (the twelfth side 92*d*) in a planar view, and includes a hole (the hole 96*a*) including the center of the fifth shape and corresponding to the image sensor disposed on the first surface of the circuit board, at least the first side surface portion, the second side surface portion, the third side surface portion, the fourth side surface portion, and the third bottom surface portion of the first metal shield are formed by a contiguously curved surface, and the second metal shield includes a first contact point (the first contact point 94*a*) electrically connected to the first side surface portion of the first metal shield on the ninth side, a second contact point (the second contact point 94*b*) electrically connected to the second side surface portion of the first metal shield on the tenth side, a third contact point (the third contact point 94*c*) electrically connected to the third side surface portion of the first metal shield on the eleventh side, and a fourth contact point (the fourth contact point 94*d*) electrically connected to the fourth side surface portion of the first metal shield on the twelfth side.

Accordingly, in the vehicular camera, by using the two shields to form the electrically closed space surrounding the circuit board, the resistance to the external electromagnetic noise can be improved while restraining the electromagnetic noise from being leaked to the outside.

(B2) The vehicular camera according to (B1), in which the second metal shield includes a third surface (the third surface 90*a*), a fourth surface (the fourth surface 90*b*) opposite to the third surface, and an end surface (the end surface 95) connecting the third surface and the fourth surface, the end surface of the second metal shield includes at least a fifth end surface (the fifth end surface 95*a*) corresponding to the ninth side, a sixth end surface (the sixth end surface 95*b*) corresponding to the tenth side, a seventh end surface (the seventh end surface 95*c*) corresponding to the eleventh side, and an eighth end surface (the eighth end surface 95*d*) corresponding to the twelfth side, the fifth end surface of the second metal shield faces the first side surface portion of the first metal shield, the sixth end surface of the second metal shield faces the second side surface portion of the first metal shield, the seventh end surface of the second metal shield faces the third side surface portion of the first metal shield, and the eighth end surface of the second metal shield faces the fourth side surface portion of the first metal shield.

Accordingly, the side surface portion of the first shield faces the end surface of the second shield, and thus the gap between the first shield and the second shield can be reduced, and the excellent shielding performance can be secured.

(B3) The vehicular camera according to (B2), in which the first metal shield includes a first curved side surface portion (the first curved side surface portion 76*a*) connecting the first side surface portion and the second side surface portion, a second curved side surface portion (the second curved side surface portion 76*b*) connecting the second side surface portion and the third side surface portion, a third curved side surface portion (the third curved side surface portion 76*c*) connecting the third side surface portion and the fourth side surface portion, and a fourth curved side surface portion (a fourth curved side surface portion 76*d*) connecting the fourth side surface portion and the first side surface portion, and the second metal shield includes a first curved end surface (the first curved end surface 93*a*) connecting the fifth end surface and the sixth end surface, a second curved end surface (the second curved end surface 93*b*) connecting the sixth end surface and the seventh end surface, a third curved end surface (the third curved end surface 93*c*) connecting the seventh end surface and the eighth end surface, and a fourth curved end surface (the fourth curved end surface 93*d*) connecting the eighth end surface and the fifth end surface, the first curved end surface of the second metal shield faces the first curved side surface portion of the first metal shield, the second curved end surface of the second metal shield faces the second curved side surface portion of the first metal shield, the third curved end surface of the second metal shield faces the third curved side surface portion of the first metal shield, and the fourth curved end surface of the second metal shield faces the fourth curved side surface portion of the first metal shield.

Accordingly, in the vehicular camera, the gap between the curved side surface portion corresponding to the corners of the first shield and the curved end surface corresponding to the corners of the second shield can be reduced, and the excellent shielding performance can be secured.

(B4) The vehicular camera according to (B3), in which the first curved end surface of the second metal shield has an outward convex shape with reference to the center of the fifth shape of the second metal shield, the second curved end surface of the second metal shield has an outward convex shape with reference to the center of the fifth shape, the third curved end surface of the second metal shield has an outward convex shape with reference to the center of the fifth shape, the fourth curved end surface of the second metal shield has an outward convex shape with reference to the center of the fifth shape, an inner side surface of the first curved side surface portion of the first metal shield has a concave shape corresponding to the convex shape of the first curved end surface of the second metal shield, an inner side surface of the second curved side surface portion of the first metal shield has a concave shape corresponding to the convex shape of the second curved end surface of the second metal shield, an inner side surface of the third curved side surface portion of the first metal shield has a concave shape corresponding to the convex shape of the third curved end surface of the second metal shield, and an inner side surface of the fourth curved side surface portion of the first metal shield has a concave shape corresponding to the convex shape of the fourth curved end surface of the second metal shield.

Accordingly, in the vehicular camera, by disposing the curved end surface of the second shield to correspond to the curved side surface portion necessary for contiguously forming the side surface portions of the first shield, and reducing the gap with the first shield at the four corners of the second shield as small as possible, the resistance to the external electromagnetic noise can be improved while restraining the electromagnetic noise from being leaked to the outside.

(B5) The vehicular camera according to (B4), in which the first curved end surface of the second metal shield has a curvature R1 in a planar view, a portion corresponding to the first curved side surface portion of the first metal shield has a curvature R2 in a planar view, and the R1 is equal to or less than the R2, the second curved end surface of the second metal shield has a curvature R3 in the planar view, a portion corresponding to the second curved side surface portion of the first metal shield has a curvature R4 in the planar view, and the R3 is equal to or less than the R4, the third curved end surface of the second metal shield has a curvature R5 in the planar view, a portion corresponding to the third curved side surface portion of the first metal shield has a curvature R6 in the planar view, and the R5 is equal to or less than the R6, and the fourth curved end surface of the second metal shield has a curvature R7 in the planar view, a portion corresponding to the fourth curved side surface portion of the first metal shield has a curvature R8 in the planar view, and the R7 is equal to or less than the R8.

Therefore, in the vehicular camera, the degree of bending of the curved side surface portion of the first shield on the outer side is larger than the degree of bending of the curved end surface of the second shield on the inner side, and thus the sizes of the first shield and the second shield can be set such that the first side surface portion to the fourth side surface portion of the first shield approach the ninth side to the twelfth side of the second shield, respectively, the gap between the first shield and the second shield can be reduced, and the excellent shielding performance can be secured.

(B6) The vehicular camera according to any one of (B2) to (B5), in which a planar view of portions of the first metal shield corresponding to the fifth end surface, the sixth end surface, the seventh end surface, and the eighth end surface of the second metal shield has a sixth shape, the sixth shape is larger than the second shape of the third bottom surface portion of the first metal shield, the first side surface portion and the third side surface portion of the first metal shield face each other, the first side surface portion and the third side surface portion of the first metal shield extend from the third bottom surface portion toward the portions corresponding to the fifth end surface, the sixth end surface, the seventh end surface, and the eighth end surface of the second metal shield, the second side surface portion and the fourth side surface portion of the first metal shield face each other, and the second side surface portion and the fourth side surface portion of the first metal shield extend from the third bottom surface portion toward the portions corresponding to the fifth end surface, the sixth end surface, the seventh end surface, and the eighth end surface of the second metal shield.

Accordingly, in the vehicular camera, the opening side of the first shield on which the second shield exists is formed to have a shape larger than the third bottom surface portion on the bottom side, and thus the first shield can be easily processed.

(B7) The vehicular camera according to any one of (B1) to (B6), in which the housing includes a connector (the connector 80) disposed on a bottom surface facing the circuit board, the connector extending over the inside and outside of the housing, the connector includes at least a first terminal (the first terminal 81) and a second terminal (the second terminal 82) that electrically connect the inside and outside of the housing, the first terminal and the second terminal of the connector are electrically connected to a circuit of the circuit board, and the connector is disposed to penetrate the third bottom surface portion of the first metal shield.

Accordingly, the connector and the circuit board can be easily connected in the vehicular camera.

(B8) The vehicular camera according to (B7), in which the connector fixes the third bottom surface portion of the first metal shield and the bottom surface of the housing, and the second terminal of the connector and the first metal shield are electrically connected to each other on the bottom surface of the housing.

Accordingly, in the vehicular camera, the connector can fix the first shield and the housing, and the electrical connection between the connector and the first shield can also be secured.

(B9) The vehicular camera according to any one of (B1) to (B8), in which the hole of the second metal shield corresponding to the image sensor disposed on the first surface of the circuit board is set to a first hole, the second metal shield includes at least a second hole, a third hole, and a fourth hole around the first hole, and a first support column, a second support column, and a third support column, by which the first surface of the circuit board supports the lens unit, penetrate through the second hole, the third hole, and the fourth hole, respectively.

Accordingly, in the vehicular camera, the image sensor can capture an image of the light from the outside, and the second shield and the lens unit can be stably supported by the circuit board and the plurality of support columns.

(B10) The vehicular camera according to any one of (B1) to (B9), in which the first side surface portion, the second side surface portion, the third side surface portion, the fourth side surface portion, and the third bottom surface portion of the first metal shield are formed of a metal plate by drawing.

Accordingly, in the vehicular camera, the gap in the first shield is eliminated, the electromagnetic waves are shielded at a high level and low cost, and the excellent shielding performance can be secured.

(C1) A vehicular camera (the vehicular camera 100), including:

a lens unit (the lens unit 30) that includes at least one lens;

a circuit board (the circuit board 40) that has a first surface (the first surface 40*a*), a second surface (the second surface 40*b*) opposite to the first surface, and an end surface (the end surface 47) between the first surface and the second surface;

an image sensor (the image sensor 41) electrically connected to a circuit of the circuit board and disposed on an optical axis (the optical axis L) of the at least one lens;

a housing (the housing 60) supporting the lens unit and accommodating at least the circuit board and the image sensor; and a metal shield (the first shield 70) disposed in an internal space of the housing to surround the circuit board, in which the circuit board has a first shape that includes at least a first side (the first side 43), a second side (the second side 44), a third side (the third side 45), and a fourth side (the fourth side 46) in a planar view, the end surface of the circuit board includes at least a first end surface (the first end surface 47*a*) corresponding to the first side, a second end surface (the second end surface 47*b*) corresponding to the second side, a third end surface (the third end surface 47*c*) corresponding to the third side, and a fourth end surface (the fourth end surface 47*d*) corresponding to the fourth side, the housing includes a connector (the connector 80) extending over the inside and outside of the housing, the connector disposed on a bottom surface (the bottom surface 66*a*) facing the circuit board, the connector includes at least a first terminal (the first terminal 81) and a second terminal (the second terminal 82) that electrically connect the inside and outside of the housing, and the first terminal and the second terminal of the connector are electrically connected to the circuit of the circuit board, the metal shield includes a first bottom surface portion (the first bottom surface portion 73) that is disposed to face the second surface of the circuit board, has a second shape including a fifth side (the fifth side 72*a*), a sixth side (the sixth side 72*b*), a seventh side (the seventh side 72*c*), and an eighth side (the eighth side 72*d*) in a planar view, and includes a hole (the hole 73*e*) disposed to include a central portion of the second shape, a second bottom surface portion (the second bottom surface portion 75) that is disposed to correspond to the hole disposed to include the central portion of the second shape of the first bottom surface portion, face the second surface of the circuit board, and is disposed to be separated from the first bottom surface portion with reference to the second surface of the circuit board, a first side surface portion (the first side surface portion 71*a*) disposed to correspond to the fifth side of the first bottom surface portion in a direction opposite to the second bottom surface portion, a second side surface portion (the second side surface portion 71*b*) disposed to correspond to the sixth side of the first bottom surface portion in the direction opposite to the second bottom surface portion, a third side surface portion (the third side surface portion 71*c*) disposed to correspond to the seventh side of the first bottom surface portion in the direction opposite to the second bottom surface portion, a fourth side surface portion (the fourth side surface portion 71*d*) disposed to correspond to the eighth side of the first bottom surface portion in the direction opposite to the second bottom surface portion, and a connection portion (the connection portion 74) that connects an entire periphery of the hole disposed to include the central portion of the second shape of the first bottom surface portion and an entire periphery of the second bottom surface portion, the second bottom surface portion of the metal shield corresponds to the bottom surface of the housing, the connector is disposed to penetrate the second bottom surface portion of the metal shield, at least a part of the first side surface portion of the metal shield faces the first end surface of the circuit board, at least a part of the second side surface portion of the metal shield faces the second end surface of the circuit board, at least a part of the third side surface portion of the metal shield faces the third end surface of the circuit board, at least a part of the fourth side surface portion of the metal shield faces the fourth end surface of the circuit board, the hole disposed to include the central portion of the second shape of the first bottom surface portion of the metal shield has a third shape different from the second shape in a planar view, at least the first side surface portion, the second side surface portion, the third side surface portion, and the fourth side surface portion of the metal shield are formed by a contiguously curved surface, or at least the first side surface portion, the second side surface portion, the third side surface portion, the fourth side surface portion, the first bottom surface portion, the connection portion, and the second bottom surface portion are formed by a contiguously curved surface.

Accordingly, the first shield 70 has a two-stage configuration including the first bottom surface portion and the second bottom surface portion smaller than the first bottom surface portion, and thus the volume inside the first shield can be reduced. Accordingly, the distance between the heating component disposed on the circuit board and the first shield is reduced, and the heat generated by the heating component can be efficiently transmitted to the first shield.

(C2) The vehicular camera according to (C1), in which the image sensor is disposed on the first surface of the circuit board.

Accordingly, in the vehicular camera, the light from the outside can be easily guided to the image sensor.

(C3) The vehicular camera according to (C1) or (C2), in which the connector fixes the second bottom surface portion of the metal shield and the bottom surface of the housing.

Accordingly, in the vehicular camera, the connector can firmly fix the shield and the housing.

(C4) The vehicular camera according to any one of (C1) to (C3), in which the second terminal of the connector and the metal shield are electrically connected to each other on the bottom surface of the housing.

Accordingly, in the vehicular camera, the electrical connection between the connector and the shield can be easily secured.

(C5) The vehicular camera according to any one of (C1) to (C4), further including:

a heat conductive member (the heat conductive member 50) disposed between the second surface of the circuit board and the first bottom surface portion of the metal shield, and having predetermined heat conductivity.

Accordingly, in the vehicular camera, the number of the heat conductive members can be reduced, and the increase in cost can be restrained.

(C6) The vehicular camera according to any one of (C1) to (C5), in which the housing further includes an attachment portion (the attachment portion 69) for attachment to a vehicle, the attachment portion is a female screw extending along the optical axis direction, and the female screw is disposed, on an outer side of the second bottom surface portion of the metal shield with reference to the optical axis, on a side opposite to the circuit board of the first bottom surface portion of the metal shield.

Accordingly, in the vehicular camera, it is possible to ensure ease of attachment of the vehicular camera to the vehicle while restraining the increase in the size of the housing.

(C7) The vehicular camera according to any one of (C1) to (C6), in which the first shape of the circuit board is a first quadrilateral shape, the second shape of the first bottom surface portion of the metal shield is a second quadrilateral shape, and the third shape of the hole of the metal shield is a circular shape.

Accordingly, in the vehicular camera, the circuit board and the shield having simple shapes can be easily formed.

(C8) The vehicular camera according to any one of (C1) to (C7), in which a first area surrounded by the periphery of the first bottom surface portion of the metal shield is larger than a second area surrounded by the periphery of the second bottom surface portion of the metal shield.

Accordingly, in the vehicular camera, the space around the connection portion and the second bottom surface portion can be secured, and the handleability of the vehicular camera can be improved.

(C9) The vehicular camera according to any one of (C1) to (C8), in which the first end surface of the circuit board faces the first side surface portion of the metal shield, the second end surface of the circuit board faces the second side surface portion of the metal shield, the third end surface of the circuit board faces the third side surface portion of the metal shield, and the fourth end surface of the circuit board faces the fourth side surface portion of the metal shield.

Accordingly, in the vehicular camera, the shielding property of the circuit board from the outside can be improved.

(C10) The vehicular camera according to any one of (C1) to (C9), in which the first side surface portion, the second side surface portion, the third side surface portion, the fourth side surface portion, the first bottom surface portion, the connection portion, and the second bottom surface portion of the metal shield, which are formed by the contiguously curved surface, are formed of a metal plate by drawing.

Accordingly, in the vehicular camera, the gap in the shield is eliminated, the electromagnetic waves are shielded at a high level and low cost, and the excellent shielding performance can be secured.

Although the embodiments have been described above with reference to the accompanying drawings, the present disclosure is not limited to such embodiments. It is apparent to a person skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the embodiments described above may be combined freely in a range without departing from the gist of the invention.

INDUSTRIAL APPLICABILITY

The present disclosure is useful as a vehicular camera that can be manufactured at low cost and ensures excellent imaging performance.

What is claimed is:

1. A vehicular camera, including:

a first tubular portion having a first tubular shape;

a lens unit that includes at least one lens disposed inside the first tubular portion;

an image sensor disposed on an optical axis of the at least one lens;

a housing that includes a second tubular portion having a second tubular shape along the optical axis and accommodates at least the image sensor inside the second tubular portion; and a plate-shaped ring member formed of a first resin having predetermined light transmissivity, the lens unit includes a flange portion disposed on an outer side of the first tubular portion so as to extend over an entire periphery around the optical axis and extend outward with reference to the optical axis, the flange portion of the lens unit is disposed on an inner side with respect to the second tubular portion of the housing in a radial direction orthogonal to the optical axis, the flange portion of the lens unit includes a ring-shaped first surface facing the image sensor and a ring-shaped second surface opposite to the first surface, the second surface of the flange portion of the lens unit is provided with a first welding rib that is made of a second resin having a first light absorptivity, protrudes in a direction opposite to the first surface, and is disposed over the entire periphery around the optical axis, an end surface of the second tubular portion of the housing is provided with a second welding rib that is made of a third resin having a second light absorptivity, protrudes along the optical axis, and is disposed over the entire periphery around the optical axis, the ring member is welded to the first welding rib on the second surface of the flange portion of the lens unit, and is welded to the second welding rib on the end surface of the second tubular portion of the housing, the lens unit includes a protruding portion that protrudes in the radial direction and is in contact with an inner surface of the second tubular portion of the housing, and a first burr generated from the first welding rib does not reach the end surface of the second tubular portion of the housing at a position overlapping the protruding portion.

2. The vehicular camera according to claim 1, wherein the protruding portion of the lens unit includes at least a first protruding portion, a second protruding portion, and a third protruding portion.

3. The vehicular camera according to claim 1, wherein the protruding portion of the lens unit is a rib disposed along the optical axis direction.

4. The vehicular camera according to any one of claim 1, wherein the first welding rib on the second surface of the flange portion of the lens unit is located in a region close to the inner side on the second surface of the flange portion of the lens unit in the radial direction.

5. The vehicular camera according to any one of claim 1, wherein as the ring member is welded to the second welding rib, a second burr generated from the second welding rib does not reach the second surface of the flange portion of the lens unit at a position overlapping the protruding portion.

6. The vehicular camera according to claim 5, wherein the second welding rib on the end surface of the second tubular portion of the housing is located in a region close to the inner side on the end surface in the radial direction.

7. The vehicular camera according to any one of claim 1, wherein the housing includes a bottom surface portion opposite to the end surface, and the image sensor is surrounded by the second tubular portion and the bottom surface portion of the housing, the ring member, and the lens unit.

8. The vehicular camera according to claim 7, wherein the image sensor is disposed on a circuit board, the image sensor and the circuit board are surrounded by the second tubular portion, the bottom surface portion of the housing, the ring member, and the lens unit, a connector including a terminal which passes through an outside and an inside of the housing and allows an electric signal to transmit therethrough is disposed on the bottom surface portion of the housing, and the terminal of the connector is electrically connected to a circuit of the circuit board.

9. The vehicular camera according to any one of claim 1, wherein a cross section of the first tubular portion of the lens unit along the radial direction has a circle, and a cross section of the second tubular portion of the housing along the radial direction has a quadrilateral shape.

10. The vehicular camera according to any one of claim 1, wherein a first distance between the ring member and the second surface of the flange portion of the lens unit is set to be larger than a second distance between the ring member and the end surface of the second tubular portion of the housing.

11. The vehicular camera according to any one of claim 1, wherein the first light absorptivity of the second resin is the same as the second light absorptivity of the third resin.

* * * * *